(12) United States Patent
Hasan

(10) Patent No.: US 10,500,564 B2
(45) Date of Patent: Dec. 10, 2019

(54) PREPARATION OF CHITOSAN-BASED MICROPOROUS COMPOSITE MATERIAL AND ITS APPLICATIONS

(71) Applicant: PERMA-FIX ENVIRONMENTAL SERVICES, INC., Atlanta, GA (US)

(72) Inventor: Shameem Hasan, Sunrise, FL (US)

(73) Assignee: PERMA-FIX ENVIRONMENTAL SERVICES, INC., Atlanta, GA (US)

( * ) Notice: Subject to any disclaimer, the term of this patent is extended or adjusted under 35 U.S.C. 154(b) by 0 days.

(21) Appl. No.: 15/935,398

(22) Filed: Mar. 26, 2018

(65) Prior Publication Data

US 2019/0105630 A1   Apr. 11, 2019

Related U.S. Application Data

(63) Continuation-in-part of application No. 14/547,201, filed on Nov. 19, 2014, which is a continuation-in-part of application No. 13/424,289, filed on Mar. 19, 2012, now Pat. No. 8,911,695.

(60) Provisional application No. 61/453,772, filed on Mar. 17, 2011.

(51) Int. Cl.
| | | |
|---|---|---|
| *B01J 20/24* | (2006.01) | |
| *B01J 20/28* | (2006.01) | |
| *B01J 20/02* | (2006.01) | |
| *B01J 20/30* | (2006.01) | |
| *C22B 59/00* | (2006.01) | |
| *G21F 9/12* | (2006.01) | |
| *B01D 15/08* | (2006.01) | |
| *C22B 34/34* | (2006.01) | |

(52) U.S. Cl.
CPC .............. *B01J 20/24* (2013.01); *B01D 15/08* (2013.01); *B01J 20/0211* (2013.01); *B01J 20/2808* (2013.01); *B01J 20/28026* (2013.01); *B01J 20/3021* (2013.01); *B01J 20/3071* (2013.01); *B01J 20/3085* (2013.01); *C22B 34/34* (2013.01); *C22B 59/00* (2013.01); *G21F 9/12* (2013.01)

(58) Field of Classification Search
CPC .. B01J 20/24; B01J 20/0211; B01J 20/28026; B01J 20/2808; B01J 20/3021; B01J 20/3071; B01J 20/3085; B01D 15/08; C22B 34/34; C22B 59/00; G21F 9/12
See application file for complete search history.

(56) References Cited

U.S. PATENT DOCUMENTS

| | | | |
|---|---|---|---|
| 5,208,166 A | 5/1993 | Saunders et al. | |
| 5,599,916 A | 2/1997 | Dutkiewicz et al. | |
| 6,764,981 B1 | 7/2004 | Eoff et al. | |
| 2004/0182576 A1 | 9/2004 | Reddy et al. | |
| 2009/0291912 A1 | 11/2009 | Tijsma et al. | |
| 2012/0308461 A1 | 12/2012 | Mohanty et al. | |
| 2013/0039822 A1* | 2/2013 | Hasan ..................... | B01J 20/24 423/2 |
| 2013/0045182 A1 | 2/2013 | Gong et al. | |
| 2013/0069000 A1 | 3/2013 | Anupama et al. | |
| 2013/0142885 A1 | 6/2013 | Laurencin et al. | |
| 2016/0324490 A1* | 11/2016 | Brachman ............. | A61B 6/107 |

FOREIGN PATENT DOCUMENTS

| | | |
|---|---|---|
| KR | 987000880 A | 4/1998 |
| RU | 2065877 C1 | 8/1996 |
| RU | 2520444 C2 | 6/2014 |
| WO | 9620015 A2 | 7/1996 |
| WO | 2012125994 A2 | 9/2012 |

OTHER PUBLICATIONS

Supplemental Canadian Office Action dated Nov. 1, 2018.
Korean Office Action regarding 10-2013-7027298 dated Jun. 20, 2018.
Russian Office Action with English translation regarding Russian Patent Application No. 2017120833 dated Mar. 19, 2019.
Canadian Office Action with Examination Search Report dated Feb. 26, 2018.
Australian Examination Report regarding Australian Application No. 2015349895 dated Nov. 23, 2018.
International Search Report and Written Opinion dated Feb. 12, 2016.
Armenian Office Action for Appln. No. AM20170087 (with translation) dated Aug. 28, 2017.
European Office Action for Appln. No. 12711523.6 dated Feb. 2, 2018.
Hasan, Shameem, et al.: "Adsorption of uranium on a novel bioadsorbent-chitosan-coated perlite", Nuclear Technology, American Nuclear Society, Chicago, IL, US, vol. 159, Jul. 1, 2007 (Jul. 1, 2007), pp. 59-71, XP008152961, ISSN: 0029-5450.
Supplementary European Search Report regarding European Application No. EP15861884 dated Jul. 2, 2018.
International Search Report and Written Opinion regarding International Application No. PCT/US2019/022666 dated Aug. 21, 2019.
JP Office Action (with Translation) for related Japanese Patent Application No. 2017527804 dated Aug. 2, 2019.
Morales et al. Size selected systhesis of matnetite nanoparticles in chitosan matrix, Applied Surface Science, vol. 275, Jan. 26, 2013, pp. 71-74.

(Continued)

Primary Examiner — Melvin C. Mayes
Assistant Examiner — Michael Forrest
(74) Attorney, Agent, or Firm — Dickinson Wright PLLC

(57) ABSTRACT

Microporous glutaraldehyde-crosslinked chitosan sorbents include a plurality of nanoparticles of a high Z element. The nanoparticles are disposed in the cross-linked chitosan-gluteraldehyde composite matrix and integrated with the cross-linked chitosan-gluteraldehyde composite matrix to reduce primary impact of high radiation flux and minimize radiolytic effect on said cross-linked chitosan-gluteraldehyde composite matrix. The plurality of nanoparticles is made from the high Z element such as hafnium (Hf). Methods of making and using the microporous glutaraldehyde-crosslinked chitosan sorbents, and a generator for the radioisotope $^{99}$Mo containing the sorbents.

17 Claims, 28 Drawing Sheets

(56) References Cited

OTHER PUBLICATIONS

Shameem et al., "Dispersion of Fe00h of Chitosan Matrix for Simultaneous Removal of As (III) and As(V) from Drinking Water" Separation of Science and Technology, vol. 49, No. 18, Dec. 1, 2014, pp. 2863-2877.
Chakravarty et al., "Nanocria-PAN Composite-Based Advanced Sorbent Material: A Major Step Forward in the Field of Clinical-Grade 68Ge/68Ga Generator", ACS Applied Materials & Interfaces, vol. 2, No. 7, Jun. 22, 2010 pp. 2016-2075.
Chakravarty et al., "Polymer Embedded Nanocrystalline Titania Sorbent for 99Mo-99mTc Generator", Journal of Nanoscience and Nanotechno, vol. 8, Sep. 1, 2008, pp. 4447-4452.
European Office Action from regarding European Patent Application No. 15861884.3 dated Jun. 12, 2019.
Partial International Search Report and Provisional Opinion regarding International Application No. PCT/US2019/022666 dated Jun. 25, 2019.

* cited by examiner

PREPARATION OF CHITOSAN-BASED MICROPOROUS COMPOSITE MATERIAL AND ITS APPLICATIONS

CROSS REFERENCING TO RELATED APPLICATION

This application is a continuation-in-part of U.S. patent application Ser. No. 14/547,201, filed on Nov. 19, 2014, which is a continuation-in-part of U.S. patent application Ser. No. 13/424,289, filed on Mar. 19, 2012, now U.S. Pat. No. 8,911,695, which claims benefit to U.S. Provisional Application Ser. No. 61/453,772, filed Mar. 17, 2011, the entire contents of each of which are incorporated herein by reference for all purposes.

BACKGROUND

1. Field

Disclosed herein are methods for modification of chitosan that increases their versatility as sorbents, particularly as sorbents of radioisotopes, as well the ability of these materials to function in environments where radioactivity is present. Also disclosed are the materials themselves, as well as methods of using them to separate and purify radioisotopes, and to separate and purify contaminated materials, in particular those radioactive and nonradioactive streams contaminated by metal ions, particularly those of heavy metals.

2. Description of Related Art

Radioactive isotopes are widely used, particularly in the field of nuclear medicine, both for therapy and imaging. However, these materials can present production, storage, and disposal challenges due to their radioactivity, as well as their often significant half-lives.

More particularly, in the radiopharmaceutical area, $^{99m}Tc$ (having a half-life $t_{1/2}$=6 h), is one of the most widely used radioisotopes in diagnostic medicine, obtained from the decay product of parent $^{99}Mo$ ($t_{1/2}$=66 h). $^{99m}Tc$ is a pure gamma emitter (0.143 MeV) ideal for use in medical applications due to its short half-life (6 hours). It is used in 80-85% of the approximately 25 million diagnostic nuclear medicine procedures performed each year.

The parent $^{99}Mo$ can be produced by the irradiation of $^{98}Mo$ with thermal/epithermal neutrons in a nuclear reactor, but much of the world supply of $^{99}Mo$ comes from the fission product of highly enriched uranium (HEU) in a reactor. The HEU process generates large quantities of radioactive waste and does not permit reprocessing of the unused uranium targets due to weapons proliferation concerns.

Low enriched uranium (LEU, 20 percent $^{235}U$ or less) could be used as a substitute, but would yield large volumes of waste due to the large quantities of un-useable $^{238}U$ present. Currently, most of the world supply of $^{99}Mo$ comes from sources outside of the United States. Recent $^{99}Mo$ production outages at these sources have disrupted medical procedures and have demonstrated the unreliability of this supply chain. This stresses the need for economically feasible alternative sources to produce $^{99m}Tc$ from $^{99}Mo$.

The main concerns with neutron capture-produced $^{99}Mo$, as compared to the more common fission-produced material described above, involves both lower curie yield and lower specific activity. The specific activity is significantly lower and is of great concern due to impacts on $^{99}Mo/^{99m}Tc$ generator size, efficiency, and functionality. Therefore, use of lower specific activity molybdate is only feasible with a more efficient sorbent to reduce the generator size and to yield a usable dose at the radiopharmacy. Several research works have been focused on the uses of a molybdenum gel generator. See Marageh, M. G., et al., "Industrial-scale production of $^{99m}Tc$ generators for clinical use based on zirconium molybdate gel," Nuclear Technology, 269, 279-284 (2010); Monoroy-Guzman, F. et al., "$^{99}Mo/^{99m}Tc$ generators performances prepared from zirconium molybdate gels" J. Braz. Chem. Soc., 19, 3, 380-388 (2008). Others focused on preparation of $^{99}Mo/^{99m}Tc$ generator based on polymeric or inorganic oxide as an adsorbent material for $^{99}Mo$. See Masakazu, T. et al., "A $^{99m}Tc$ generator using a new organic polymer absorbent for (n,γ) $^{99}Mo$," Appl. Radia. Isot., 48, 5, 607-711 (1997); Qazi, Q. M. et al., "Preparation and evaluation of hydrous titanium oxide as a high affinity adsorbent for molybdenum ($^{99}Mo$) and its potential for use in $^{99m}Tc$ generator," Radiochim. Acta, 99, 231-235 (2011).

However, such medical uses require that the $^{99m}Tc$ be produced in highly purified form. For example, when $^{99m}Tc$ is produced from the decay of $^{99}Mo$, it is important to achieve a high degree of separation of the two elements in order to meet regulatory requirements.

One approach to achieving this level of purity is to separate $^{99m}Tc$ from $^{99}Mo$ using a highly efficient, selective sorbent, e.g., by sorbing $^{99}Mo$ and eluting $^{99m}Tc$. Attempts have been made to use alumina as such a sorbent. However, this alumina provides an efficiency for $Mo^{99}$ of about 25 mg/g of sorbent. Accordingly, there remains a need in the art for a sorbent that is both efficient in the adsorption of $^{99}Mo$, and resistant to the adverse effects of ionizing radiation. In addition, there remains a need for a sorbent that is highly selective for $^{99}Mo$, i.e., that is capable of sorbing $^{99}Mo$ while providing good release of $^{99m}Tc$.

More generally, there remains a need for a sorbent that is readily available, or producible from readily available materials, and that is customizable by modification to have one or more functional groups (which may be the same or different) allowing the material to remove constituents from a process stream requiring such purification, and that is resistant to degradation by ionizing radiation.

The ion exchange process, which has been used for decades to separate metal ions from aqueous solution, is often compared to adsorption. The primary difference between these two processes is that ion exchange is a stoichiometric process involving electrostatic forces within a solid matrix, whereas in adsorptive separation, uptake of the solute onto the solid surface involves both electrostatic and Van der Waals forces. In an attempt to find a suitable ion exchange resin for the removal of cesium and strontium from waste solution, several investigators have tried a number of inorganic, organic, and bio-adsorbents, with a varying degree of success. See Gu, D., Nguyen, L., Philip, C. V., Huckmen, M. E., and Anthony, R. G. "Cs$^+$ ion exchange kinetics in complex electrolyte solutions using hydrous crystalline silicotitanates", Ind. Eng. Chem. Res., 36, 5377-5383, 1997; Pawaskar, C. S., Mohapatra, P. K., and Manchanda, V. K. "Extraction of actinides fission products from salt solutions using polyethylene glycols (PEGs)" Journal of Radioanalytical and Nuclear Chemistry, 242 (3), 627-634, 1999; Dozol, J. F., Simon, N., Lamare, V., et al. "A solution for cesium removal from high salinity acidic or alkaline liquid waste: The Crown calyx[4]arenas" Sep. Sci. Technol., 34 (6&7), 877-909, 1999; Arena, G., Contino, A., Margi, A. et al. "Strategies based on calixcrowns for the detection and removal of cesium ions from alkali-containing solutions. Ind. Eng. Chem. Res., 39, 3605-3610, 2000.

However, major disadvantages with the ion exchange process are the cost of the material and regeneration for repeated use when treating radioactive streams. See Hassan, N., Adu-Wusu, K., and Marra, J. C. "Resorcinol-formaldehyde adsorption of cesium (Cs+) from Hanford waste solutions-Part I: Batch equilibrium study" WSRC-MS-2004. The cost of disposal is also a major issue. The success of adsorption processes depends largely on the cost and capacity of the adsorbents and the ease of regeneration.

Chitosan is a partially acetylated glucosamine polymer encountered in the cell walls of fungi. It results from the deacetylation of chitin, which is a major component of crustacean shells and available in abundance in nature. This biopolymer is very effective in adsorbing metal ions because of its ability for complexation due to high content of amino and hydroxyl functional groups. In their natural form, chitosan is soft and has a tendency to agglomerate or form gels in acidic medium. Moreover, chitosan, in its natural form, is non-porous and the specific binding sites of this biopolymer are not readily available for sorption. However, it is necessary to provide physical support and chemical modification to increase the accessibility of the metal binding sites for process applications. It is also essential that the metal binding functional group should be retained after any such modification.

It is well known that polysaccharides can be degraded due to scission of glycoside bonds by ionizing radiation. IAEA-TECDOC-1422, "Radiation processing of polysaccharides' International Atomic Energy Agency, November, 2004. The hydrogel based on polysaccharides and their derivatives has been extensively studied, but very limited work has been reported so far on the impact of radiation on the chitosan-based microporous composite materials and their metal ion uptake capacity.

Chitosan is a non-toxic, biodegradable material. It has been investigated for many new applications because of its availability, polycationic character, membrane effect, etc. The amino group present in the chitosan structure is the active metal binding site, but it also renders chitosan soluble in weak acid. In acidic media, chitosan tends to form a gel which is not suitable for adsorption of metal ions in a continuous process.

Several reports indicated that the cross-linking of chitosan with gluteraldehyde make chitosan acid or alkali resistant. See Elwakeel, K. Z., Atia, A. A., and Donia, A. M." Removal of Mo(VI) as oxoanions from aqueous solutions using chemically modified magnetic chitosan resins, Hydrometallurgy, 97, 21-28, 2009; Chassary, P., Vincent, T., and Guibal, E. "Metal anion sorption on chitosan and derivative materials: a strategy for polymer modification and optimum use" Reactive and Functional Polymers, 60, 137-149, 2004; Velmurugan, N., Kumar, G. G., Han, S. S., Nahm, K. S., and Lee, Y. S. "Synthesis and characterization of potential fungicidal silver nano-sized particles and chitosan membrane containing silver particles" Iranian Polymer Journal, 18 (5), 383-392, 2009. Gluteraldehyde is a five carbon molecule terminated at both ends by aldehyde groups which are soluble in water and alcohol, as well as in organic solvents. It reacts rapidly with amine groups of chitosan during cross-linking through Schiff's reaction and generates thermally and chemically stable cross-links. See Migneault, I., Dartiguenave, C., Bertrand, M. J., and Waldron, K. C. "Gluteraldehyde: behavior in aqueous solution, reaction with proteins, and application to enzyme crosslinking" Bio Techniques, 37 (5), 790-802, 2004. The amine groups are also considered as the active metal binding sites of chitosan. Therefore, by cross-linking with gluteraldehyde, the chitosan is reported to be acid or alkali resistant but the metal adsorption capacity will be reduced.

Li and Bai (2005) proposed a method to cap the amine group of chitosan by formaldehyde treatment before cross-linking with gluteraldehyde, which was then removed from the chitosan structure by washing thoroughly with 0.5M HCl solution. Li, Nan, and Bai, R. "A novel amine-shielded surface cross-linking of chitosan hydrogel beads for enhanced metal adsorption performance" Ind. Eng. Chem. Res., 44, 6692-6700, 2005.

Crosslinking of chitosan with different functional groups is thought to depend mainly on the crosslinking reaction conditions, such as pH, temperature, ionic concentration, and the surface charge of the materials.

Sing et al. (2006) showed that swelling properties of chitosan hydrogel cross-linked with formaldehyde depends on the responsive behavior of pH, temperature, and ionic strength. Singh, A., Narvi, S. S., Dutta, P. K., and Pandey, N. D. "External stimuli response on a novel chitosan hydrogel crosslinked with formaldehyde" Bull. Mater. Sci., 29 (3), 233-238, 2006.

The surface charge of the chitosan that determines the type of bond that will form between the cross-linking agent and chitosan, depends on the pH of the solution. Hasan, S., Krishnaiah, A., Ghosh, T. K., Viswanath, D. S., Boddu, V. M., and Smith, E. D. "Adsorption of divalent cadmium from aqueous solutions onto chitosan-coated perlite beads, Ind. Eng. Chem. Res., 45, 5066-5077, 2006. The point of zero charge (PZC) value of pure chitosan is in the pH range of 6.2-6.8. See Hasan, S., Ghosh, T. K., Viswanath, D. S., Loyalka, S. K., and Sengupta, B. "Preparation and evaluation of fullers earth for removal of cesium from waste streams" Separation Science and Technology, 42 (4), 717-738, 2007. Chitosan is not soluble in alkaline pH, but at acidic pH, the amine groups present in the chitosan can undergo protonation to $NH_3^+$ or $(NH_2—H_3O)^+$.

Li et al. (2007) reported cross-linked chitosan/polyvinyl alcohol (PVA) beads with high mechanical strength. They observed that the $H^+$ ions in the solution can act as both protection of amino groups of chitosan during the crosslinking reaction. Li, M., Cheng, S., and Yan, H. "Preparation of crosslinked chitosan/poly(vinyl alcohol) blend beads with high mechanical strength", Green Chemistry, 9, 894-898, 2007.

Farris et al. (2010) studied the reaction mechanism for the cross-linking of gelatin with gluteraldehyde. Farris, S., Song, J., and Huang, Q. "Alternative reaction mechanism for the cross-linking of gelatin with gluteraldehyde" J. Agric. Food Chem., 58, 998-1003, 2010. They suggested that, at higher pH values, the cross-linking reaction is governed by Schiff's base reaction, whereas at low pH, the reaction may also involve —OH groups of hydroxyproline and hydroxylysine, leading to the formation of hemiacetals.

Hardy et al. (1969) proposed that, at acidic pH, gluteraldehyde is in equilibrium with its cyclic hemiacetal and polymers of the cyclic hemiacetal and an increase in temperature produces free aldehyde in acid solution. Hardy, P. M., Nicholas, A. C., and Rydon, H. N. "The nature of gluteraldehyde in aqueous solution" Journal of the Chemical Society (D), 565-566, 1969.

Several studies focused on chitosan-based cross-linked material for medical and radiopharmaceutical uses with some success. See, e.g., Hoffman, B., Seitz, D., Mencke, A., Kokott, A., and Ziegler, G. "Gluteraldehyde and oxidized dextran as crosslinker reagents for chitosan-based scaffolds for cartilage tissue engineering" J. Mater Sci: Mater Med, 20(7), 1495-1503, 2009; Salmawi, K. M. "Gamma radiation-induced crosslinked PVA/Chitosan blends for wound dressing" Journal of Macromolecular Science, Part A: Pure and Applied Chemistry, 44, 541-545, 2007; Desai, K. G., and Park, H. J. "Study of gamma-irradiation effects on chitosan microparticles" Drug Delivery, 13, 39-50, 2006; Silva, R. M., Silva, G. A., Coutinho, O. P., Mano, J. F., and Reis, R. L. "Preparation and characterization in simulated body conditions of gluteraldehyde crosslinked chitosan membranes" Journal of Material Science: Materials in Medicine, 15 (10), 1105-1112, 2004.

However, Sabharwal et al. (2004) reported that the radiation processing of natural polymers has drawn less attention as the natural polymers undergo chain scission reaction when exposed to high energy radiation. Sabharwal, S., Varshney, L., Chaudhary, A. D., and Ramnani, S. P. "Radiation processing of natural polymers: Achievements & Trends" In Radiation processing of polysaccharides, 29-37, IAEA, November, 2004. It is reported that irradiation of chitosan yields lower viscosity and chain scission of chitosan. See Kume, T., and Takehisa, M. "Effect of gamma-irradiation on sodium alginate and carrageenan powder" Agric. Biol. Chem. 47, 889-890, 1982; Ulanski, P., and Rosiak, J. M. "Preliminary studies on radiation induced changes in chitosan" Radiat. Phys. Chem. 39(1), 53-57, 1992. The $H^+$ and $OH^-$ radicals formed by radiolysis during irradiation of water accelerate the molecular chain scission of chitosan. The reaction between the above free radical and chitosan molecules leads to rapid degradation of chitosan in aqueous solution. See IAEA-TECDOC-1422, "Radiation processing of polysaccharides' International Atomic Energy Agency, November, 2004. These studies suggest that the use of chitosan in environments where it will be exposed to irradiation and potential radiolysis is problematic.

Nevertheless, the current demands for biocompatible polymeric materials in radiopharmaceutical and radioactive waste treatment have increased the interest in developing economically feasible alternative sources of acidic, alkaline, and radiation resistant polymer network structures. Recent development of chitosan-based materials in the area of medical, radiopharmaceuticals, and radioactive waste has drawn attention due to their availability and biocompatibility. See Alves, N. M., and Mano, J. F. "Chitosan derivatives obtained by chemical modifications for biomedical and environmental applications" International Journal of Biological Macromolecules, 43, 401-414, 2008; Berger, J., Reist, M., Mayer, J. M., Felt, O., Peppas, N. A., and Gurny, R. "Structure and interactions in covalently and ionically crosslinked chitosan hydrogels for biomedical applications, European Journal of Pharmaceutics and Biopharmaceutics, 57, 19-34, 2004. It is reported that the chemical changes in chitosan occur due to irradiation and the extent of radiation-induced reaction depends on the polymer network structure. See Zainol, I., Akil, H. M., and Mastor, A. "Effect of γ-ray irradiation on the physical and mechanical properties of chitosan powder" Material Science and Engineering C, 29, 292-297, 2009; Chang, K. P., Cheng, C. H., Chiang, Y. C., Lee, S. C. et al., "Irradiation of synthesized magnetic nanoparticles and its application for hyperthermia" Advanced Materials Research, 47-50, 1298-1301, 2008; Casmiro, M. H., Botelho, M. L., Leal, J. P., and Gil, M. H. "Study on chemical, UV and gamma radiation-induced grafting of 2-hydroxyethyl methacrylate onto chitosan" Radiation Physics and Chemistry, 72, 731-735, 2005; Park et al. "Radioactive chitosan complex for radiation therapy" U.S. Pat. No. 5,762,903, Jun. 9, 1998; Wenwei, Z., Xiaoguang, Z., Li, Yu, Yuefang, Z., and Jiazhen, S. "Some chemical changes in chitosan induced by γ-ray irradiation" Polymer Degradation and Stability, 41, 83-84, 1993; Lim, L. Y., Khor, E., and Koo, O. "γ irradiation of chitosan" Journal of Biomedical Material Research, 43 (3), 282-290, 1998; Yoksan, R., Akashi, M., Miyata, M., and Chirachanchai, S. "Optimal γ-ray dose and irradiation conditions for producing low molecular weight chitosan that retains its chemical structure" Radiation Research, 161, 471-480, 2004; Lu, Y. H., Wei, G. S., and Peng, J. "Radiation degradation of chitosan in the presence of $H_2O_2$" Chinese Journal of Polymer Science, 22 (5), 439-444, 2004. However, there is very limited information available on the radiation effect on cross-linked chitosan composite matrices.

Current research in the area of radiation resistance adsorbent materials, pertaining to the technology development, for the selective separation of isotopes and their applications in medical and nuclear environmental field are the forefront of science and engineering. One of the main concerns of the adsorption techniques is the cost of the resin and their performance under high radiation environment. The chemical properties of the functional groups of the resin, which is active metal binding sites for resin, are subject to change by the interaction with ionizing radiation. In adsorption process, this may cause poor selectivity of the resin materials for metal ions and therefore hinders their application.

The active surface of the resin is considered to be the critical structures of MPCM resin. In case of exposing the MPCM resin to higher radiation field, the critical structure of the resin, which will primarily interact with the imparted energy from the ionizing radiation, needs to be protected. It is evident from IR and XPS analysis that MPCM resin may undergoes radiation induced cross-linking reaction under high radiation field but the performance for metal ion uptake before and after the irradiation reported to be remained same. However, the main constituents of MPCM resin are low Z elements (with less stopping power), therefore, the negative impact of high energy particles on MPCM surface can be minimized by maintaining proper aspect ratio of the column. Furthermore, the critical structure of the resin, which is also porous in nature, is assumed to be thin, due to range consideration; it should be protected also from interaction of radiation.

SUMMARY

One embodiment disclosed herein relates to a radiation-resistant sorbent comprising glutaraldehyde-crosslinked chitosan.

More particularly, disclosed herein are chitosan-based microporous composite micron-size particles and chitosan-titania microporous composite material which was prepared by cross-linking chitosan with gluteraldehyde in the presence of a catalyst.

Even more particularly, disclosed herein is a sorbent containing a microporous material of chitosan that has been crosslinked with glutaraldehyde in the presence of a catalyst, such as an acid (e.g., HCl) to a glutaraldehyde concentration of about 2 to 4 wt %, and which is resistant to degradation from exposure to beta and gamma radiation, and to degradation from exposure to acids or alkaline solutions.

Without wishing to be bound by theory, it is believed that the cross-linked microporous chitosan matrix enhances the acid resistance and mechanical strength of the chitosan particle. As a result, the uptake capacity of the cross-linked particles increases for metal ions from acidic or alkaline radioactive solution in comparison to available commercial resins and commercial aluminas. This increased uptake can result in efficiencies for molybdenum as high as 500-700 mg/g of sorbent, more particularly, about 600 mg/g of sorbent.

Described herein are embodiments of chitosan-based microporous composite materials which were prepared using solution casting and combination of solution casting and sol-gel method.

In one embodiment, chitosan was cross-linked with gluteraldehyde in the presence of acid as a catalyst at temperatures of around 70° C. under continuous stirring. Without wishing to be bound by theory, it is believed that amino groups present in the chitosan structure are protonated, and thus shielded from the reaction with gluteraldehyde. It is also believed that at temperatures of around 70° C., more aldehyde groups are available for reaction than are available at room temperature. In this case, without wishing to be bound by theory, it is believed that glutaraldehyde undergoes aldol condensation and the free aldehyde group will react with —OH groups of chitosan in the presence of an acid catalyst, so that the polymerization of chitosan with glutaraldehyde is a condensation polymerization. Reaction times generally range from about 4 hours to about 8 hours. In one embodiment, the mole ratio of chitosan hydroxyl group to gluteraldehyde is desirably maintained at around 4/1.

In a particular embodiment, the crosslinked material can be further processed by, washing to remove excess glutaraldehyde, drying, wet or dry milling, and additional chemical processing. One example of this additional chemical processing that has been found to be particularly suitable is at least partial oxidation with an oxidizer. In particular, oxidation with one of more of a permanganate (e.g., by a potassium permanganate solution containing at least about 14 mg Mn/L of solution), a peroxide, a chlorite, a hypochlorite, a dichromate, or a metal oxide, or other ambiphilic oxidizer, is especially suitable for increasing the selectivity of the sorbent for Mo(VI) with respect to Tc(VII), and for the efficient and rapid elution and recovery of technetium from loaded sorbent. More particularly, an oxidizer comprising one or more of an alkali metal chlorite, an alkali metal hypochlorite, an alkali metal dichromate, or a transition metal oxide is desirably used. More particularly, an oxidizer comprising one or more of sodium chlorite, sodium hypochlorite, potassium dichromate, or cerium oxide is desirably used. In addition to oxidizing the crosslinked sorbent material, these oxidizers can desirably be included in an eluent solution used to release technetium from the sorbent. Desirably, such oxidizers are included in a saline-containing eluent solution in concentrations ranging from about 5 to about 40 mM for chlorites or hypochlorites.

Desirably, the sorbent has a surface area that ranges between about 10 and about 100 m$^2$/g, and more particularly is about 25 m$^2$/g. Also desirably, the sorbent has a point of zero charge ranges from about 7.5 to about 8.8, and more particularly is about 8.8.

Embodiments of the sorbents described herein have an excellent holding capacity for molybdenum, and can sorb molybdenum in amounts of around 60 wt %, based on the dry weight of the sorbent, or higher. This holding capacity can be around 6.25 mmol/g of sorbent, or higher. The sorbents also have excellent selectivity for molybdenum with respect to technetium, and are able to hold molybdenum while passing pertechnate ion in saline solution with an efficiency of at least about 80%. Embodiments of the sorbents disclosed herein also provide excellent capacity to sorb heavy metals, including, e.g., the ability to sorb Hg in amounts of 2.96 mmol/g dry sorbent or higher from aqueous solution at pH 6.

In another embodiment, titanium oxide was incorporated into the chitosan gluteraldehyde composite polymer matrix. The development of crystalline silica titanate (CST) and titanium-based oxide materials has paved the way for metal ions adsorption studies onto hydrous titanium oxide from the radioactive and non-radioactive waste streams. See Anthony, R. G., Dosch, R. G., Gu, D., and Philip, C. V. "Use of silicotitanates for removing cesium and strontium from defense waste" Ind. Eng. Chem. Res., 33, 2702-2705, 1994; Maria, P., Meng, X., Korfiatis, G. P., and Jing, C. "Adsorption mechanism of arsenic on nanocrystalline titanium dioxide" Environ. Sci. Technol, 40, 1257-1262, 2006; Meng et al., "Methods of preparing a surface-activated titanium oxide product and of using same in water treatment process" U.S. Pat. No. 7,497,952 B2, Mar. 3, 2009. Qazi and Ahmed (2011) reported the hydrous titanium oxide as an adsorbent for $^{99}$Mo and its potential for use in $^{99m}$Tc generator. Qazi, Q. M., and Ahmed, M. "Preparation and evaluation of hydrous titanium oxide as a high affinity adsorbent for molybdenum ($^{99}$Mo) and its potential for use in $^{99m}$Tc generators" Radiochimica Acta, Doi: 10.1524/ract.2011. Ser. No. 18/172,011. It has been suggested that titanium oxide can form surface complex with metal ion resulting from a bidenate bonding mode to surface oxygen atoms. Hasan, S., Ghosh, T. K., Prelas, M. A., Viswanath, D. S., and Boddu, V. M. "Adsorption of uranium on a novel bioadsorbent chitosan coated perlite" Nuclear Technology, 159, 59-71, 2007.

However, none of these documents disclose that $TiO_2$, when dispersed on chitosan matrix, would enhance the overall capacity for metal ions uptake from radioactive waste solution. In the method disclosed herein, hydrous titanium oxide gel was prepared using the sol-gel technique. The titanium oxide gel was incorporated into the chitosan and gluteraldehyde matrix in the presence of HCl as a catalyst.

Thus, one embodiment relates to a method for preparing a radiation-resistant sorbent, comprising:

combining chitosan with water in the presence of an acid to form a chitosan gel;

adding glutaraldehyde to the gel to form a semi-solid mass in presence of catalyst at 70° C.;

washing the semi-solid mass to remove unreacted glutaraldehyde and form a washed mass;

suspending the washed mass in aqueous base to form a neutralized crosslinked mass; and drying the neutralized crosslinked mass to form the radiation-resistant sorbent.

Another embodiment relates to such a method further comprising:

forming an amorphous titania gel by acid catalyzed hydrolysis and condensation of titanium isopropoxide;

mixing the amorphous titania gel with the chitosan gel under conditions sufficient for the gels to react prior to said adding glutaraldehyde.

In one embodiment, the chitosan-based microporous composite material was then suspended in a solution with pH 3 and irradiated at 50,000 krad using $^{60}$Co irradiator. The specific objectives of this work were to 1) prepare chitosan-based microporous composite particles to adsorb metal ions from highly acidic or alkaline radioactive waste solutions; and 2) optimize the cross-linking process to obtain maximum metal binding sites.

Thus, another embodiment relates to a method of separating isotopes from mixtures thereof, comprising:

contacting a mixture of at least two isotopes with a radiation resistant sorbent according to claim 1 that preferentially sorbs at least one of said isotopes;

sorbing at least one of said isotopes onto or into said sorbent while one or more of the remaining isotopes are not significantly sorbed by the sorbent;

removing said one or more remaining isotopes from said sorbent.

Chitosan cross-linked composite is an excellent low cost alternative adsorption material compare to available resins, and thus a desirable adsorbent material to remove metal ions from radioactive and nonradioactive aqueous solutions. It has been found that the success of adsorption processes in the $^{99}$Mo/$^{99m}$Tc generator systems depends largely on the cost and capacity of the adsorbents and the ease of $^{99m}$Tc release from the generator. The main problem with this particular method from a radiation safety standpoint involves the "breakthrough", or partial elution of the $^{99}$Mo parent along with the $^{99m}$Tc from the generator, which must be kept within Nuclear Regulatory Commission (NRC) standards. Embodiments of the materials and methods described herein provide good, selective release of $^{99m}$Tc from the generator, thereby solving this problem and fulfilling a need for such a generator.

It is believed that chemical element with a high atomic number of protons in the nucleus, a high Z element, with higher stopping power will have affinity for certain isotopes can be crosslinked with MPCM resin matrix. It is also envisaged that the radiation tolerance limit and selectivity of the MPCM resin for certain isotopes, can be further enhanced by the high Z element crosslinked MPCM resin as it will not be limited by the radiolytic driven reaction. Therefore, it is a further embodiment to provide a sorbent that will reduce the primary impact of high radiation flux and minimize the radiolytic effect on to the MPCM's porous critical structure compared to regular organic based resin such as MPCM resin.

The sorbent includes a microporous material including chitosan which has been crosslinked with glutaraldehyde in the presence of a catalyst to a glutaraldehyde concentration of about 2 to about 4 wt % to produce a cross-linked chitosan-gluteraldehyde composite matrix. The cross-linked chitosan-gluteraldehyde composite matrix is resistant to degradation from exposure to beta and gamma radiation and from exposure to acids. A plurality of nanoparticles of a high Z element is disposed in the cross-linked chitosan-gluteraldehyde composite matrix and is integrated with the cross-linked chitosan-gluteraldehyde composite matrix.

It is a further embodiment to provide a method for preparing a radiation-resistant sorbent. The method includes the steps of combining chitosan with water in the presence of an acid to form a chitosan gel. The method also includes a step of adding glutaraldehyde to the gel to form a semi-solid mass in the presence of catalyst at 70° C., in where condensation polymerization of reaction mass occurs. The method further includes a step of washing the semi-solid mass to remove unreacted glutaraldehyde and form a washed mass. The next step of the method is suspending the washed mass in aqueous base to form a neutralized crosslinked mass. Then, a plurality of nanoparticles of a high Z element is disposed on the neutralized crosslinked mass. Next, the neutralized crosslinked mass including the plurality of nanoparticles is dried under vacuum to form the radiation-resistant sorbent.

It is a further embodiment to provide a method for preparing a plurality of nanoparticles for use in a radiation-resistant sorbent. The method includes a first step of grinding a salt of a high Z element with a surfactant under an inert atmosphere. The method also includes a step of adding deionized water of between 5 ml to 10 ml during the step of grinding to form a homogenous mixture. The method further includes a step of adding an alkaline solution to the homogenous mixture under sonication to nucleate and grow the nanoparticles under an inert atmosphere. Next, the surfactant of the homogenous mixture is transferred into an alcohol solution containing the nanoparticles. Then, the alcohol solution is sonicated to obtain a uniform intermediate stage of the nanoparticles. The precipitates, e.g. intermediate stage of nanoparticles, are then sonicated and washed thoroughly with ethanol and deionized water to remove surfactant and impurities, respectively.

In addition, embodiments of the chitosan crosslinked composites disclosed herein can be used in a method for separating or concentrating or both one or more heavy metals from a liquid stream, such as a waste stream or a process stream, by contacting a liquid stream containing one or more heavy metals with the chitosan crosslinked composite and sorbing one or more of said heavy metals thereon.

BRIEF DESCRIPTION OF DRAWINGS

Various aspects of the embodiments disclosed herein can be understood more clearly by reference to the drawings, which should not be interpreted as limiting the claimed invention.

FIG. 1a shows unmodified chitosan; FIG. 1b shows an embodiment of MPCM material.

FIGS. 6a, 6b, and 6c show the C 1s, O 1s, and N 1s positions, respectively.

FIG. 7a shows spectra of chitosan and an embodiment of MPCM before and after irradiation. FIG. 7b shows comparison of chitosan and an embodiment of MPCM. FIG. 7c shows comparison of an embodiment of MPCM before and after irradiation.

FIG. 10a, 10b, and 10c show the C 1s, O 1s, and N 1s positions, respectively.

DETAILED DESCRIPTION OF SPECIFIC EMBODIMENTS

Figure 1:
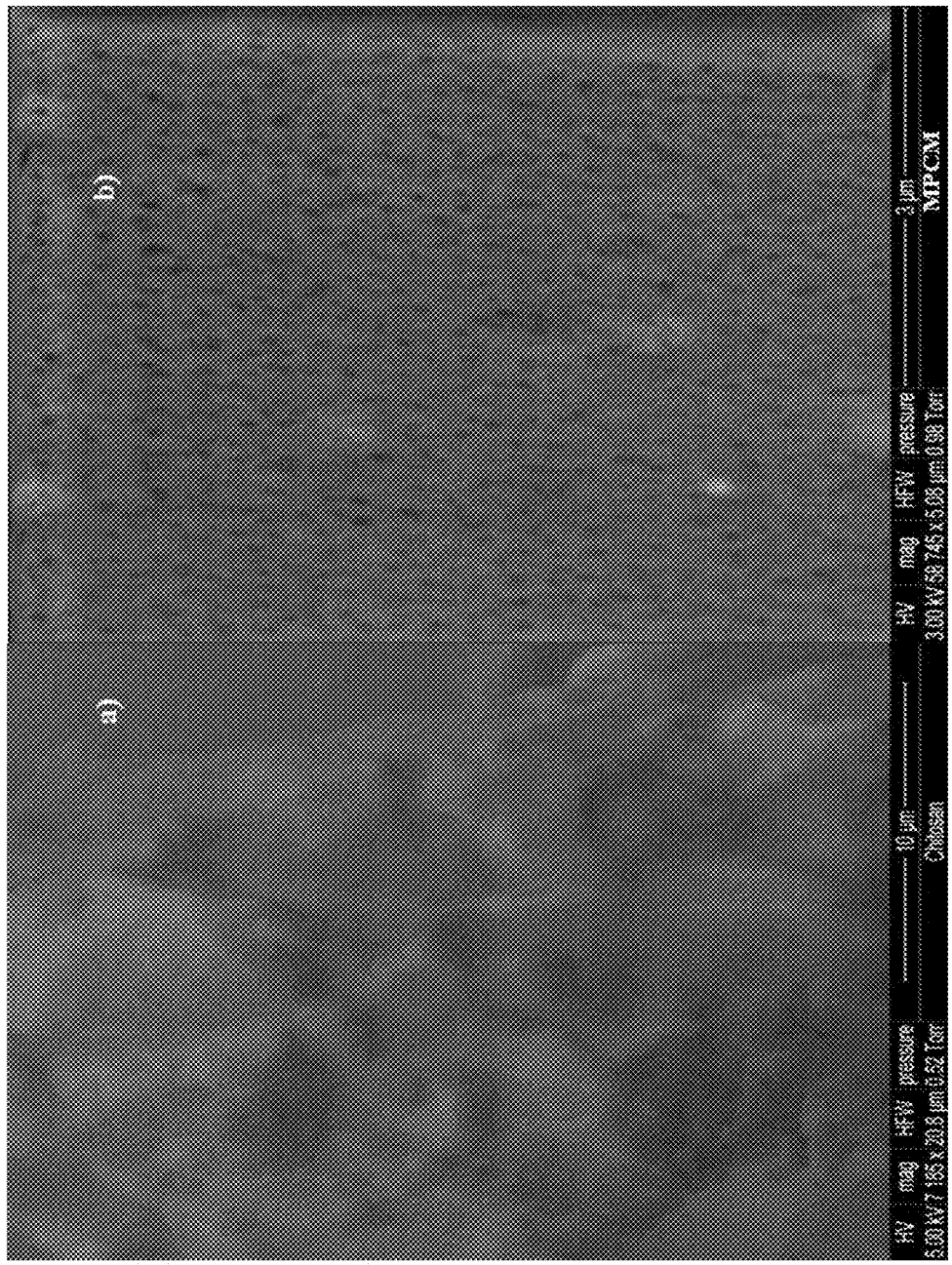
FIG. 1 is a scanning electron microscope photomicrograph that shows chitosan and embodiments of modified chitosan (MPCM) disclosed herein.

The methods disclosed herein and the resulting modified chitosan materials, as well as methods for the use thereof, can be better understood by reference to the following examples, which are intended illustrate, not to limit, the invention or the appended claims.

Medium molecular weight chitosan (about 190,000 to about 310,000, as determined by viscosity data) that has been 75-85% deacetylated was obtained from Sigma-Aldrich Chemical Corporation, WI, USA. All chemicals used in the examples were of analytical grade.

The modified chitosan disclosed herein can be prepared according to the reactions shown schematically in FIG. 7, by crosslinking with glutaraldehyde under acidic conditions at temperature conditions set forth below. While the amount of glutaraldehyde used may vary somewhat, it has been found effective to use from about 2 ml to about 10 ml, more particularly from about 2 ml to about 8 ml, even more particularly, about 6 ml, of glutaraldehyde per 4 g of chitosan. The pH of the crosslinking reaction between glutaraldehyde and chitosan may also vary somewhat, but it has been found effective to use a pH of between about 0.7 and about 3, more particularly between about 0.7 and 2, even more particularly, of about 1.0. The temperature of the crosslinking reaction may also vary, but is desirably between about 50° C. and about 80° C., more particularly, around 70° C.

It is another aspect of the present disclosure to provide a sorbent for use in connection with separating isotopes from mixtures. The sorbent comprises a microporous material including chitosan which has been crosslinked with glutaraldehyde in the presence of a catalyst to a glutaraldehyde concentration of about 2 to about 4 wt % to produce a cross-linked chitosan-gluteraldehyde composite matrix. The cross-linked chitosan-gluteraldehyde composite matrix is resistant to degradation from exposure to beta and gamma radiation and from exposure to acids. The cross-linked chitosan-gluteraldehyde composite matrix includes a plurality of nanoparticles, made from a high Z element, disposed in the cross-linked chitosan-gluteraldehyde composite matrix and integrated with the cross-linked chitosan-gluteraldehyde composite matrix to reduce primary impact of high radiation flux and minimize radiolytic effect on said cross-linked chitosan-gluteraldehyde composite matrix.

Without being bound by theory, it is believed that chemical element with a high atomic number of protons in the nucleus, the high Z element, with higher stopping power will have affinity for certain isotopes can be crosslinked with MPCM resin matrix. It is also believed that the radiation tolerance limit and selectivity of the MPCM resin for certain isotopes, can be further enhanced by the high Z element crosslinked MPCM resin as it will not be limited by the radiolytic driven reaction. Therefore, it is the inclusion of the high Z element will reduce the primary impact of high radiation flux and minimize the radiolytic effect on to the MPCM's porous critical structure compared to regular organic based resin such as MPCM resin.

The main objective of addition the high Z element, other than Molybdenum (Mo), into the cross-linked chitosan-gluteraldehyde composite matrix is to protect the structure of the matrix from the Mo-99 related radiolytic impact.

Preferably, the plurality of nanoparticles is made from the high Z element of Hafnium (Hf). Hf is a preferable high Z element for use in connection with the cross-linked chitosan-gluteraldehyde composite matrix because Hf has no known toxicity and, therefore, can be qualified to use in medical applications. More preferably, Hf is present in the cross-linked chitosan-gluteraldehyde composite matrix at a range of between 0.15 g to 0.35 g per grams of the cross-linked chitosan-gluteraldehyde composite matrix. It should be appreciated that the amount of Hf added to the composite matrix directly corresponds to the amount of activity of Molybdenum. For example, the composite matrix with lower amount of Hf is suitable for lower specific activity, e.g. natural Mo, while the composite matrix with higher amount of Hf is suitable for higher activity enriched Mo. It should also be noted that excess amount of Hf also reduce resin capacity for molybdenum.

It is another aspect to provide a method for preparing a radiation-resistant sorbent. The method includes a first step of combining chitosan with water in the presence of an acid to form a chitosan gel. The next step of the method is to add glutaraldehyde to the gel to form a semi-solid mass in the presence of catalyst at 70° C., in where condensation polymerization of reaction mass occurs. The semi-solid mass is then washed to remove unreacted glutaraldehyde and form a washed mass. Next, the washed mass is suspended in aqueous base to form a neutralized crosslinked mass. Then, a plurality of nanoparticles of a high Z element is disposed on the neutralized crosslinked mass. It should be appreciated that the high Z element being used is for the step of disposing is made from hafnium (Hf) between 0.15 g and 0.35 g per grams of the neutralized crosslinked mass. After disposing the high Z element the neutralized crosslinked mass including the plurality of nanoparticles is dried under vacuum to form the radiation-resistant sorbent. It should be appreciated that the high Z element such as hafnium can be integrated in to the neutralized crosslinked mass either self-assembles or radiation induced cross-linking process.

It is another aspect to provide a method for preparing a plurality of nanoparticles for use in a radiation-resistant sorbent. The method includes a first step of grinding a salt of a high Z element with a surfactant under an inert atmosphere. It should be appreciated that the salt of the high Z element is an aqueous salt that can be soluble in water such as Hafnium Chloride of $HfCl_2O.8H_2O$. The amount of surfactant used for making the nanoparticles ranges between 4 wt. % to 20 wt. %. The next step of the method is adding deionized water of between 5 ml to 10 ml during the step of grinding to form a homogenous mixture. The deionized water is added to the surfactant and the high Z element under continuous grinding. It should be appreciated that, during the step of adding the deionized water, there is no chemical reaction formed instead the homogenous mixture of the surfactant and the high Z element is formed. The next step of the method is to add an alkaline solution to the homogenous mixture to nucleate and grow the nanoparticles. It should be appreciated the addition of the alkaline solution to the homogenous mixture of the surfactant and the salt of a high Z element can be conducted under sonication to obtain a homogenously dispersed solution. Preferably, the alkaline solution added to the homogenous mixture is selected from NaOH or $NH_4OH$. To avoid impurities and possible side reactions, the steps of grinding, adding the deionized water, and adding the alkaline solution are conducted in an inert atmosphere, e.g. under Nitrogen. The growth of the nanoparticles can be further facilitated with the addition of excess amount of ethanol in the final solution obtain a uniform intermediate stage of the nanoparticles. The precipitates, e.g. the intermediate stage of Hafnium oxide nanoparticles, are then sonicated and washed thoroughly with ethanol and deionized water to remove the surfactant and impurities, respectively. In this step, the mass of the hafnium nanoparticles are mixed with chitosan gel before adding glutaraldehyde in the final step of MPCM preparation process. By this way, the hafnium nanoparticles can be deposited onto the MPCM resin matrix and the MPCM resin matrix can be dried under vacuum and at 120° C. for 12 hours.

Example 1

The ionic capacity of the chitosan used in this study was in the range of 9 to 19 milliequivalents/g, measured using a standard titrametric method. About 4 g of chitosan was added to 300 mL DI water with 1 mL acetic acid and stirred for 2 hr at 70° C. to form a gel. Approximately 5 mL of $HCl/HNO_3$ was added into the chitosan gel and kept under continuous stirring for another 1 hr at 70° C. to assist protonation of the amino substituent groups, which is beneficial for the reasons given below.

The reaction with gluteraldehyde was performed by dropwise addition of approximately 6 mL gluteraldehyde solution, having a concentration of 50%, to the acidic chitosan gel under continuous stirring (established based on trial and error, but generally from 200 rpm to 500 rpm) at 70° C. The final pH of the the mixture was approximately 1.0. The amount of gluteraldehyde was used in this study was established based on trial and error basis. The mixture was kept under continuous vigorous stirring (500 rpm) at 70° C. for another 1 hr to obtain semi-solid gel. The amino groups present in the chitosan are much more reactive with aldehyde through Schiff's reaction than the hydroxyl groups of chitosan. It was envisaged that, at 70° C., more free aldehyde groups will be present in the solution than would be present at room temperature. In acidic solution, the protonation of the amine group will inhibit the formation of complexes of aldehyde and amino groups. Moreover, glutaraldehyde may undergo aldol condensation and the reaction of hydroxyl groups of chitosan with free aldehyde can be catalyzed by acid at 70° C.

The resulting mass was then thoroughly washed with 2% monoethanol amine to remove any unreacted gluteraldehyde. The mass was then suspended in 0.1M NaOH solution for 4 to 6 hours. The cross-linked mass was separated from the solution and washed with 0.1M HCl and then with deionized water (DI) until the pH of the effluent solution was 7. The cross-linked mass was then dried in a vacuum oven overnight at 70° C. The cross-linked chitosan-gluteraldehyde composite is referred to as "MPCM" or "microporous composite material" herein.

The MPCM was ground using a laboratory jar mill to a particle size in the range of about 50 to 200 μm. An amount of these MPCM particles was suspended overnight in aqueous solution having pH 3. The pH of the solution was maintained using 0.1M $HNO_3$. The suspended MPCM particles were irradiated using $^{60}Co$ as a γ source. The characterizations of the MPCM sample were performed using SEM, EDS X-ray microanalysis, FTIR, and XPS spectroscopic analysis.

A scanning electron micrograph (SEM) of chitosan and MPCM material was taken to study the surface morphology and is shown in FIG. 1. The SEM secondary electron micrograph of the samples were obtained using backscatter electrons with an accelerating potential of 10 keV. The SEM micrograph of the cross-section of chitosan and MPCM sample is shown in FIGS. 1a and 1b, respectively. It appears from FIG. 1a that chitosan is nonporous, and from FIG. 1b the MPCM appears to be microporous in nature.

Figure 2:
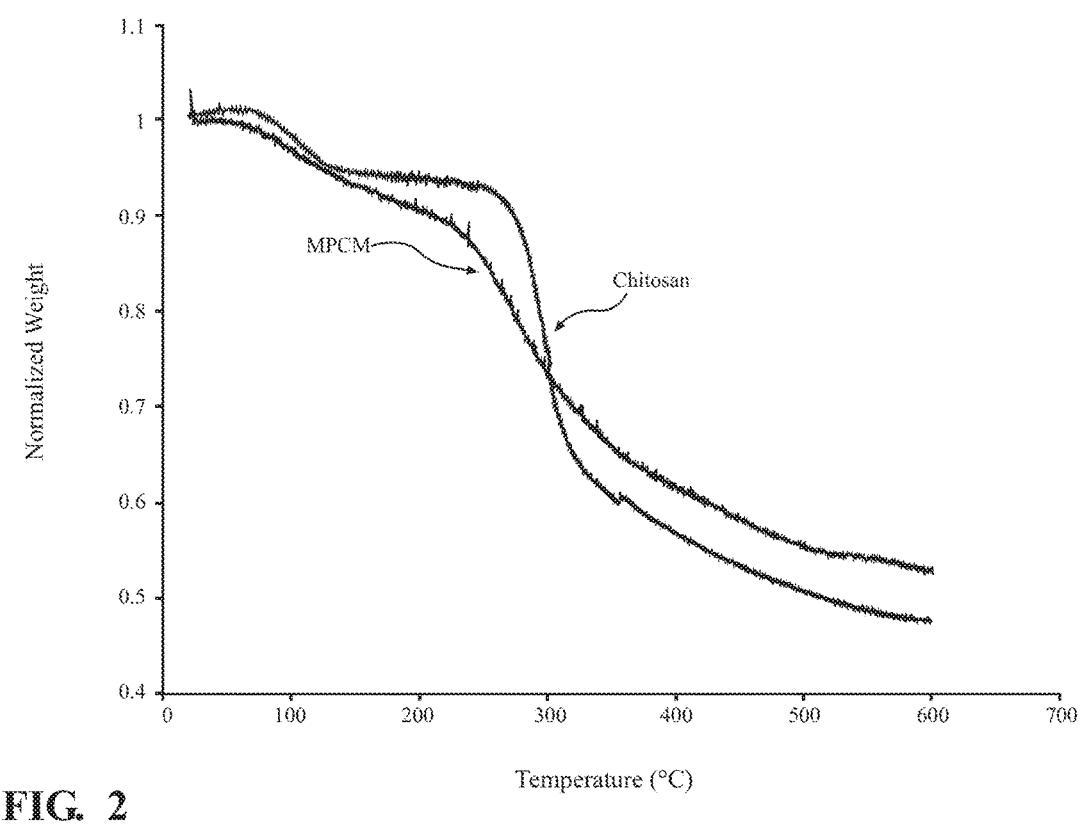
FIG. 2 is a graph showing the results of a thermogravimetric analysis (TGA) of chitosan and an embodiment of MPCM.

TGA analysis of the MPCM as-prepared in the lab and pure chitosan, respectively, was performed using a TGA (TA Instruments) analyzer in a flowing nitrogen atmosphere (200 mL/min). For each experiment, approximately 20 mg of MPCM was heated to the temperature range from 30 to 600° C. in an open alumina crucible at predetermined heating rate. TGA measures the amount and rate of weight change of the sample as it is heated at a specified rate. Thermogravimetric analysis of both MPCM and chitosan was obtained providing complimentary information about changes in composition as heating progresses under controlled conditions. The heating rate in this analysis was set to 5° C./min. TGA profiles as shown in FIG. 2 indicate a two-step decomposition process for pure chitosan while for MPCM it decomposes slowly with the increase in temperature.

Thermogravimetric analysis (TGA) of the chitosan at a heating rate of 5° C./min in nitrogen atmosphere (200 mL/min) indicates that complete dehydration occurs at 250° C. with a weight loss of 8%. The anhydrous chitosan further decomposed in the second step with a weight loss of 32% at 360° C. It was burned out completely at 600° C. with a further 12% loss of weight. The remaining 48% is the burnt residue of the chitosan at 600° C.

In case of MPCM, The complete dehydration occurs at 230° C. with a weight loss of 12%. The anhydrous MPCM burned out completely at 600° C. with a weight loss of 36%. The remaining 52% is the burnt residue of MPCM at 600° C. It may be noted that the combustion product of MPCM is 4% less compared to chitosan, which indicates that MPCM contains 4% of crosslinking agent, such as glutaraldehyde, that was burned out completely in this heating range.

The swelling behavior and acid tolerance of the MPCM material were also evaluated. The swelling behavior of MPCM was performed by immersing it in deionized water and saline solution using a process described by Yazdani-Pedram et al., "Synthesis and unusual swelling behavior of combined cationic/non-ionic hydrogels based on chitosan," Macromol. Biosci., 3, 577-581 (2003).

Swelling behaviour of chitosan was also studied with deionized water and saline solution.

The swelling ratio of the chitosan and MPCM was calculated using the following equation:

$$\text{Swelling ratio}(\%) = [(V_s - V_d)/V_d] \times 100, \quad 1$$

where $V_s$ is the volume of swollen MPCM and $V_d$ is the volume of dry sample. In deionized water it was observed that the chitosan swelled by approximately 105% of its original volume at 24 hours of equilibrium time. MPCM shows very fast swelling behavior reaching approximately 200% increase within five minutes and reaching equilibrium at 24 hours. The swelling studies with deionized water were performed within the pH range of 3 to 6. At equilibrium, the maximum volume of the MPCM was almost 219% more than its dry volume.

Similar swelling behavior of MPCM was also observed for saline (0.9% NaCl) solution. At equilibrium, the MPCM volume increases up to 223% of its original dry volume in saline solution. The results of the swelling studies indicate that the hydrophilicity of the MPCM is greater than chitosan. It is reported that the swelling behavior of chitosan hydrogel depends on the ionisable groups that are present within the gel structure. See Ray et al., Development and Characterization of Chitosan Based Polymeric Hydrogel Membranes, Designed Monomers & Polymers, Vol. 13, 3, 193-206 (2010). Due to protonation of $-NH_2$ groups of MPCM in the solution pH range of 3 to 6, the rapid swelling behavior of MPCM in deionized water can be attributed to high repulsion of $-NH_3^+$ groups. In saline solution, at pH higher than 6, the carboxylic acid groups become ionized and the electrostatic repulsive forces between the charge sites ($COO-$) cause increasing in swelling. See Yazdani-Pedram et al., supra; Radhakumari et al., "Biopolymer composite of Chitosan and Methyl Methacrylate for Medical Applications," Trends Biomater. Artif. Organs, 18, 2, (2005); Felinto et al., "The swelling behavior of chitosan hydrogel membranes obtained by UV- and γ-radiation," Nuclear Instruments and Methods in Physics Research B, 265, 418-424 (2007).

The MPCM sample was submerged in different concentrations of HCl, $HNO_3$, and $H_2SO_4$ acid for 24 hours. Chitosan tends to form a gel in acidic media making it unsuitable for its use in an adsorption column for separation of metal ions from aqueous solutions. One of the main objectives of this study was to make a chitosan-based acid resistant material while exposing more $-NH_2$ groups, which is the active metal binding site for chitosan. Table 1 shows the results for the acid tolerance capacity of MPCM. It was observed that MPCM material shows better HCl tolerance capacity than it does tolerance for $HNO_3$ and $H_2SO_4$. The physical size and shape of MPCM did not show any significant change up to 12M HCl, 12M $H_2SO_4$ and 3.9 M $HNO_3$ solution but the MPCM appeared to be dissolved completely in 7.8 M $HNO_3$ solution. It is evident that the MPCM is more acid resistant compared to chitosan.

TABLE 1

Effect of different concentrations of acid on the physical properties of material

| Sample | HCl Strength of solution | $H_2SO_4$ Strength of Solution | | | | | | $HNO_3$ Strength of Solution | | | | |
|---|---|---|---|---|---|---|---|---|---|---|---|---|
| | 12 M | 18 M | 12 M | 9 M | 7 M | 5 M | 3 M | 15.6 M | 13.3 M | 11.7 M | 7.8 M | 3.9 M |
| Chitosan | x | x | x | x | x | x | x | x | x | x | x | x |
| MPCM | ✓ | x | ✓ | ✓ | ✓ | ✓ | ✓ | x | x | x | x | ✓ |

✓ = not-dissolved
x = tends to form gel or completely dissolve

Figure 3:
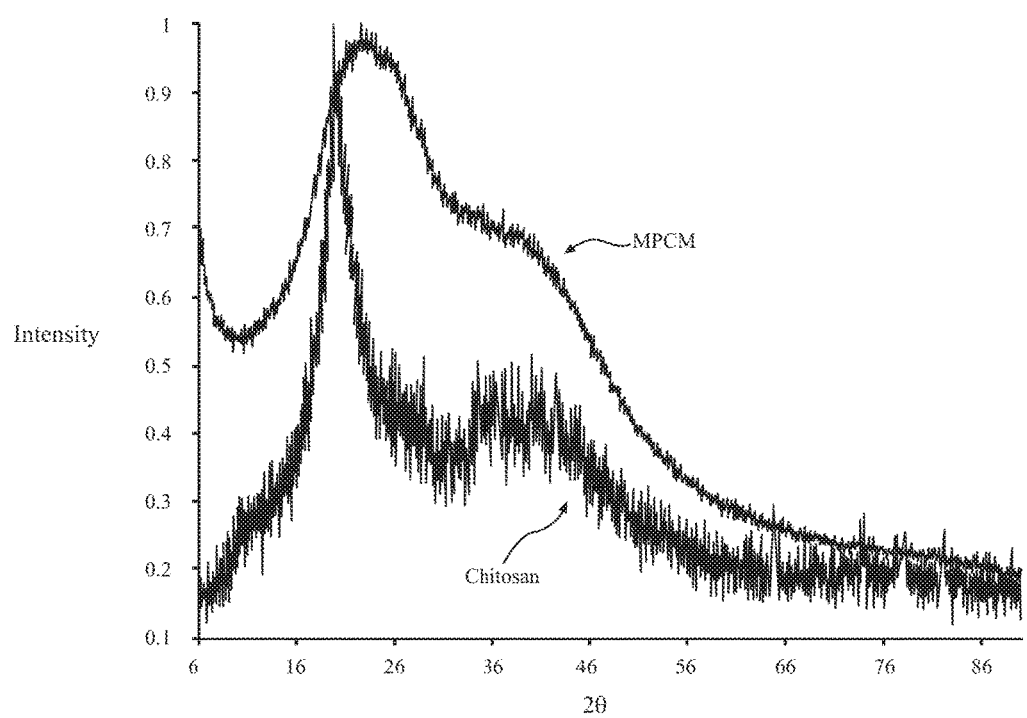
FIG. 3 is a graph showing an X-ray diffraction pattern of chitosan and an embodiment of MPCM material.

FIG. 3 shows the XRD pattern for pure chitosan and MPCM beads. The chitosan sample showed a diffraction peak near 20°, indicative of the relatively regular crystal lattices (110, 040) of chitosan. See Wan et al., "Biodegradable Polylactide/Chitosan Blend Membranes," Biomacromolecules 7(4): 1362-1372 (2006). The peak observed for MPCM is appeared to be broadened suggesting that the MPCM sample is amorphous in nature. It also indicates that chitosan and glutaraldehyde formed a complex in the presence of acid; therefore the crystalline structure of the chitosan was disrupted by the chemical bonding between chitosan and glutaraldehyde.

Figure 4:
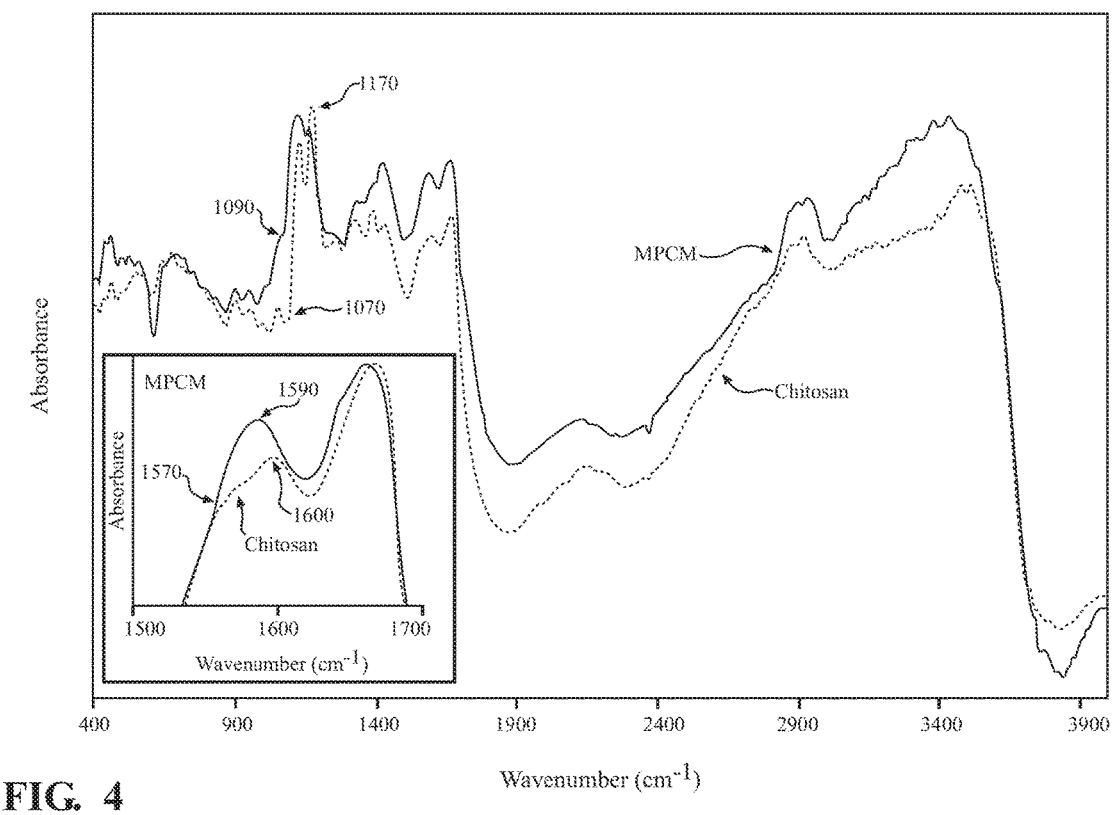
FIG. 4 is a graph showing Fourier Transform Infrared (FTIR) spectra of chitosan and an embodiment of MPCM material disclosed herein.

Fourier Transformed infrared spectra (FTIR) of the MPCM sample prepared above were examined on a BRUKER FTIR spectrometer equipped with a broad-band, $N_2$ cooled mercury-cadmium-telluride (MCT) detector and a KCl beam splitter. FTIR spectra were collected in absorbance mode with 8 cm$^{-1}$ resolution using 128 scans ranged from 400 to 4000 cm$^{-1}$. The intermolecular interactions between chitosan and gluteraldehyde in the presence of HCl acid are reflected by changes in the characteristics of IR peaks. FIG. 4 shows the comparison of IR spectra of chitosan with MPCM. In the region of 2900 cm$^{-1}$ to 3500 cm$^{-1}$ of the spectrum, chitosan and MPCM exhibited peaks at 3498 cm$^{-1}$ and 2950 cm$^{-1}$, respectively, corresponding to the stretching O—H and N—H groups and C—H stretching vibration in CH, and —CH$_2$. The peaks at 1350 to 1450 cm$^{-1}$ indicate alkane C—H bending.

The complicated nature of absorption spectrum in the 1650-1500 cm$^{-1}$ region suggests that aromatic ring bands and double-bond (C═C) vibrations overlap the C═O stretching vibration bands and OH bending vibration bands. The peaks expected in this region of IR spectra include protonated amine (—NH$_3^+$), amine (—NH$_2$), and carbonyl (—CONHR) band. FIG. 4 shows a peak at 1600 cm$^{-1}$ with a shoulder like peak centered at around 1570 cm$^{-1}$ and 1670 cm$^{-1}$ represent —NH$_2$ and amide I, respectively for chitosan. However, the presence of a comparatively sharper peak at 1590 cm$^{-1}$ in MPCM than the peak observed for chitosan suggests the presence of NH$_3^+$ band in the MPCM sample.

The XPS analysis of chitosan and the MPCM sample prepared above was performed to gain a better understanding of intermolecular interaction between chitosan and gluteraldehyde. In the XPS analysis, a survey scan was used to ensure that the energy range was suitable to detect all the elements. The XPS data were obtained using a KRATOS model AXIS 165 XPS spectrometer with monochromatic Mg X-rays (hv=1253.6 eV), which were used as the excitation source at a power of 240 W. The spectrometer was equipped with an eight-channel hemispherical detector, and the pass energy of 5-160 eV was used during the analysis of the samples. Each sample was exposed to X-rays for the same period of time and intensity. The XPS system was calibrated using peaks of UO$_2$(4f7/2), whose binding energy was 379.2 eV. A 0° probe angle was used for analysis of the samples.

Figure 5:
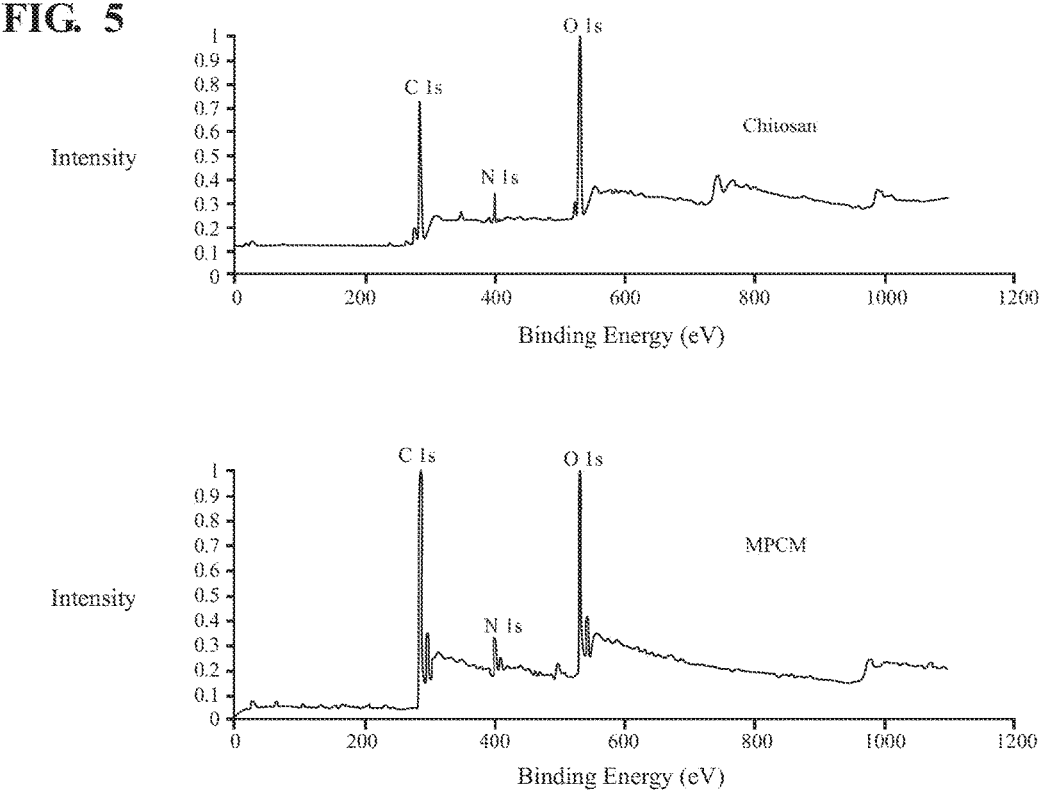
FIG. 5 is a graph showing X-ray photoelectron spectroscopy (XPS) survey scans for chitosan and an embodiment of MPCM.
Figure 6:
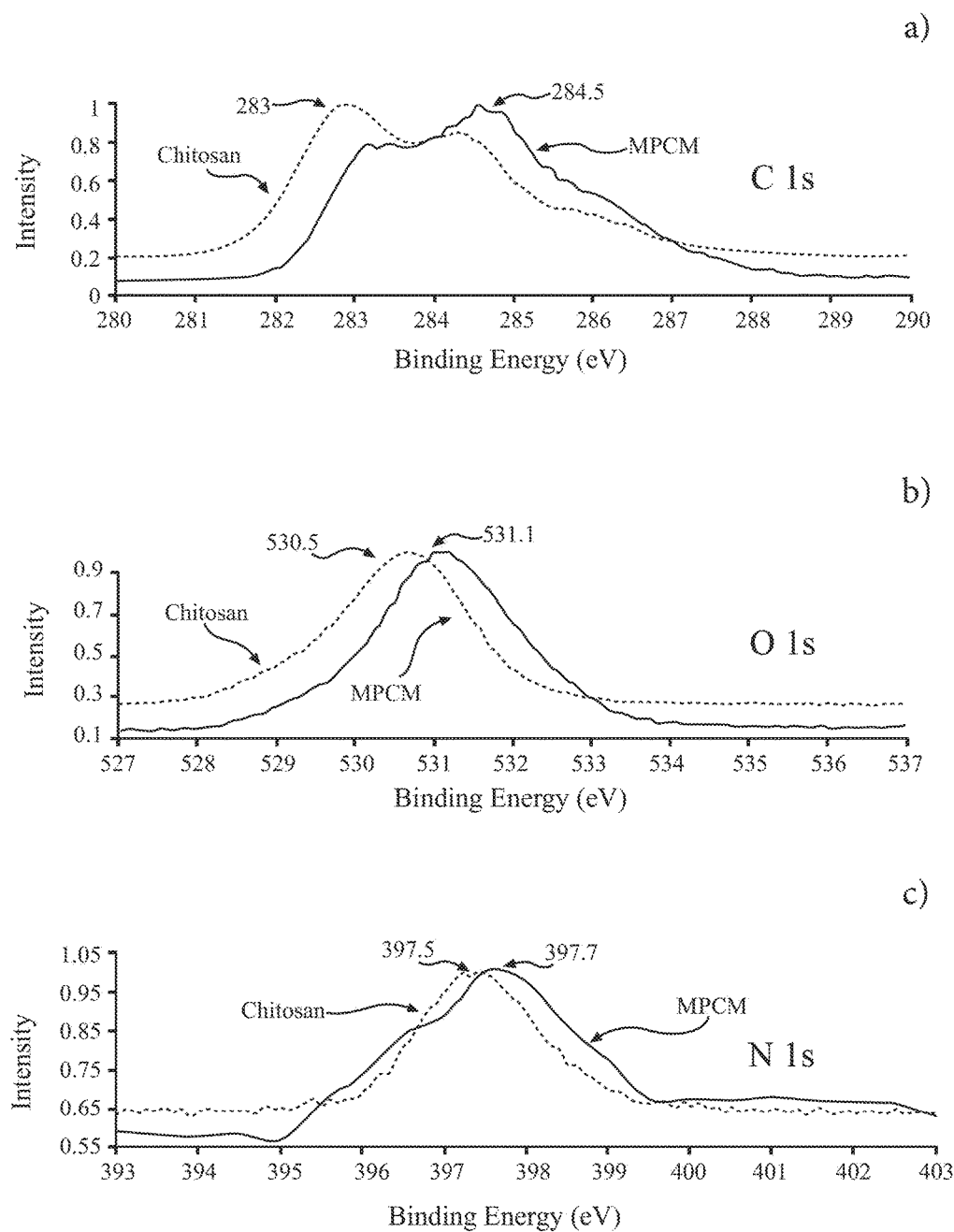
FIG. 6 is a graph showing X-ray photoelectron spectroscopy (XPS) spectra for chitosan and an embodiment of MPCM.

FIG. 5 shows the peak positions of C 1s, O 1s, and N 1s obtained by the survey scan of chitosan and the MPCM sample prepared above, respectively. FIG. 6 shows the peak positions in detail for C 1s, O 1s, and N 1s present in chitosan and MPCM. The C-1s peak observed showed two peaks on deconvolution, one for C—N at 284.3 eV and the other one for C—C at 283.5 eV (FIG. 6a). In the MPCM sample, the C—Cs peak appears to be folded and shifted slightly, whereas the C—N peak showed higher intensity compared to chitosan (FIG. 6a). The peaks for oxygen containing groups (O 1s) were found at 530.5 eV and 531.1 eV for chitosan and MPCM, respectively (FIG. 6b).

Compared with the C 1s and O1s peaks of MPCM, it was observed that the C—C peak of chitosan at 283.5 eV folded and O1s peak shifted from 530.5 eV to 531.1 eV due to cross-linking reaction with glutaraldehyde. This suggests that the O1s component may be single bonded corresponding to —OH or C—O moiety in the structure for different surface oxygen containing functional groups. See Wen et al., "Copper-based nanowire materials: Templated Syntheses, Characterizations, and Applications," Langmuir, 21, 10, 4729-4737 (2005). Chemical shifts are considered significant when they exceed 0.5 eV. See Hasan et al., "Adsorption of divalent cadmium from aqueous solutions onto chitosan-coated perlite beads," Ind. Eng. Chem. Res., 45, 5066-5077 (2006). As a result, shifting of the O 1s peak in MPCM sample also indicates that the glutaraldehyde reacted with oxygen-containing functional groups of chitosan. The XPS data suggests that the chemical binding of glutaraldehyde occurs with the —CH$_2$OH or OH groups on the chitosan structure which is also in agreement with the data obtained from FTIR analysis (FIG. 4).

The N 1s peak for chitosan was at 397.5 eV (FWHM 1.87) for nitrogen in the —NH$_2$ group of chitosan (FIG. 5c); for the MPCM the N 1s peak appeared at 397.7 eV. One of the objectives for investigating the N 1s peak was to identify whether amine groups, which are active metal binding sites for chitosan, were involved in cross-linking reactions with glutaraldehyde. FIG. 6c shows a strong N1s peak for MPCM at 397.7 eV, which can be assigned to —NH$_2$ groups, suggesting that the amine groups of chitosan were not affected by the cross-linking reaction with glutaraldehyde. This is also evident from the FTIR spectra (FIG. 4).

Table 2 shows the XPS data for surface elemental analysis of the sample of MPCM, as determined from the peak area, after correcting for the experimentally determined sensitivity factor (±5%). It has been found that by preparing porous chitosan based material, in this case the embodiment of MPCM described above, results in the exposure of more NH$_2$ groups on the surface of the material. The nitrogen concentration, as determined from the N 1s peak on the sample of MPCM, was almost twice that calculated for chitosan (Table 2). It is believed that the nitrogen content in the MPCM came entirely from chitosan. The high nitrogen content in the MPCM, as shown in the Table 2, was due to the microporous nature of the MPCM which makes more amine groups available on the surface than is the case in the nonporous chitosan. This is also consistent with the results reported by Hasan et al., supra, obtained by dispersing chitosan onto perlite. The changes in peak intensity of C 1s and binding energy of O 1s peaks at 531.0 eV of the MPCM sample compared to chitosan are believed to be due to the reaction with glutaraldehyde in presence of acid as a catalyst.

TABLE 2

Absolute Binding Energy (BE) for the elements present in the chitosan and MPCM obtained from X-ray Photoelectron Spectroscopy (XPS) Analysis.

| | C 1s | | N 1s | | O 1s | |
|---|---|---|---|---|---|---|
| Sample | BE (eV) | Atomic weight (%) | BE (eV) | Atomic weight (%) | BE (eV) | Atomic weight (%) |
| Chitosan | 283.5 | 57.61 | 397.5 | 3.91 | 530.5 | 28.11 |
| MPCM | 284 | 72.09 | 397.7 | 6.85 | 531.1 | 19.29 |
| MPCM-I* | 283.5 | 72.25 | 397.5 | 5.49 | 531.1 | 19.72 |

*MPCM-I sample after irradiation at 50,000 krad using $^{60}$Co γ-source.

The energy dispersive spectroscopy (EDS) X-ray microanalysis was performed on the same MPCM sample as was used for the SEM micrograph. The EDS microanalysis was used for elemental analysis of MPCM (FIG. 7). The peaks for carbon, oxygen, and nitrogen are shown at 0.3 keV, 0.36, and 0.5 keV, respectively, which are the main components of chitosan (FIG. 7a, 7b). Due to the reaction with glutaraldehyde, the intensity of the carbon peak for MPCM increases; whereas, the intensity of the oxygen peak decreases in comparison to chitosan (FIG. 7b). FIG. 7b also shows that the nitrogen peak present in the MPCM sample shifted, due to protonation of amine groups (—$NH_2$) compared to the nitrogen peak in chitosan. Based on the FTIR, EDS, and XPS analysis, and without wishing to be bound by theory, the possible reaction mechanisms of glutaraldehyde with the —OH groups of chitosan through the formation of acetal bonds are given in FIG. 8.

Figure 9:
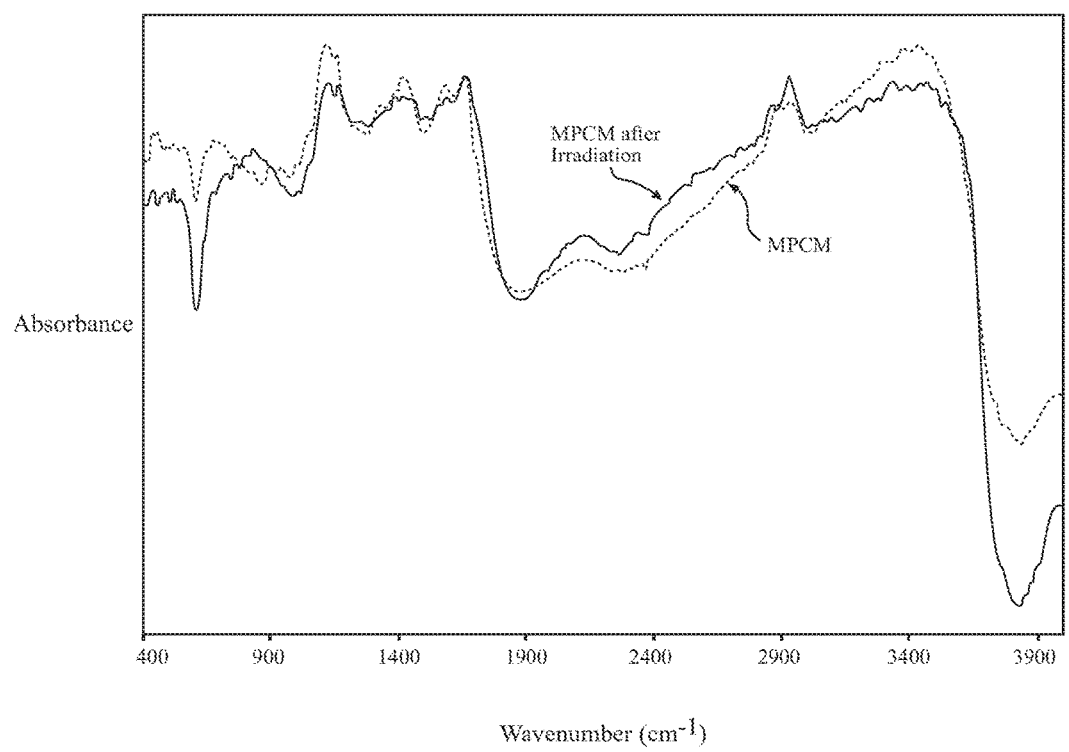
FIG. 9 is a graph showing FTIR spectra of an embodiment of modified chitosan disclosed herein before and after irradiation.

The MPCM sample described above was evaluated for radiation stability by irradiation with a $^{60}$Co source. The IR spectra of the MPCM composite sample before and after being irradiated using a $^{60}$Co source are shown in FIG. 9. The results in FIG. 9 shows that the MPCM sample suspended in water at pH 3.0 can tolerate γ-radiation to about 50,000 krad without losing a substantial percentages of its identity.

Figure 7:
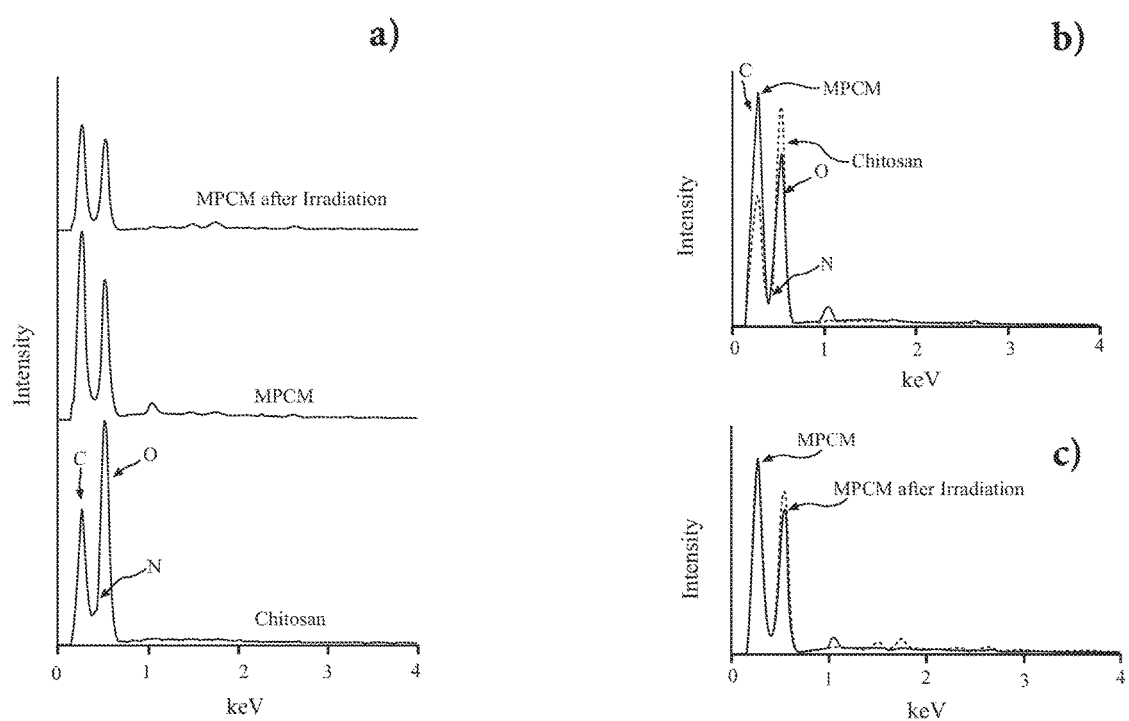
FIG. 7 is a graph of energy-dispersive X-ray spectrometry (EDS) microanalysis spectra of an embodiment of MPCM herein.
Figure 8:
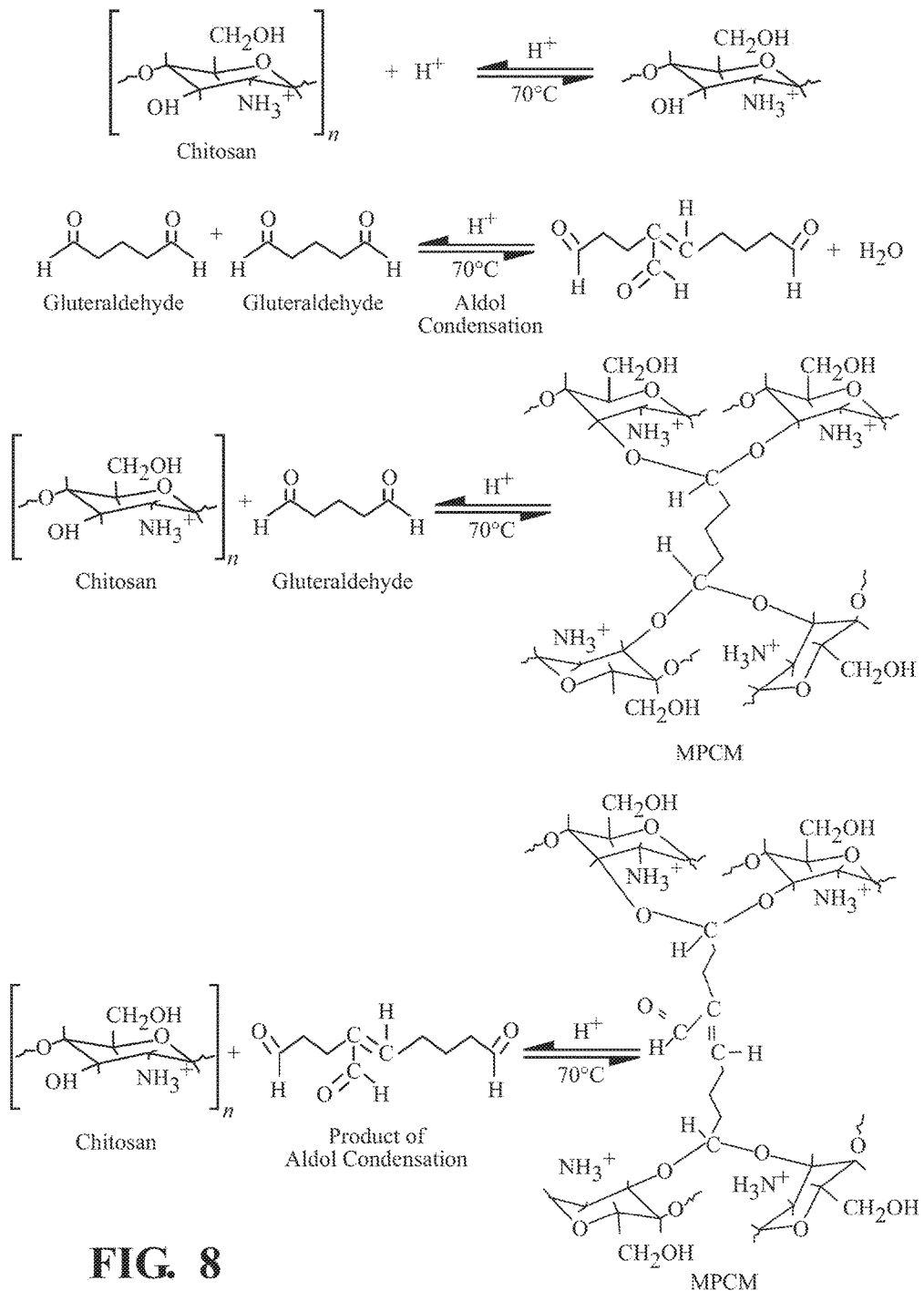
FIG. 8 is a schematic diagram showing a reaction pathway for the preparation of an embodiment of MPCM described herein.
Figure 10:
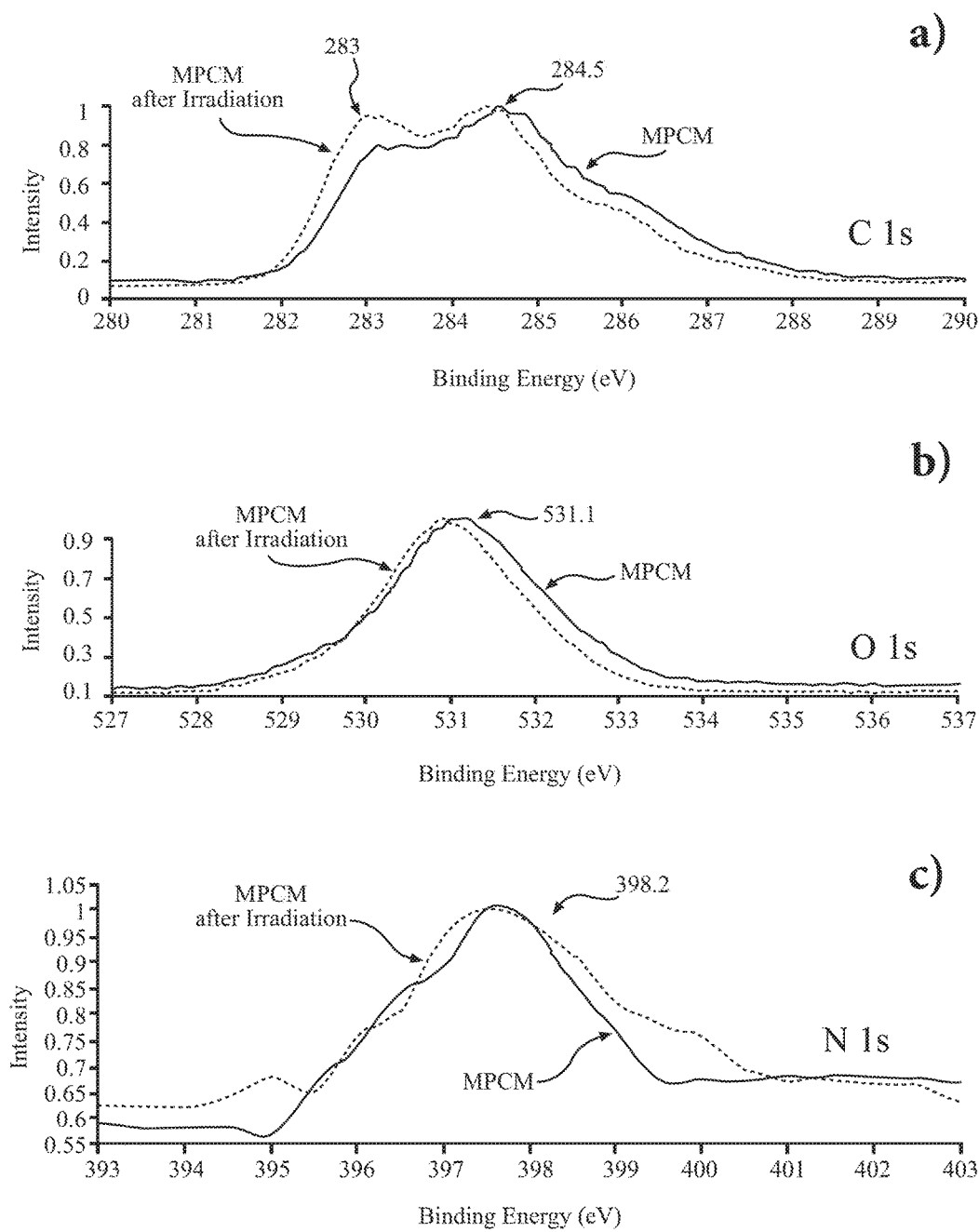
FIG. 10 is a graph showing X-ray photoelectron spectroscopy (XPS) spectra for an embodiment of MPCM before an after radiation.

FIG. 7c shows EDS spectra of chitosan and MPCM particles before and after irradiation at 50,000 krad with a $^{60}$Co source. FIG. 7c indicates that the intensity of carbon, oxygen, and nitrogen peaks did not change substantially after irradiation of the sample. FIG. 10 shows the peak positions of carbon, oxygen, and nitrogen obtained by the XPS analysis of the MPCM sample before and after irradiation. It was observed that the magnitude of total C 1s peak binding energy changed after irradiation as shown in Table 2. The C 1s peak for the MPCM sample was 283.5 eV, while for the MPCM sample after irradiation; two peaks were observed at 283.5 and 284.5 eV (FIG. 10a). The N1s peak present in the MPCM sample after irradiation around 397.5 eV can be assigned to $NH_2$ groups in the MPCM structure. No change was observed for O-1s peak of the irradiated MPCM sample. The magnitude of the binding energy shift depends on the concentration of different atoms, in particular on the surface of a material. In comparison with the XPS (FIG. 10a-c), the N 1s and O 1s peak of the MPCM sample did not shift before and after irradiation (Table 2), indicating that the chemical state of N atoms was not much affected after irradiation. This is also reflected in the EDS and FTIR spectra as shown in FIGS. 7 and 9.

The MPCM sample described above was evaluated for molybdenum sorption using batch techniques. About 1.0 gram of MPCM adsorbent was suspended in 100 mL solution containing ammonium molybdate in the range of 1 mmole/L to 94 mmole/L. The initial pH values of solutions were adjusted from 2.0 to 8.0 using either 0.01 M NaOH or 0.1 M HCl solution. The solutions were then kept in a shaker (160 rpm) for 24 hrs at 298K. After 24 hrs, the final pH was recorded for each solution and the solutions were centrifuged for 5 minutes at 3000 rpm to separate the supernatant from the solution. The supernatant was then filtered through a 0.45-μm membrane filter and the filtrate was analyzed for molybdenum removal by an Inductively Coupled Plasma (ICP) (Agilent 7700X) that is equipped with mass spectroscopy for molybdenum detection. The adsorption isotherm was obtained by varying the initial concentration of molybdenum in the solution. The amount of molybdenum adsorbed per unit mass of adsorbent ($q_e$) was calculated using the equation, $$q_e = \frac{(C_i - C_e)V}{M}$$

where $C_i$ and $C_e$ represent initial and equilibrium concentrations in mg/L, respectively, V is the volume of the solution in liters (L), and M is the mass of the adsorbent in gram (g).

Figure 11:
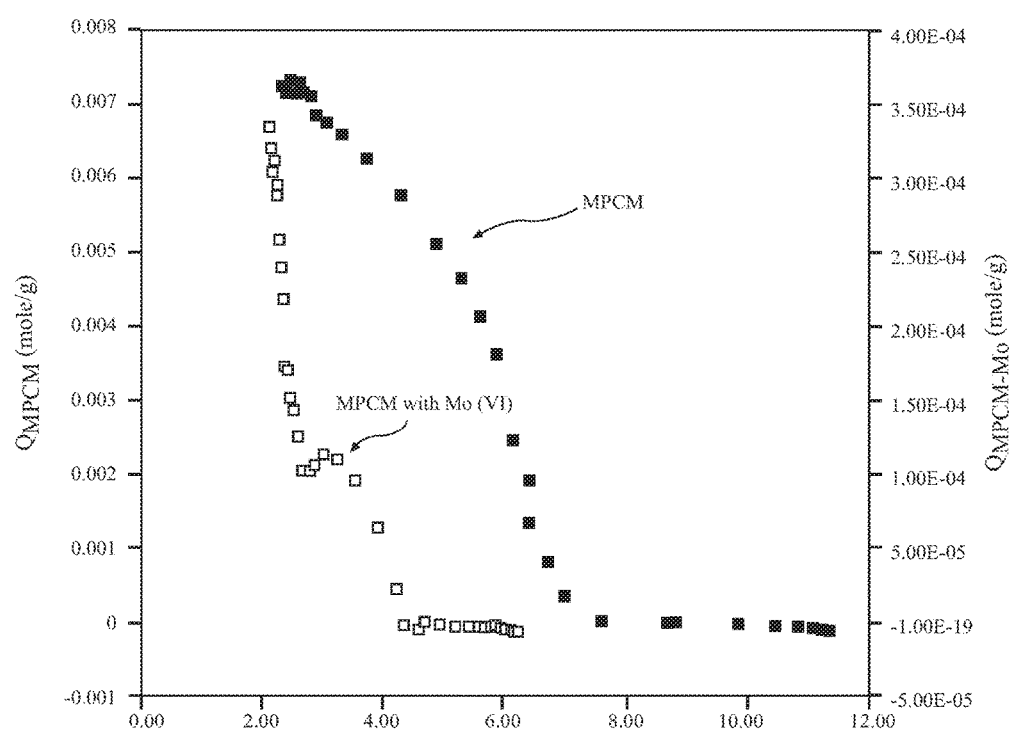
FIG. 11 is a graph showing surface charge of an embodiment of MPCM with and without exposure to 1% of Mo (VI) in solution in the presence of 1 M $NaNO_3$.

The surface charge of a bead of MPCM sample was determined by a standard potentiometric titration method in the presence of a symmetric electrolyte, sodium nitrate, as per Hasan et al., supra. The magnitude and sign of the surface charge was measured with respect to the point of zero charge (PZC). The pH at which the net surface charge of the solid is zero at all electrolyte concentrations is termed as the point of zero charge. The pH of the PZC for a given surface depends on the relative basic and acidic properties of the solid and allows an estimation of the net uptake of $H^+$ and $OH^-$ ions from the solution. The results are shown in FIG. 11.

The PZC value of the sample of MPCM prepared as described above was found to be 8.8, which was similar to that reported by Hasan et al., supra, for chitosan coated perlite bead. However, it is reported that the PZC value of pure chitosan is within the pH range of 6.2 to 6.8. See Hasan et al., supra. It is observed from FIG. 11 that a positively charged surface prevailed at a relatively low pH range. The surface charge of MPCM was almost zero in the pH range of 7.5 to 8.8. The protonation of the MPCM sharply increased at the pH range of 7.5 to 2.5 making the surface positive. At pH below 2.5, the difference between the initial pH and the pH after the equilibration time was not significant, suggesting complete protonation of amine (—$NH_2$) groups present in MPCM. At higher pH, 7.5 to 8.8, the surface charge of the MPCM slowly decreased, indicating slow protonation of MPCM. In case of chitosan, the extent of protonation is reported to be as high as 97% at a pH of 4.3. However, it decreases as the pH increased. The extent of protonation of chitosan surface is reported to be 91%, 50%, and 9% at pH 5.3, 6.3, and 7.3, respectively. See Hasan et al. "Dispersion of chitosan on perlite for enhancement of copper (II) adsorption capacity" Journal of Hazardous Materials, 52 2, 826-837, 2008.

Without wishing to be bound by theory, it is believed that the PZC value of 8.8 and the behavior of the surface charge of the MPCM is due to the modification of chitosan when cross-linked with glutaraldehyde in the presence of acid as a catalyst, which makes it amphoteric in nature in the pH range of 7.5 to 8.8.

Figure 12:
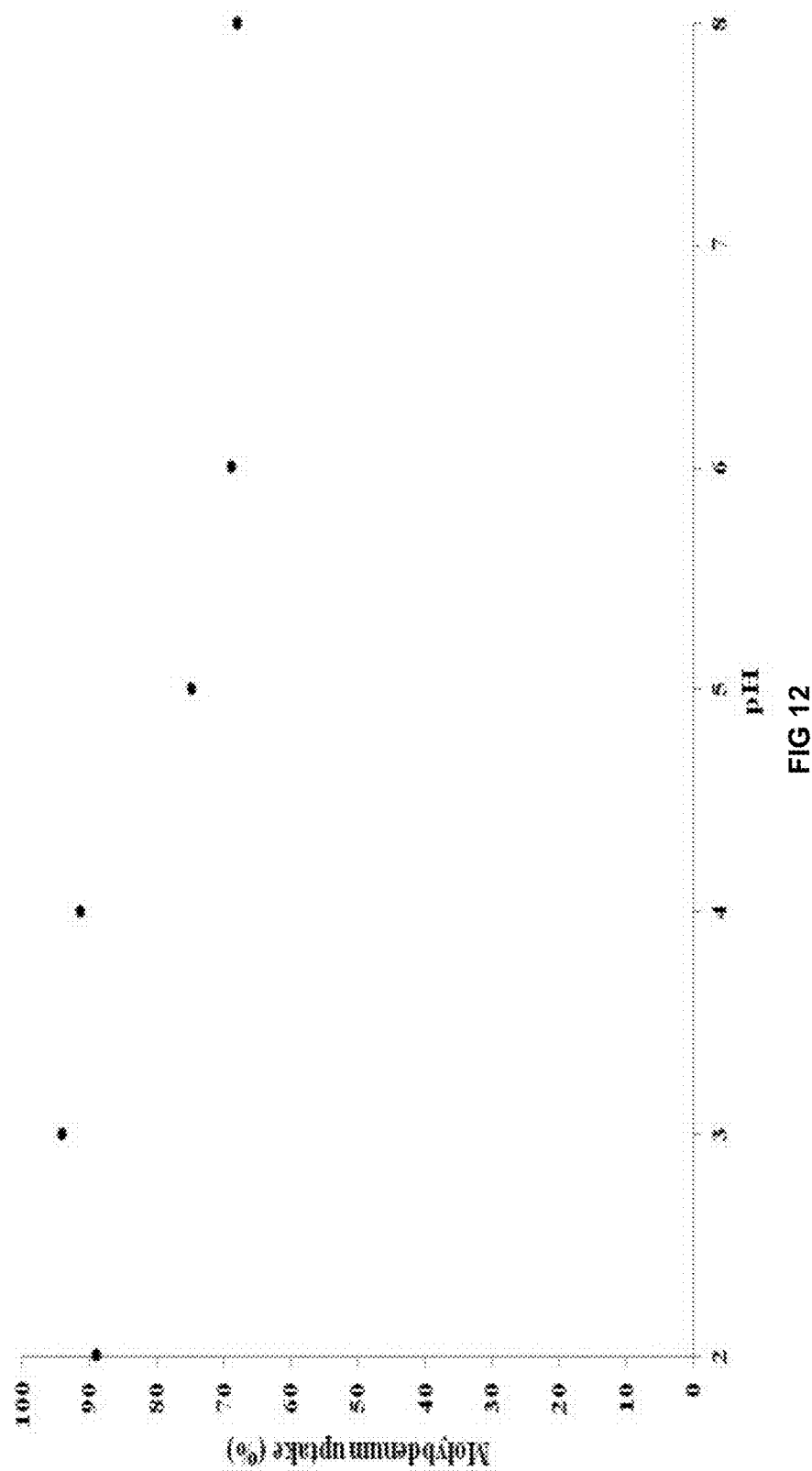
FIG. 12 is a graph showing the effect of pH on molybdate sorption on an embodiment of MPCM, with initial conditions of a concentration of 5.21 mmol/L and temperature 298 K.

The effect of pH on adsorption of molybdenum by MPCM was studied by varying the pH of the solution between 2 and 8 (FIG. 12). The pH of molybdenum solutions were first adjusted between 2 and 8 using either 0.1N $H_2SO_4$ or 0.1M NaOH, and then MPCM was added. As the adsorption progressed, the pH of the solution increased slowly. No attempt was made to maintain a constant pH of the solution during the course of the experiment. The amount of molybdenum uptake at the equilibrium solution concentration is shown for each different initial pH of the solution in FIG. 12. The uptake of molybdenum by MPCM increased as the pH increased from 2 to 4. Although a maximum uptake was noted at a pH of 3, as the pH of the solution increased above 6, the uptake of molybdenum onto MPCM started to decrease. Accordingly, experiments were not conducted at a pH higher than the PZC of the MPCM sample.

In order to adsorb a metal ion on an adsorbent from a solution the metal should form an ion in the solution. The types of ions formed in the solution and the degree of ionization depends on the solution pH. In the case of MPCM, the main functional group responsible for metal ion adsorption is the amine (—$NH_2$) group. Depending on the solution pH, these amine groups can undergo protonation to $NH_3^+$ or $(NH_2—H_3O)^+$, and the rate of protonation will depend on the solution pH. Therefore, the surface charge on the MPCM will determine the type of bond formed between the metal ion and the adsorbent surface. Depending on the solution pH, molybdenum in an aqueous solution can be hydrolyzed with the formation of various species. At relatively high and low pH values both the $MoO_4^{2-}$ and various isopolyanions (mainly $Mo_8O_{24}^{6-}$) predominate. The $MoO_4^{2-}$ anion undergoes formation of many different polyanions in acidic solutions. See Guibal et al., "Molybdenum Sorption by Cross-linked Chitosa Beads: Dynamic Studies". Water Environment Research, 71, 1, 10-17, 1999; Merce et al., "Molybdenum (VI) Binded to Humic and Nitrohumic Acid Models in Aqueous Solutions. Salicylic, 3-Nitrosaliculic, 5-Nitrosalicylic and 3,5 Dinitrosalicylic Acids, Part 2" J. Braz. Chem. Soc., 17, 3, 482-490, 2006. It is reported that even if the polyanion is present in the solution the adsorption still occurs via $MoO_4^{2-}$ formation. See Jezlorowski et al., "Raman and Ultraviolet Spectroscopic Characterization of Molybdena on Alumina" The Journal od Physical Chemistry, 83, 9, 1166-1173, 1979; El Shafei et al., "Association of Molybdenum Ionic Species with Alumina Surface," Journal of Colloid and Interface Science, 228, 105-113, 2000. The degradation of polyanions in the solution occurs due to an increased local pH close to the adsorbent surface.

As noted above, it was observed that the MPCM had a maximum adsorption capacity at a pH of around 3 from a solution of molybdenum ions. Without wishing to be bound by theory, it is believed that the amine group of the MPCM has a lone pair of electrons from nitrogen, which primarily act as an active site for the formation of a complex with a metal ion. As mentioned earlier, at lower pH values, the amine group of MPCM undergoes protonation, forming $NH_3^+$ leading to an increased electrostatic attraction between $NH_3^+$ and sorbate anion. Since the surface of MPCM exhibits positive charge in the pH range of 2.5 to 7.5, the anionic molybdenum (Mo (VI)) is presumably the major species being adsorbed by Coulombic interactions. As mentioned earlier, the pH of the solution was found to increase after adsorption, which can be attributed to the $H^+$ ions released from the surface of the MPCM as the result of sorption of the molybdenum-containing anions from solution. In the case of MPCM, the protonation of $NH_2$ groups occurs at a rather low pH range. The fact that pH of the solution increased as the adsorption progressed suggests that Mo (VI) formed a covalent bond with a $NH_2$ group.

Figure 13:
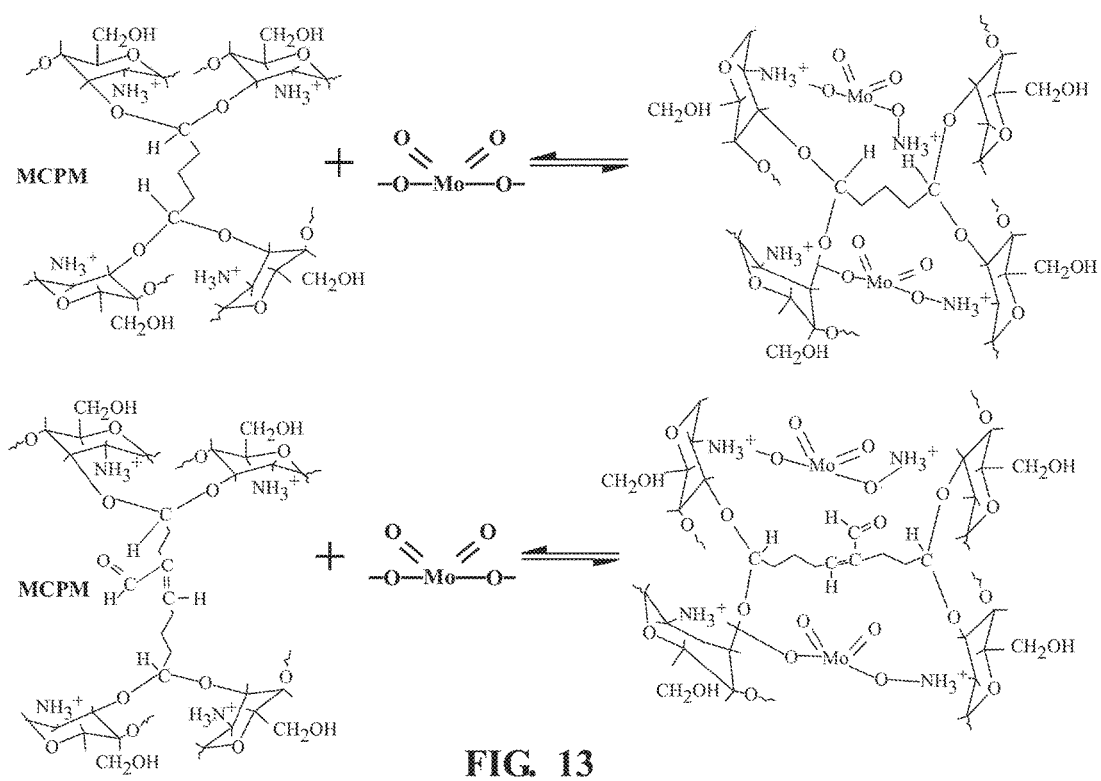
FIG. 13 is a schematic diagram showing reaction mechanisms for sorption of Mo (VI) onto an embodiment of MPCM from aqueous solution.

As the equilibrium pH increased from lower pH toward the pH at the PZC ($pH_{PZC}$), the decreased percentage removal of Mo (VI) was attributed to the decreasing electrostatic attraction between the surface of MPCM and anionic Mo (VI) species. It may be noted that the PZC of MPCM is found to be shifted towards 4.5 in the presence of molybdenum ions, as compared to the PZC of MPCM without said ions (FIG. 11). The shift of PZC of MPCM towards lower pH indicates strong specific adsorption and inner-sphere surface complexation occurs due to molybdenum adsorption. Similar findings were reported by with the adsorption of molybdenum onto gibbsite. See Goldberg, S. "Competitive Adsorption of Molybdenum in the Presence of Phosphorus or Sulfur on Gibbsite," Soil Science, 175, 3, 105-110, 2010. Based on the surface charge analysis and pH studies, the reaction mechanisms that are occurs between the surface of MPCM and molybdenum species in solution are given in FIG. 13.

The equilibrium adsorption isotherm of molybdenum uptake on MPCM was determined at 298K temperature in the concentration range of 1 mmole/L to 94 mmole/L. As mentioned in the previous section, the maximum adsorption capacity of molybdenum on MPCM occurs at a pH of 3. Therefore, the equilibrium isotherm experiments were carried out at a pH of 3, if not stated otherwise. The concentration profiles during molybdenum uptake by the MPCM from various concentrations of the solution shows that approximately 60% of molybdenum was adsorbed during the first 4 hours of an experimental run. The equilibrium was attained monotonically at 24 hours in most of the experimental runs.

The MPCM material contains amino groups that are available for characteristic coordination bonding with metal ions. Adsorption of metal ion, when pH dependent, may be described by the following one-site Langmuir equation. The effect of pH was incorporated by introducing a parameter "a" that is dependent on pH of the solution. The expression is given below:

$$-SH \leftrightarrow -S + H^+; \quad K_H \ S: \text{surface concentration} \qquad 3$$

$$-S + M \leftrightarrow -SM; \quad k_M \ M: \text{metal ion} \qquad 4$$

$$q = \frac{q_m \alpha K_m [M]}{1 + \alpha K_m [M]}; \qquad 5$$

Figure 14:
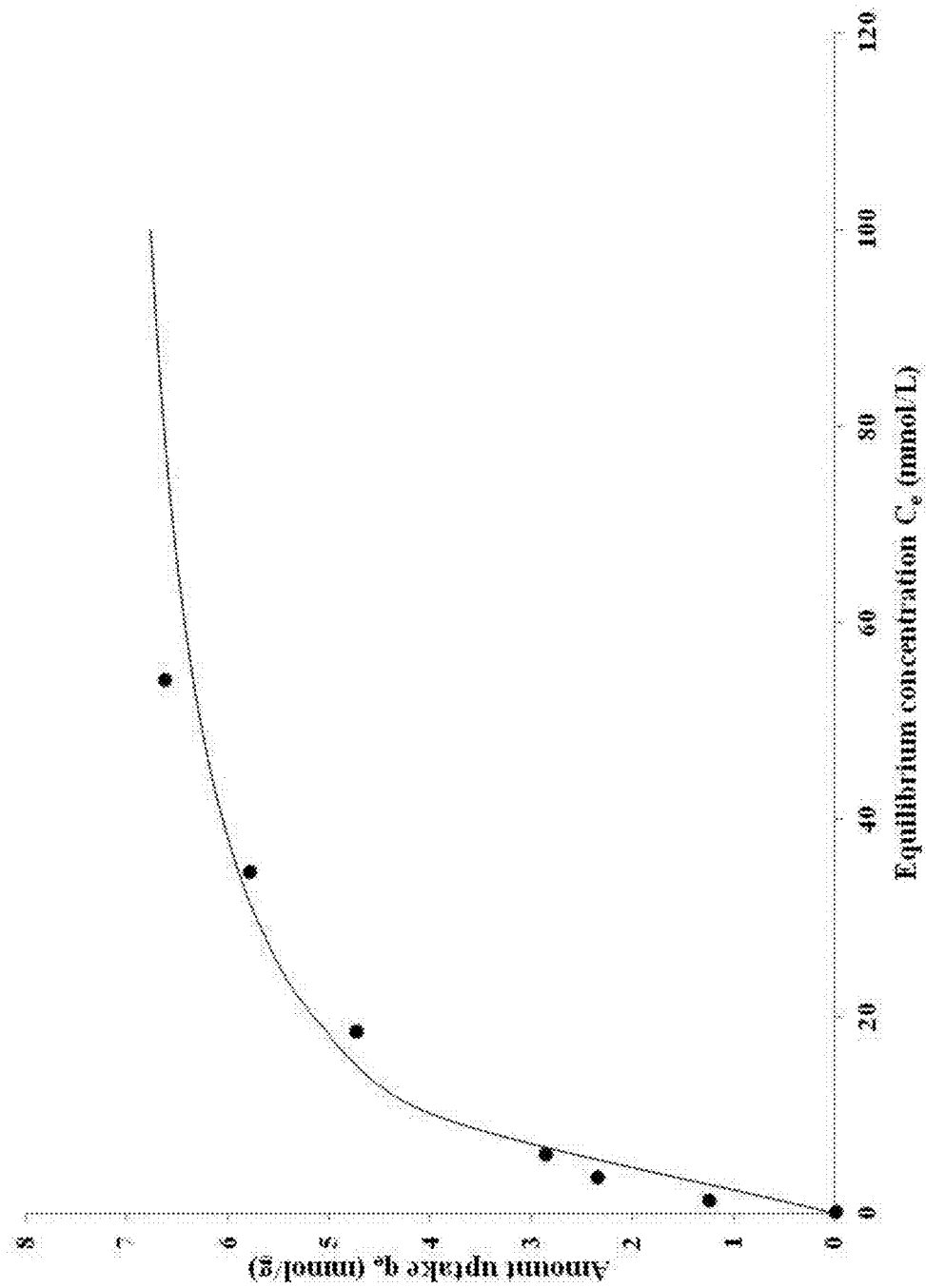
FIG. 14 is a graph showing equilibrium sorption isotherms for Mo (VI) uptake on an embodiment of MPCM, showing experimental data (•) correlated with the Langmuir isotherm model (solid line) under conditions where the concentration of Mo(VI) in solution is in the range of 1 mmol/L to 94 mmol/L, temperature 298 K, pH ~3.

$q_m$ = maximum adsorption amount of metal ions (mmole/g)

$$\alpha = \frac{K_H}{(K_H + [H^+])} \qquad 6$$

where q is the adsorption capacity corresponding to metal ion concentration [M], $q_m$ is the maximum adsorbed amount of molybdenum ions (mmol/g), $[H^+]$ the hydrogen ion concentration, $K_H$ and $K_M$ are equilibrium concentration. Equation 5 was used to correlate the adsorption capacity of the MPCM. The equilibrium data for molybdenum could be correlated with the Langmuir equation within ±5% of experimental value. The constants of Equation 5 are obtained by non-linear regression of the experimental data and are given in Table 3. It was noted that Equation 5 represented the adsorption behavior of molybdenum on the MPCM adequately (FIG. 14). The adsorption isotherm data obtained at pH 3 showed Type I behavior.

This suggests a monolayer adsorption of molybdenum on MPCM. Table 3 shows the maximum adsorption capacity of MPCM for Mo (VI), using Langmuir Equation (Equation 5). It was noted that the adsorption capacity of MPCM for molybdenum is approximately ~6.25 mmol Mo/g of MPCM at 298K when the equilibrium concentration of Mo(VI) in the solution was 54.1 mmol/L and the initial pH of the solution was 3.0 (FIG. 14). The $NH_2$ groups of MPCM are the main active sites for molybdenum adsorption. As can be seen from the FIG. 13, two $NH_2$ groups will be necessary for the adsorption of one molybdenum ion. Other surface sites such as $CH_2OH$ or OH groups of MPCM might have been involved in adsorbing molybdenum at the solution pH of 3. The adsorption capacity of MPCM that was irradiated at 50,000 krad was also performed for molybdenum uptake from aqueous solution. It was observed that the adsorption capacity of irradiated MPCM did not change substantially as shown in Table 3.

TABLE 3

Estimated parameters for the Langmuir model

| Sample | Metal ion uptake | pH | $\alpha_1$ | $K_m$ | Maximum uptake capacity (using Equation 5) (mmol/g) |
|---|---|---|---|---|---|
| MPCM | Mo(VI) | 3 | 0.25 | 0.4708 | 7.34 |
| *MPCM-I | Mo(VI) | 3 | 0.25 | 0.2194 | 6.54 |

*MPCM-I: Sample after irradiation at 50,000 krad $^{60}$Co γ-source.

Figure 15A:
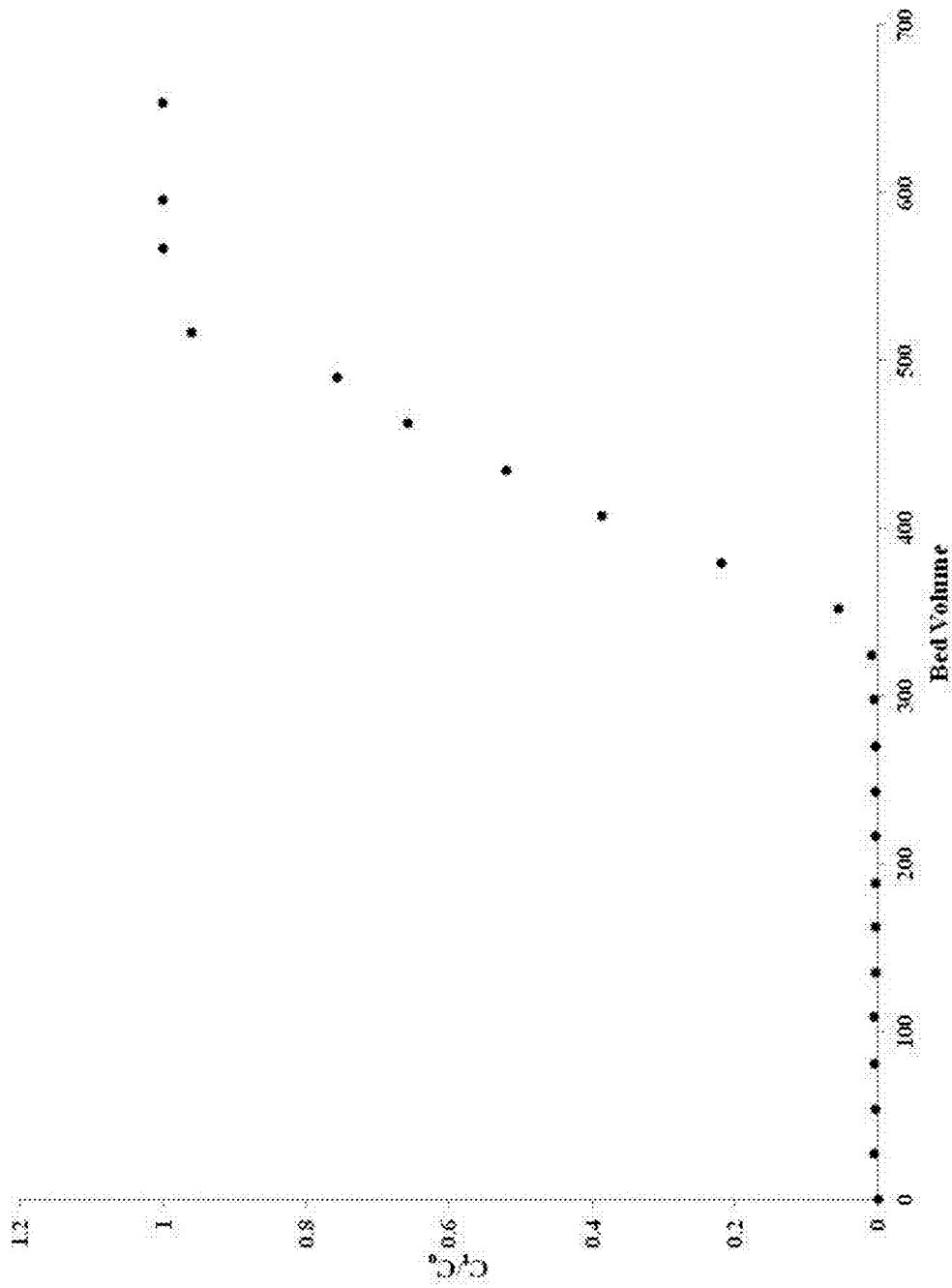
FIG. 15a is a graph showing a breakthrough curve for Mo (VI) sorption on a bed of MPCM, the inlet influent concentration was 5.21 mmole Mo (VI)/L at the pH of 3.
Figure 15B:
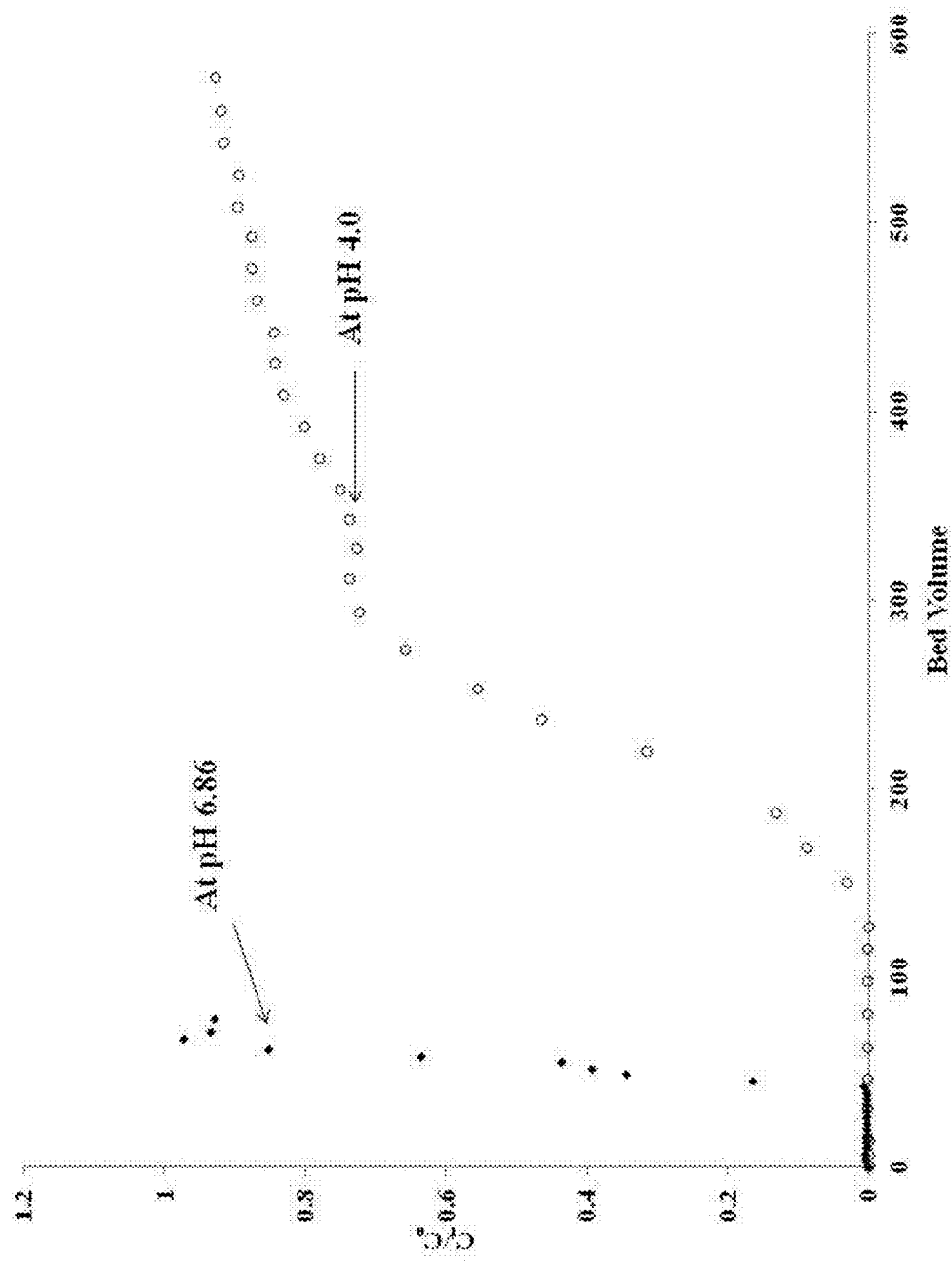
FIG. 15b is a graph showing the effect of influent solution pH on the breakthrough curve for Mo (VI) from a column packed with an embodiment of MPCM, The inlet influent concentration was 5.21 mmole Mo (VI)/L with 153.8 mmole NaCl/L at the pH of 4 to 7, respectively. For both figures, the bed height of the column was 3.2 cm. the inlet influent flow rate was 1 mL/min.

A column was used to study the adsorption of Mo (VI) with or without the presence of ions in the solution under dynamic conditions. Approximately 1.125 gram of MPCM was used to make a 2.5 cm$^3$ column with 0.5 cm inner diameter and 3.2 cm height. A flow rate of 1 mL/minute was used during a run. The run was continued for 1500 minutes, and samples at the bed out let were collected at a regular time intervals. The bed becomes saturated during this time period, as indicated by the outlet Mo (VI) concentration. When the inlet concentration was 5.21 mmole Mo (VI)/L at pH 3 and the flow rate was 1 mL/minute through the column, molybdenum broke through the column after 320 bed volumes (FIG. 15a). Complete saturation of the column occurred after 500 bed volumes. Breakthrough curves were also obtained from a mixed solution containing 5.21 mmole Mo (VI)/L and 153.8 mM NaCl/L at pH 6.86 and 4.0, respectively (FIG. 15 b). In both cases, the solution was passed through a similar size of column as mentioned earlier maintaining same bed height and flow rate. It was observed that column broke through quickly at 42 bed volume for the mixed solution with pH 6.86 however approximately 125 bed volumes were required to break through the column for the mixed solution with pH 4.0. It is important to note that the break through time for molybdenum solution with 153.8 mM NaCl/L can be delayed, through the use of larger quantity of MPCM adsorbent and a longer column. The objective was to investigate the effect of inlet mixed solution pH on the breakthrough characteristic of Mo (VI) from the column, therefore, no attempt were made to determine the bed length to prolong the breakthrough time for mixed solution.

The long lived technetium ($^{99}$Tc) was used to evaluate the performance of MPCM to adsorb technetium with and without the presence of other ions from an aqueous solution in the pH range of 3 to 11. Technetium is chemically inert and has multiple oxidation states ranging from I to VII. The most dominant species of technetium that is found in aqueous waste streams is pertechnetate (TcO$_4^-$) See Gu et al., Development of Novel Bifunctional Anion-Exchange Resin with Improved Selectivity for Pertechnetate sorption from contaminated groundwater, Environ. Sci. Technol., 34, 1075-1080, 2000. The adsorption of pertechnetate (TcO$_4^-$) from an aqueous solutions on MPCM was studied under batch equilibrium conditions following a process outlined elsewhere. The effect of pH on technetium adsorption onto MPCM was evaluated over the pH range of 3 to 11 using a solution containing of 0.11 μmole technetium/L with and without the presence of 0.9% NaCl, respectively. While studying the effect of pH on the adsorption capacity, the initial pH of the solutions was adjusted to a desired value by adding either 0.1M HCl or 0.1 M NaOH. The pH of the solution was not controlled during the adsorption process. Following the adsorption experiments, the solutions were filtered and the activity of $^{99}$Tc in the filtrate, which was collected in a vial at a predetermined time, was evaluated using a liquid-scintillation counter (Packard Tricarb 2900TR). The amount of technetium adsorbed onto MPCM was determined following the Equation 2.

Table 4 shows that the adsorption of technetium onto MPCM is pH independent in the solution pH range of 3 to 11. It was observed that approximately 95% of 1 μM technetium/L of solution was adsorbed onto MPCM in the pH range of 3 to 11, whereas the technetium removal was reduced to 56% in present of 0.9% NaCl over the pH range of 3 to 11. As it was mentioned earlier, MPCM shows positive charge in the pH range of 3 to 7.5. FTIR spectrum of MPCM confirms the presence of —NH$_2$, CHOH, and CH$_2$OH groups on MPCM surface (FIG. 4). It was assumed that the positive charge occurs due to protonation of the surface sites of MPCM in the pH range of 3 to 7.5 and technetium undergoes covalent bonding with the positive surface sites of MPCM. In the case of 0.9% NaCl in solution, the adsorption capacity of MPCM for technetium was reduced as the pertechnetate ions had to compete with the chloride ions in solution. Moreover, the uptake of technetium in the pH range of 9 to 11 in the presence of 0.9% NaCl solution may correspond to an ion-exchange reaction that occurs at this pH range. The result shown in Table 4 confirms that MPCM has strong affinity for pertechnetate ion from aqueous solutions.

TABLE 4

Adsorption of technetium on to MPCM at different pH

| $^{99}$Tc solution prepared using | Initial concentration of $^{99}$Tc in the solution μmole/L | Amount of MPCM g | Amount of solution L | % uptake of $^{99}$Tc on to MPCM at different pH | | | | | | |
|---|---|---|---|---|---|---|---|---|---|---|
| | | | | 3 | 4 | 6 | 8 | 9 | 10 | 11 |
| Deionized water | 0.11 | 0.1 | 0.03 | 95% | 95% | 85% | 85% | 90% | 90% | 90% |
| 0.9% NaCl solution | 0.11 | 0.1 | 0.03 | 56% | 55% | 55% | 56% | 51% | 52% | 51% |

MPCM was also used to adsorb Mo (VI) and Tc(VII) simultaneously from a mixed solution containing 1 mmole of Mo(VI)/L and 0.11 μmole of pertechnetate/L with or without the presence of 0.9% NaCl. MPCM was found to adsorb molybdenum and technetium simultaneously from the solution at solution pH 3. It was observed that approximately 95% of 0.11 μmole pertechnetate was adsorbed onto MPCM surface, whereas 99% of 1 mmole molybdenum was adsorbed from the mixed solution. In the presence of molybdenum (MoO$_4^{2-}$) in the solution, pertechnetate (TcO$_4^-$) had to compete for the positive surface sites of MPCM. In another attempt, the adsorption of technetium onto MPCM was studied from a mixed solution containing 153.8 mmole NaCl/L, 1 mmole Mo (VI)/L of and 0.11 μmole pertechnetate/L. Table 5 shows that molybdenum (MoO$_4^{2-}$) was adsorbed preferentially on to the MPCM surface, whereas the adsorption of pertechnetate ($TcO_4^-$) was reduced to 55% of 0.11 µmole technetium/L in the mixed solution. It is assumed that in the presence of 0.9% NaCl, the sorption of pertechnetate ($TcO_4^-$) onto MPCM surface was reduced due to the competition for surface sites with chloride ions at solution pH 3. In another attempt, a column with 1 cm inner diameter was used to study the pertechnetate adsorption onto MPCM. The column was prepared with MPCM that was loaded initially with Mo (VI). Batch equilibrium process was used to adsorb 6.25 mmole Mo (VI)/g MPCM at 298 K when the equilibrium concentration of Mo (VI) in the solution was 54 mmole/L and the initial pH of the solution was 3.0. Approximately 1.125 gram of Mo (VI) loaded MPCM was used to prepare a 2.5 $cm^3$ bed. A saline (0.9% NaCl) solution spiked with 0.25 mM pertechnetate/L was passed through the column using a peristaltic pump at a flow rate of 1 mL/min during the run.

TABLE 5

Adsorption of pertechnetate and molybdenum on to MPCM from a mixed solution

| Experiment | Amount of MPCM g | Amount of solution L | Concentration of pertechnetate, molybdenum, and sodium chloride in the mixed solution | | | % uptake | |
|---|---|---|---|---|---|---|---|
| | | | $TcO_4^-$ (µM/L) | $MoO_4^{2-}$ (mM/L) | NaCl (mM/L) | Mo(VI) (%) | Tc(VII) (%) |
| 1 | 0.1 | 0.03 | 0.11 | 1.0 | 0.0 | 99 | 95 |
| 2 | 0.1 | 0.03 | 0.11 | 0.0 | 153.8 | — | 55 |
| 3 | 0.1 | 0.03 | 0.11 | 1.0 | 153.8 | 99 | 56 |
| 5 | 0.1 | 0.03 | 0.11 | 1.0 | 153.8 | 98.0 | 56 |

Figure 16:
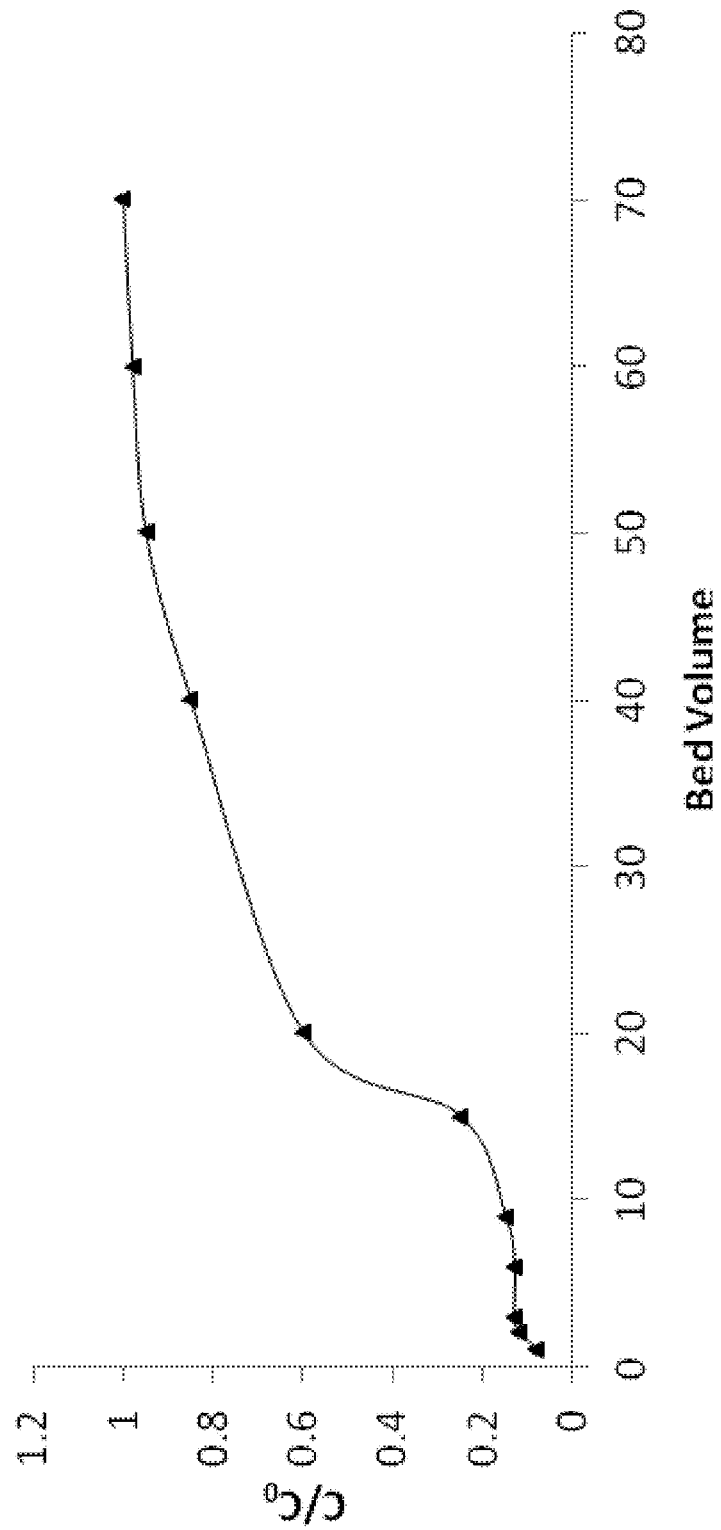
FIG. 16 is a graph showing breakthrough curves for pertechnate from a column packed with an embodiment of MPCM without oxidation which was loaded with 6.25 mM of Mo (VI)/gram of MPCM. The volume of the column was 2.5 $cm^3$. The inlet flow rate was 1 mL/min. The inlet influent concentration was 0.25 mM pertechnetate/L in saline (0.9% NaCl) solution.

FIG. 16 shows that the pertechnetate anion has affinity towards available surface sites of MPCM in the presence of molybdenum ($MoO_4^{2-}$) anion. It was observed that at 10 bed volumes, approximately 15% of the inlet concentration of pertechnetate was eluted with saline (0.9% NaCl) solution. It may be noted that approximately 60% of the inlet pertechnetate concentration was obtained in the eluent that was collected at 20 bed volumes (FIG. 15). The column reaches saturation fairly quickly for technetium while an additional 40 bed-volume of technetium spiked saline solution was passed through the column. After the column reached its saturation for technetium, more than 95% of the technetium fed to the column was collected at the column outlet as eluent. The objective of this study was to investigate the maximum amount of pertechnetate ($TcO_4^-$) uptake onto MPCM loaded with 6.25 mM of Mo (VI)/gram of MPCM. No attempts were made to determine the bed length to reduce the pertechnetate release from the Mo (VI) loaded MPCM bed.

Although batch and column studies show that MPCM exhibited excellent adsorption capacity for Tc(VII), its removal from the bed was challenging. A technetium loaded MPCM bed was prepared in a column to study the desorption of technetium from the MPCM sample. The adsorption of technetium onto MPCM was conducted under batch equilibrium conditions. It was observed that approximately 0.12 µM of $^{99}$Tc was adsorbed per gram of MPCM from a $^{99}$Tc concentration of 0.48 µM/L solution at 298K temperature. For $^{99}$Tc desorption studies, about 1.125 gram of MPCM containing 0.12 µM of $^{99}$Tc/gram of MPCM was used to prepare the column. Pertechnetate is soluble in water; therefore, deionized water was used to regenerate technetium from the column. It was observed that only 1% of technetium was desorbed from the MPCM bed using 10 bed volumes of water. Preliminary studies show that complete recovery of technetium from the MPCM is challenging even using when different concentrations of NaCl solution. It was observed that approximately 50 bed volumes of 1.5% NaCl was required to regenerate 10% of $^{99}$Tc from the column. Similar amounts of low concentration acid solutions (<1M) of HCl, $H_2SO_4$, and $HNO_3$, were also used, without any significant regeneration. In another attempt, the MPCM sorbent was oxidized with different concentrations of potassium permanganate or hydrogen peroxide, to study the effect of oxidation on adsorption/desorption of technetium on to the oxidized MPCM sorbent.

Example 2

In another embodiment, MPCM was oxidized with different concentrations of hydrogen peroxide with or without the presence of transition metal catalysts. Temperature was also varied. The oxidation studies of MPCM with hydrogen peroxide were performed to determine whether controlled oxidation alone would improve technetium recovery from the technetium loaded MPCM. The concentration of hydrogen peroxide was varied from 1% to 5%. Batch technique was used to adsorb technetium onto oxidized MPCM. The regeneration of technetium from the oxidized MPCM was conducted in a column. The column was prepared with 0.12 µmole of $^{99}$Tc/gram of oxidized MPCM. The column was regenerated to desorb technetium from the oxidized MPCM using 0.9% NaCl solution. It was observed that the recovery of technetium was not as high as was desired, since 10 to 17% of available technetium was recovered from the oxidized MPCM bed (Table 6). Moreover, the adsorption of Mo (VI) onto peroxide-oxidized MPCM reduced to 4.6 mmole/g compared to 6.25 mmole/g adsorbed by non-oxidized MPCM.

TABLE 6

Desorption $^{99}$Tc from oxidized MPCM using 0.9% NaCl solution

| | % desorption of $^{99}$Tc from column | | | | | | | | |
|---|---|---|---|---|---|---|---|---|---|
| | Peroxide activation by pH | | Peroxide activation by temperature (at 70° C.) | | % of peroxide and their activation by transition metal catalyst | | | | |
| pH | 0.05% $H_2O_2$ | 0.2% $H_2O_2$ | 0.05% $H_2O_2$ | 0.2% $H_2O_2$ | 1% $H_2O_2$ | 2% $H_2O_2$ | 3% $H_2O_2$ | 4% $H_2O_2$ | 5% $H_2O_2$ |
| 3 | 14.5 | 16.8 | 14.8 | 14.2 | | | | | |
| 5 | 12.1 | 16.7 | 13.2 | 16.8 | 15.2 | 12.4 | 19.1 | 10.0 | 12.8 |
| 10 | 13.2 | 15.4 | 12.4 | 14.7 | | | | | |

Example 3

MPCM was also oxidized using potassium permanganate in solution. The concentration of potassium permanganate in the solution and the oxidation time was determined based on trial and error. The concentrations of potassium permanganate and the pH of the solution were varied from 0.1% to 5% and 3 to 11, respectively. The oxidation time was varied from 30 minutes to 24 hours. The surface charge analysis of oxidized and non-oxidized MPCM loaded with Mo (VI) was also performed to elucidate the pertechnetate ($TcO_4^-$) adsorption pattern on oxidized MPCM.

It was observed that permanganate solution containing 0.04 mmole of Mn/L of solution at the pH range of 3 to 4.5 and 12 hours time period was sufficient to oxidize MPCM partially to facilitate maximum uptake of molybdenum and simultaneous release of technetium from the MPCM sorbent. The performance of the oxidized MPCM was evaluated for molybdenum adsorption from aqueous solutions using batch technique. It was noted that oxidized MPCM can adsorb 6.25 mmole of Mo (VI)/g of MPCM at 298K when the equilibrium concentration Mo (VI) in the solution was 54 mmol/L at pH 3.0.

In another attempt, two separate columns were prepared using oxidized MPCM and oxidized MPCM that was loaded with 6.25 mmol of Mo(VI)/g, respectively. A 0.9% NaCl solution spiked with about 0.11 μmole Pertechnetate ($TcO_4^-$)/L of solution was passed through both columns at a 1 mL/min flow rate. It was interesting to note that pertechnetate ($TcO_4^-$) did not adsorb onto oxidized MPCM with or without Mo (VI) loading and approximately 90% of pertechnetate ($TcO_4^-$) in the solution passed through both types of columns as an eluent. The results confirm that pertechnetate ($TcO_4^-$) did not adsorb onto both oxidized MPCM and MPCM loaded with Mo (VI). The objective of this work was to maximize Mo (VI) uptake and enhance technetium release simultaneously from the MPCM surface sites.

MPCM shows great affinity for both Mo (VI) and Tc(VII) from the aqueous solution. The surface charge of Mo (VI) loaded MPCM revealed (FIG. 11) that Mo (VI) was adsorbed onto MPCM through an inner-sphere surface complexation reaction. It may be noted that Mo (VI) loaded MPCM exhibited positive charge in the pH range of 3 to 4.5; therefore, anionic pertechnetate presumably formed covalent bonds with the available positive surface sites. Interestingly, the adsorption of pertechnetate on to MPCM is approximately 55% from a solution containing 0.9% NaCl at the pH range 3 to 8 (Table 4). Almost 95% of 1 mmole pertechnetate was adsorbed onto MPCM in the presence of 1 mmole Mo (VI) in the solution. This confirms that pertechnetate ($TcO_4^-$) was adsorbed onto MPCM surface sites.

The permanganate ion is ambiphilic in nature. In acidic solution, Mn (VII) ions of potassium permanganate change to possible intermediate products such as Mn (VI), Mn (V), Mn (IV), and Mn (III), which are ultimately reduced to Mn (II). See Dash et al., "Oxidation by Permanganate: Synthetic and mechanistic aspects" Tetrahedron, 65, 707-739, 2009. The permanganate ($MnO_4^-$) content in the potassium permanganate is reported to be the reactive oxidizing species for acid catalyzed permanganate oxidation of chitosan. See Ahmed et al., "Kinetics of Oxidation of Chitosan polysaccharide by Permanganate Ion in Aqueous Perchlorate solutions" Journal of Chemical Research, v 2003, n 4, p. 182-183, 2003. In an acidic medium, the possible reactions between the $MnO_4^-$ ion and $H^+$ are as follows:

$$MnO_4^- + H^+ \leftrightarrow HMnO_4 \qquad 7$$

$$MnO_4^- + 4H^+ + 8e^- \rightarrow MnO_2 + 2H_2O \qquad 8$$

$$MnO_4^- + 8H^+ + 8e^- \rightarrow Mn^{2+} + 4H_2O \qquad 9$$

Due to protonation of the $MnO_4^-$ ion in the acidic solution, the $HMnO_4$ species can be formed, which is also a powerful oxidant. See Sayyed et al, "Kinetic and Mechanistic Study of Oxidation of Ester by $KMnO_4$" International Journal of ChemTech Research, v 2, n 1, p 242-249, 2010 The formation of colloidal $MnO_2$ is possible due to the reaction of $MnO_4^-$ with $H^+$ and depending on the acidity of the solution which may further undergo reaction with $H^+$ to produce $Mn^{2+}$ in solution. Ahmed et al. 2002 reported permanganate oxidation of chitosan as an acid catalyzed reaction that led to formation of diketo-acid derivatives of chitosan. See Ahmed et al., "Kinetics of Oxidation of Chitosan polysaccharide by Permanganate Ion in Aqueous Perchlorate solutions" Journal of Chemical Research, v 2003, n 4, p. 182-183, 2003.

Figure 17:
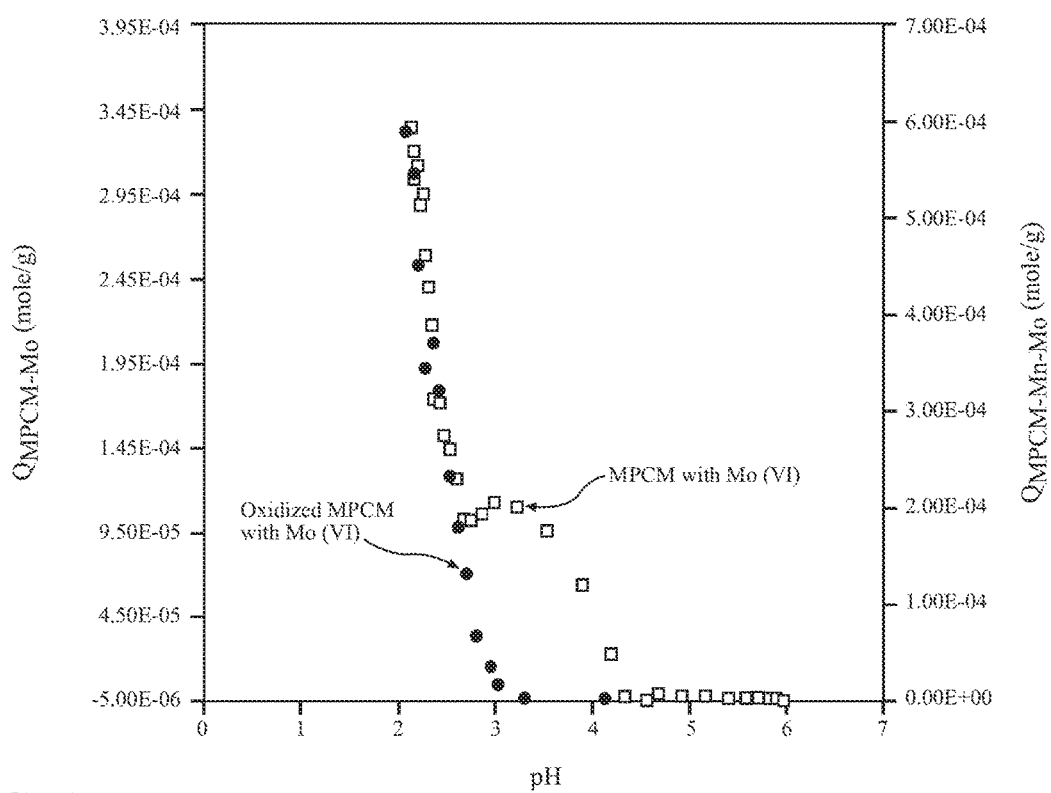
FIG. 17 is a graph showing the surface charge of oxidized and non-oxidized MPCM exposed to 1% Mo (VI) in aqueous solution in the presence of 1N $NaNO_3$.

In acid catalyzed permanganate oxidation of MPCM, permanganate ($MnO_4^-$) ion can be considered as the reactive oxidizing agent. The effect of permanganate oxidation on MPCM for the adsorption and release of Mo (VI) and Tc (VII), simultaneously, from the oxidized MPCM surface was evaluated by the surface charge analysis of the MPCM sample. The oxidation of MPCM by potassium permanganate changes its adsorption selectivity from aqueous solution. FIG. 17 shows the surface charge pattern for Mo (VI) loaded MPCM sample with or without oxidization. In the case of non-oxidized MPCM sample loaded with Mo (VI), the protonation of the surface appeared to be increased gradually at the pH range of 4.5 to 3. Therefore, at this pH range, the formation of covalent bonding by pertechnetate with the positive surface sites of Mo loaded MPCM surface is possible. At pH<2.9, the difference between the initial pH and pH after the equilibration time for MPCM loaded with Mo (VI) sample was not significant, suggesting complete protonation of the MPCM sample.

The surface charge of Mo (VI) loaded oxidized MPCM shows almost zero charge in the pH range of 3 to 4.5, compared to the Mo (VI) loaded onto the non-oxidized MPCM sample (FIG. 17). In the acidic pH range from 3 to 4.5, the surface functional groups of non-oxidized MPCM show positive charge which may further undergo reaction with $MnO_4^-$ during the oxidation reaction. It is assumed that the manganic ($MnO_4^-$) ion entered into the porous matrix of MPCM and partially oxidized the positive surface functional groups by donating electrons followed by reduction to $Mn^{2+}$ ion in the solution. In addition, formation of colloidal manganese in the solution was controlled by controlling the solution pH in the range of 3 to 4.5, more specifically at pH 4. Moreover the ratio of $Mn^{2+}$ ion to positive surface sites of MPCM favors further adsorption of $Mn^{2+}$ onto MPCM surface. It was observed from the both batch and column studies that technetium did not adsorb on to Mo (VI) loaded oxidized MPCM whereas it shows a strong affinity for the Mo (VI) loaded non-oxidized MPCM sample. This indicates that the lack of a positive charge on the Mo (VI) loaded oxidized MPCM surface did not attract technetium to form a covalent bond compared with the surface of non-oxidized MPCM loaded with Mo (VI). It is interesting to note that technetium did not adsorb onto oxidized MPCM whereas almost 95% of 1 mmole solution of technetium was adsorbed onto non-oxidized MPCM. This confirms that technetium adsorbed onto the surface of non-oxidized MPCM and was not adsorbed on to the oxidized MPCM through covalent bonding.

Equilibrium batch adsorption studies were carried out by exposing the oxidized MPCM to 1% Mo(VI) solution that was spiked with 5.0 mL of $^{99}$Mo (2 mCi/mL). Initially 1% molybdenum was prepared by dissolving 4.5 mL of ammonium hydroxide and 1.5 g of $MoO_3$ in 95 mL of deionized water. The mixture was kept under stirring until $MoO_3$ completely dissolved in solution. A solution containing 5.0 mL of $^{99}$Mo (2 mCi $^{99}$Mo/mL) was mixed thoroughly with 97.5 mL of 1% molybdenum solution. The pH of the spiked solution was adjusted to 3 using either 0.1N HCl or NaOH solution. The final specific activity of the Mo (VI) in the solution was 78.12 µCi/mL.

About 0.5 gram of the oxidized MPCM was added to a 125 mL plastic vial containing 50 mL of spiked solution. The solution was then kept on the shaker (160 rpm) for 3 hrs at 25±1° C. Another set of similar experiments was also performed to duplicate the data. After 3 hrs, the final pH was recorded for the solution, and the solution was centrifuged for 5 minutes at 3000 rpm in order to separate the MPCM from the supernatant solution. The MPCM loaded with Mo (VI) was then rinsed with deionized water couple times to remove any adhered Mo (VI) from its surface. The MPCM loaded with Mo (VI) and the supernatant and rinsed solutions were analyzed for molybdenum uptake using a dose calibrator, and a ICP-MS. It was observed that at equilibrium, the oxidized MPCM had a capacity of 2.47 mmole Mo/g of MPCM where 1300 µCi of activity are from the spiked $^{99}$Mo.

The activity for $^{99}$Mo and $^{99m}$Tc was evaluated using both a dose calibrator and a gamma spectrometer. The dose calibrator (Atomlab 400) is equipped with a small lead sample vessel that effectively shielded of $^{99m}$Tc gammas while allowing the majority of $^{99}$Mo gammas to pass through the shield and into the detector. Therefore, readings taken while the sample is contained within the shielded vessel is assigned solely to $^{99}$Mo activity. Readings taken without the shield are the sum of both $^{99}$Mo and $^{99m}$Tc activities.

Following the batch adsorption run, the MPCM loaded with both $^{98}$Mo and $^{99}$Mo was transferred to a column (0.5 cm×3.2 cm with polytetrafluoroethylene (PTFE) frit at the bottom). Two ends of the column were closed with silicon rubber septum. The column was thoroughly rinsed with de-ionized water to remove any molybdenum solution on the surface of the MPCM. The rinsed sample was collected from the column using evacuated vials. The column was eluted with saline (0.9% NaCl) solution after allowing it maximum time required to build-up the daughter product $^{99m}$Tc from the decay of the remaining $^{99}$Mo in the column. The column was eluted with 9 mL saline solution that was collected subsequently in 3 individual evacuated vials of 3 mL each. The eluate was obtained from the column at predetermined time intervals. The eluate from each collection was analyzed for molybdenum and manganese released from the column using quadruple inductively coupled plasma mass spectrometry (ICP-MS) with an external calibrator. The activity related to pertechnetate or $^{99}$Mo was evaluated using dose calibrator and gamma spectroscopy.

Figure 18:
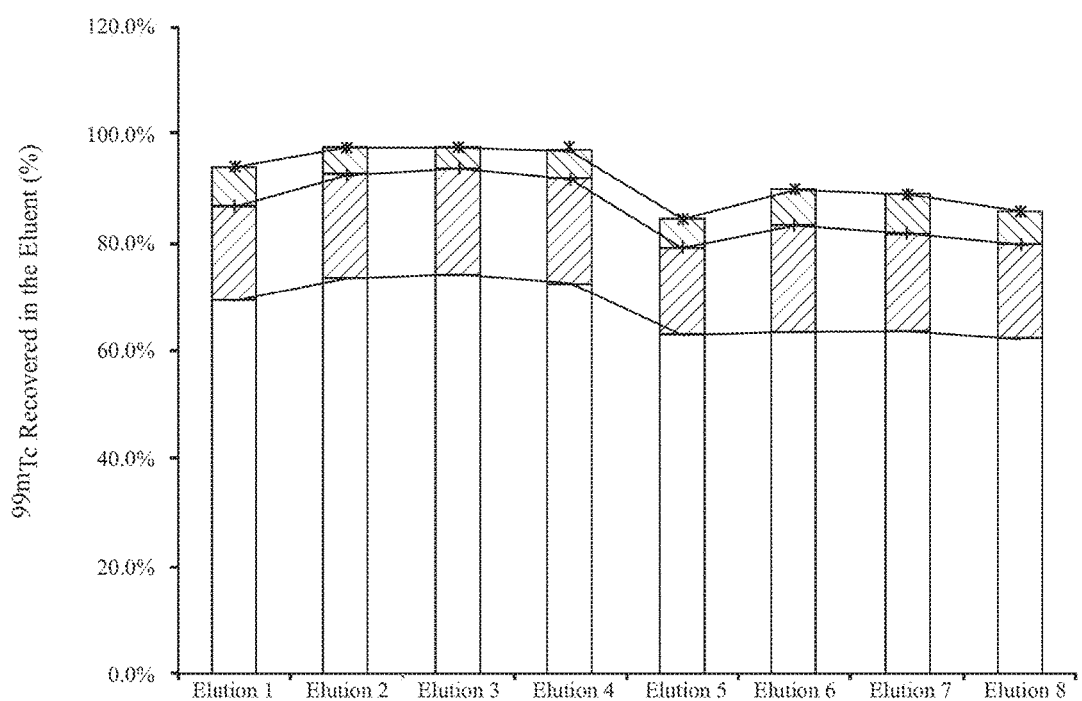
FIG. 18 is a graph showing an elution profile for $^{99m}Tc$ from an embodiment of MPCM loaded with Mo (VI) spiked with $^{99}Mo$.

FIG. 18 shows the elution profile of the column consisting of 0.5 gram of MPCM loaded with 2.47 mmole of Mo (VI)/gram of oxidized MPCM where 1300 µCi activity is from adsorbed $^{99}$Mo. The column started eluting with saline (0.9% NaCl) solution on the day after the column was prepared and the elution was continued over the period of 8 days. A note is that the first set of elution (Elution 1) was performed at 8 hours after the column was prepared in order to verify the desorption behavior of $^{99m}$Tc from the MPCM column. The rest of the elutions, number 2 to 8, were performed at 24 hours intervals except elution number 5 were performed at least 45 hours after the elution number 4. The elution efficiency for the daughter product $^{99m}$Tc from the column was found to be within the range of 75 to 90% (FIG. 18). In elution 1, as shown in FIG. 18, more than 80% of the activity due to $^{99m}$Tc is obtained within 9 mL of saline (0.9% NaCl) in where 62% of the available $^{99m}$Tc activity eluted in first 3 mL volume of normal saline. The second elution was collected at 24 hours after the first elution and shows that the $^{99m}$Tc activity in the column ranged from 70% to 90% and can be recovered using 3 to 9 mL of saline solution. In all the cases, the eluate was clear, and the pH was in the range of 6 to 7. The column was continuously eluted over the period of 8 days with an average ~82% of the whole $^{99m}$Tc eluted from the column.

Figure 19:
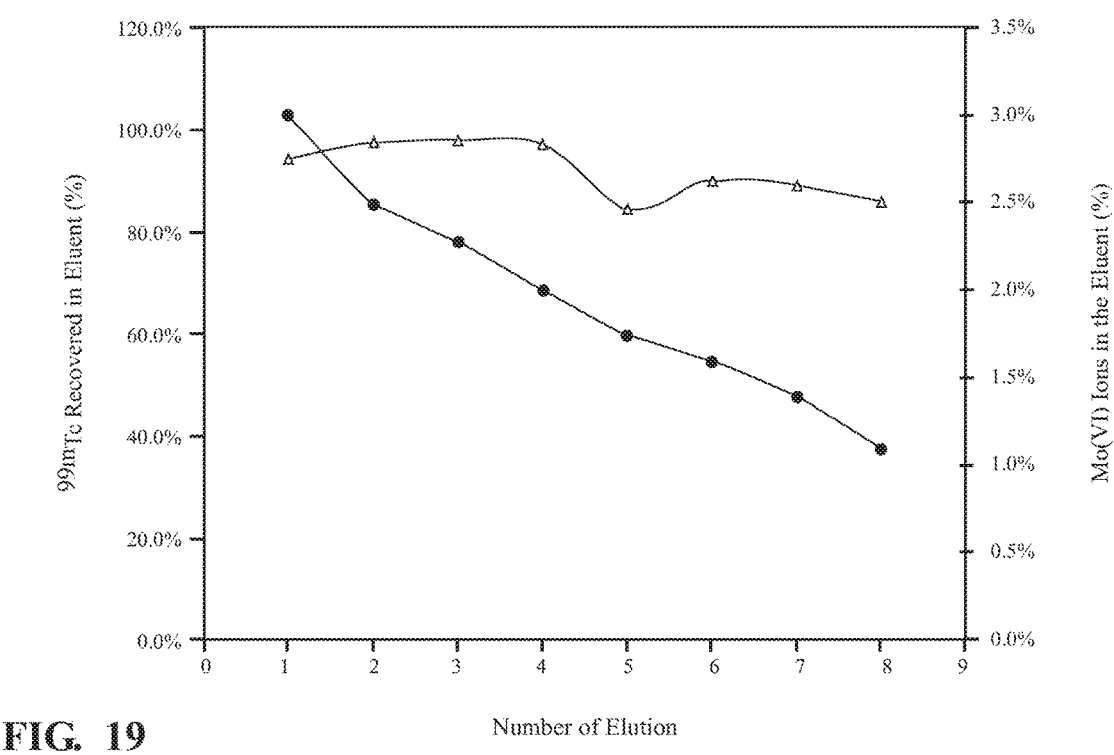
FIG. 19 is a graph showing the relationship between number of elution(s) and the percentages of $^{99m}Tc$ and Mo (VI) release from an embodiment of MPCM as sorbent.

FIG. 19 shows the percentage of $^{99m}$Tc and Mo (VI) released from the column over the period of 8 days. The concentration of the Mo (VI) in the eluates was within the range of 1% to 3% of the 6.25 mmole Mo (VI)/gram of MPCM in the column. The process of capturing any molybdenum leakage from the column by passing it through acid catalyzed MPCM is possible as shown in FIG. 15 thus reducing the Mo (VI) and Mn(VII) concentrations in the eluent to extremely low levels. Another way of controlling molybdenum leakage from the column can be achieved by controlling the pH of the saline (0.9% NaCl) solution within the range of 4 to 4.5 (FIG. 15). In that case, an additional guard column will not be necessary to control the leakage of Mo (VI) from the column.

Example 4

Figure 20:
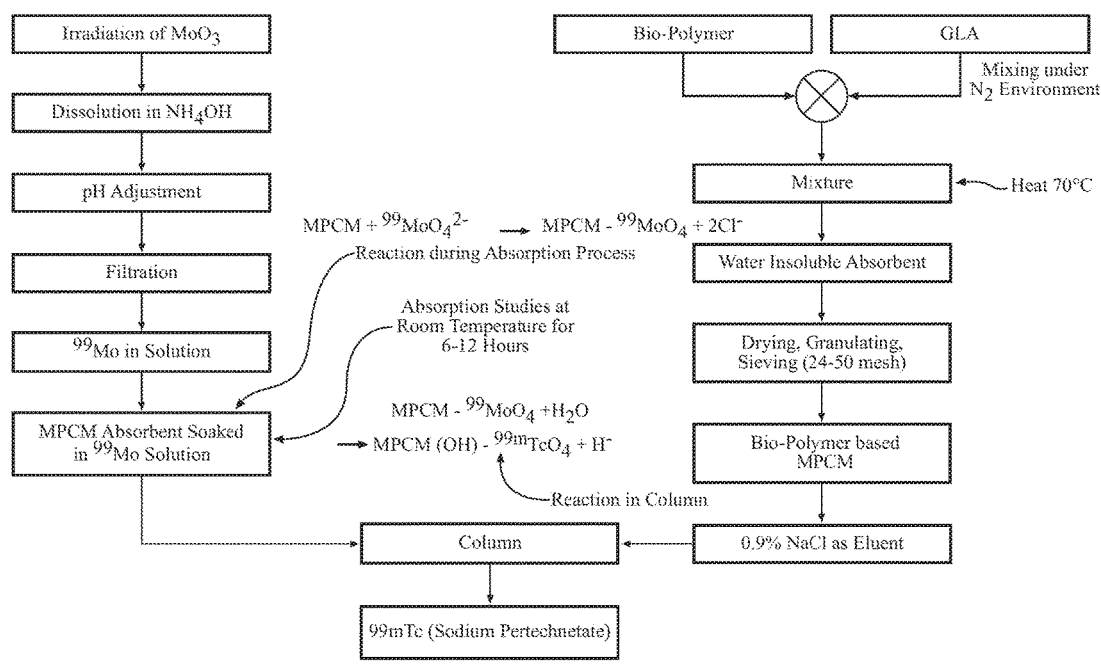
FIG. 20 is a flow diagram for a process using a $^{99m}Tc/^{99}Mo$ generator systems and a $^{99}Mo$ production using neutrons capture method, using an embodiment of MPCM as the sorbent.

Production of $^{99}$Mo via neutron capture method draws attention as an alternative of fission derived $^{99}$Mo due to non-proliferation issues. The $^{99}$Mo produced by the neutron activation of natural molybdenum would provide a less complex, less expensive, and more practical route for indigenous production and use of $^{99m}$Tc. However, it is evident that the specific activities produce by the neutron capture method are not sufficiently high for the preparation of small chromatographic generators. This limitation, however, can be overcome by the use of adsorbent such as MPCM, which has higher adsorption capacity for molybdenum. It is demonstrated that MPCM is capable of adsorbing more than 6.25 mmole Mo (VI)/gram (600 mg Mo (VI)/g of MPCM) from an aqueous solution at pH 3, which is also applicable to $^{99}$Mo obtained easily by the (n, γ) reaction of natural molybdenum. The generator in this case consists of MPCM loaded $^{99}$Mo thus combines the performances of the chromatographic generator and the use of (n, γ)$^{99}$Mo. In case of using as an adsorbent in $^{99m}$Tc/$^{99}$Mo generator, the MPCM is able to hold up to 60 wt % of its body weight, in comparison with only 0.2 wt % in the alumina. The potential for MPCM as an absorbent for the preparation of the $^{99}$Mo/$^{99m}$Tc generator has been explored using 1% Mo (VI) solution spiked with $^{99}$Mo (2 mCi/mL). It was observed that MPCM adsorbed Mo (VI) spiked with $^{99}$Mo as per its demonstrated capacity from an aqueous solution at pH 3. It was also observed that $^{99m}$Tc, which was the decay product of $^{99}$Mo, was eluted with normal (0.9%) saline solution to yield more than 80% elution. A typical $^{99m}$Tc/$^{99}$Mo generator preparation flow sheet based on MPCM as an adsorbent is given in FIG. 20.

Example 5

In an attempt to maximize Mo (VI) uptake and enhance technetium release from the column prepared using molybdenum loaded MPCM resin, MPCM resin was oxidized using sodium hypochlorite (NaClO2) and sodium chlorite (NaOCl), respectively. The concentration of sodium chlorite or sodium hypochlorite in the solution and the oxidation time was determined based on trial and error. The concentrations of sodium chlorite and the pH of the solution were varied from 1 mmole/L to 10 mmole/L and 3 to 11, respectively. The oxidation of MPCM by either sodium chlorite or sodium hypochlorite solution was carried out at a solid to liquid ratio of 1:100. The oxidation time was varied from 30 minutes to 24 hours. For both sodium chlorite and sodium hypochlorite, it was observed that solution containing ~0.02% chlorine, calculated as $Cl_2$ at a pH range of 3 to 4.5 and an oxidation time of 2 hours was sufficient to oxidize MPCM partially to facilitate maximum uptake of molybdenum and also release of technetium from the MPCM sorbent. The MPCM resins that were partially oxidized by sodium chlorite and sodium hypochlorite are denoted as MPCM-ClO$_2$ and MPCM-OCl, respectively, herein. The performance of the MPCM-ClO$_2$ and MPCM-OCl was evaluated for molybdenum adsorption from aqueous solutions using batch techniques. It was noted that oxidized MPCM can adsorb approximately 6.25 mM (~600 mg) of Mo (VI) per g of oxidized MPCM at 298K when the equilibrium concentration Mo (VI) in the solution was 54 mmol/L at pH 3.0.

A surface charge analysis of molybdenum loaded non-oxidized MPCM and molybdenum loaded MPCM-ClO$_2$ was carried out using procedures described above. Similar surface charge experiments were also performed with molybdenum loaded MPCM-OCl and the data was compared with the surface charge of molybdenum loaded non-oxidized MPCM resin. The surface charge data of molybdenum loaded MPCM-ClO$_2$ and MPCM-OCl shows a similar pattern to that of molybdenum loaded MPCM that was oxidized by potassium permanganate.

In order to evaluate Tc-99 uptake capacity, two separate columns were prepared using molybdenum loaded MPCM-ClO$_2$ and MPCM-OCl, respectively. For comparison, Tc-99 pass through tests with both of these oxidized MPCM resins were performed following the procedures described above. The results confirmed that pertechnetate (TcO$_4^-$) did not adsorb onto both MPCM-ClO$_2$ and MPCM-OCl loaded with Mo (VI). Table 7 shows the comparison of the effects of different oxidizers on technetium release from a column prepared with oxidized MPCM. The oxidized MPCM resins, as shown in Table 7, were exposed to 1% molybdenum solution that was spiked with molybdenum-99. The activity of molybdenum-99 was varied from 45 mCi to 1.39 Ci (at the end of irradiation, or EOI), respectively. The molybdenum loaded MPCM resins that were oxidized by different oxidizers were used to prepare respective chromatographic columns. The columns were then flushed with saline solution and the data are shown in Table 7.

Technetium release was almost 100% from the column when the initial activity of Mo-99 in the column was approximately 45 mCi (Table 7). The release of technetium from the column was comparatively very low for all oxidizing agents when Mo-99 with higher specific activity was used in the column. Without wishing to be bound by theory, it is believed that, at higher activity, technetium reduced from Tc(VII) to Tc(IV) and the reduced anionic pertechnetate presumably formed covalent bonds with the free surface sites of MPCM resin. The release of technetium from the column was approximately 10% when molybdenum-99 with activity of 900mCi was loaded onto MPCM sample that was oxidized with 31 mM potassium permanganate (Table 7). This combination also released more manganese in the eluent compared to the MPCM resin that was oxidized with 6.3 mM of potassium permanganate. In the case of higher activity of Mo-99 (1.39 Ci at EOI) in the column, a small increase of the percentage of technetium released from the column was observed for the MPCM-ClO$_2$ and MPCM-ClO resins compared to the resins that were oxidized by potassium permanganate or hydrogen peroxide (Table 7).

TABLE 7

| Micro-porous composite resin (MPCM) resin treatment with different oxidizer | | | | | |
|---|---|---|---|---|---|
| Isotonic solution elution performed in a column with $^{99}$Mo activity at EOI | Percentages of $^{99m}$Tc release from a column with $^{99}$Mo loaded with MPCM resin that was partially oxidized with oxidizer | | | | |
| | KMnO$_4$ | | | | |
| (End of irradiation) Events | 6.3 mM (0.1%) | 31 mM (0.5%) | H$_2$O$_2$ 10% | NaOCl 5 mM | NaClO$_2$ 5 mM |
| 45 mCi | 100% | 100% | 100% | 100% | 100% |
| 900 mCi | 4% | 10% | — | — | — |
| 1.39 Ci | 2% | 5% | 5% | ~9.8% | ~10% |

At higher specific activity (1.39 Ci at EOI) of molybdenum in the column, the release of technetium from the column was reduced significantly compared to the column prepared by MPCM resin loaded with low specific activity molybdenum-99. Without wishing to be bound by theory, it is believed that at higher activity, the oxidation state of metal ions that are present in the column may change; thus reducing technetium release from the column. It is believed that the presence of oxidizing agent in the molybdenum solution could keep the MPCM resin and molybdenum in the solution in oxidized state throughout the adsorption cycle, which may facilitate technetium release from the column. Furthermore, addition of oxidizing agent in the eluent saline solution was also considered in order to enhance further technetium-99 release from the molybdenum loaded oxidized MPCM column.

The MPCM-ClO$_2$ and MPCM-OCl resins were further studied to evaluate their potential for molybdenum adsorption in presence of different concentrations of oxidizing agent in the solution. The adsorption study was carried out for 24 hours using different concentrations of sodium chlorite and sodium hypochlorite (5 mM to 50 mM) which were spiked with 1% molybdenum in solution (prepared from molybdenum salt, without radioactive molybdenum (Mo-99)). The molybdenum solution pH was initially adjusted at 3.0 for all the experiments. The samples were collected at different intervals and were analyzed for molybdenum uptake onto the resin. Table 8 shows that, in the presence of sodium chlorite or sodium hypochlorite in the solution, the molybdenum uptake capacity of the oxidized MPCM resin was in the range of 5.21 mM (500 mg/g) to 6.25 mM (600 mg/g) of oxidized MPCM. Molybdenum started precipitating out slowly in the solution after 12 hours of exposure when the oxidizer concentration in the solution was 45 mM or higher. No molybdenum precipitation in the solution was observed for the solution in which the concentrations of either sodium chlorite or sodium hypochlorite were in the range of 5 mM to 40 mM. Molybdenum did not precipitate in the solution during first 4 hours of the exposure for any concentration of sodium hypochlorite that was used in this study.

TABLE 8

Adsorption cycle (1 gram oxidized MPCM in 1% Molybdenum solution and exposure time 24 h at pH ~3.0).

| Items | Concentration of oxidizer in 1% Mo (VI) solution (mM) | Oxidizer in the solution | Mo(VI) uptake on to MPCM oxidized with (mM/g) | | Mo(VI) precipitation during adsorption cycle Visual |
|---|---|---|---|---|---|
| | | | NaOCl | NaClO$_2$ | |
| 1 | 0 | — | ~6.19 | ~6.25 | No |
| 2 | 5 | NaOCl | ~5.8 | | No |
| | | NaClO$_2$ | | ~6.1 | No |
| | | | ~5.75 | ~5.8 | No |
| 3 | 10 | NaOCl | ~5.4 | ~6.1 | No |
| | | NaClO$_2$ | ~5.5 | ~5.8 | No |
| 4 | 25 | NaOCl | ~5.9 | ~6.25 | No |
| | | NaClO$_2$ | ~5.8 | ~5.98 | No |
| 5 | 40 | NaOCl | ~5.6 | ~5.7 | No |
| | | NaClO$_2$ | ~5.5 | ~5.7 | No |
| 6 | 45 | NaOCl | — | — | yes |
| | | NaClO$_2$ | — | — | yes |
| 7 | 50 | NaOCl | — | — | yes |
| | | NaClO$_2$ | — | — | yes |

Molybdenum uptake was found to be fairly consistent onto MPCM-ClO$_2$ in presence of all concentrations of sodium hypochlorite in the 1% molybdenum solution (Table 8). Compared to the data obtained from oxidizer-free molybdenum solution, the uptake of molybdenum onto MPCM-ClO$_2$ was approximately 6.25 mM/g from a 1% molybdenum solution containing of 25 mM of sodium hypochlorite (NaOCl) in the solution (Table 8). This suggests that presence of hypochlorite in the molybdenum solution did not affect molybdenum adsorption substantially onto MPCM resin that was partially oxidized by sodium chlorite.

Therefore, MPCM-ClO$_2$ was considered in this attempt to adsorb molybdenum in presence of different concentrations of sodium hypochlorite (NaOCl) as oxidizer in the 1% Mo solution. The molybdenum loaded MPCM-ClO$_2$ was then used to prepare a chromatographic column. Sodium chlorite and sodium hypochlorite were also mixed with saline solution in order to investigate their oxidizing effects on the release of both technetium and molybdenum from the column. The columns were then flushed with a saline solution mixed with 5 mM concentration of sodium chlorite and sodium hypochlorite, respectively, at pH 4. The eluate mixture was further spiked with Tc-99 (stoichiometrically equivalent to ~1 Ci of Tc-99m per 10 mL) before being passed through the column.

More than 99% of Tc-99 passed through the column in the presence of either sodium chlorite or sodium hypochlorite as oxidizing agent in the eluent without being adsorbed in the column (Table 9). The release of molybdenum from the column during elution with the saline solution mixed with sodium hypochlorite was similar to the column eluted with saline solution mixed with sodium chlorite (Table 9). For instance, columns prepared with MPCM-ClO$_2$ adsorbed molybdenum from a solution containing 1% molybdenum and 25 mM sodium hypochlorite, were flushed with 5 mM sodium chlorite and sodium hypochlorite, respectively (Table 9). In the case of saline with sodium chlorite, the release of molybdenum was found to be approximately 2% of the 6.25 mM adsorbed molybdenum onto MPCM-ClO$_2$ that was used to prepare the column, whereas molybdenum release was found to be approximately 7.5% from a similar column that was eluted with sodium hypochlorite mixed saline solution as shown in Table 9. It was obvious from this study that MPCM-ClO$_2$ is capable of adsorbing approximately 6.25 mM of molybdenum from a solution containing 1% molybdenum and 25 mM of sodium hypochlorite. In the case of a chromatographic column prepared using molybdenum loaded MPCM-ClO$_2$ and then eluted with Tc-99 spiked saline mixed with sodium chlorite, it was found that this system was capable of holding maximum molybdenum and also releasing maximum Tc-99 from the column.

TABLE 9

Typical oxidizer concentration (5 mM) in the elution solution and related metal ions release from the column.

| | Concentration of NaOCl in 1% molybdenum solution | Molybdenum uptake onto MPCM-ClO$_2$ resin | Release of metal ions from a Mo loaded MPCM-ClO$_2$ column using 5 mM oxidizing agent in the saline solution. | | | |
|---|---|---|---|---|---|---|
| | | | % of Tc-99 release | | % of molybdenum release | |
| Items | (mM) | (mM/g) | NaOCl | NaClO$_2$ | NaOCl | NaClO$_2$ |
| 1 | 5 | ~6.2 | ~98 | ~98 | 3 | 1.45 |
| 2 | 10 | ~6.1 | ~98 | ~98 | 5 | 1.8 |
| 3 | 25 | ~6.25 | ~98 | ~98 | 7.5 | 2 |
| 4 | 40 | ~5.7 | ~98 | ~98 | 10 | 4 |

The effect of different sodium chlorite concentration in the eluent for releasing molybdenum and technetium from the column was further investigated. Columns were prepared with MPCM-ClO$_2$ that adsorbed molybdenum from a solution containing 1% molybdenum and 25 mM sodium hypochlorite. The columns were then flushed with saline mixed with different concentration of sodium chlorite, respectively (Table 10). The concentration of sodium chlorite in the saline was in the range of 5 mM to 20 mM. The eluent mixtures were further spiked with Tc-99 (stoichiometrically equivalent to ~1 Ci of Tc-99m per 10 mL) before being passed through the column. It was observed that more than 99% of technetium-99 passed through the column in presence of sodium chlorite as oxidizing agent (5 mM to 20 mM concentration) in the eluent without being adsorbed in the column (Table 10). The amount of molybdenum release from the column was approximately 2% and 5% of the molybdenum present in the column when the sodium chlorite concentration in the saline solution was 5 mM and 20 mM, respectively. This suggests that a guard column is desirable in order to obtain molybdenum-free technetium in the eluent solution.

TABLE 10

Effect of sodium chlorite concentration in the eluent on the release of technetium and molybdenum from column prepared using molybdenum loaded MPCM-ClO$_2$.

| Items | Concentration of NaOCl in 1% molybdenum solution mM | Mo uptake on to MPCM-ClO$_2$ | % of Technetium and molybdenum removal from column using NaClO$_2$ in eluent saline solution | | | | | |
|---|---|---|---|---|---|---|---|---|
| | | | 5 mM | | 10 mM | | 20 mM | |
| | | | % Tc | % Mo | % Tc | % Mo | % Tc | % Mo |
| 1 | 25 | ~6.25 | ~98 | 0.80 | ~98 | 2.55 | ~98 | 4.6 |
| 2 | 25 | ~6.2 | ~98 | 1.25 | ~98 | 2.4 | ~98 | 4.5 |
| 3 | 25 | ~6.23 | ~98 | 1.45 | ~98 | 2.6 | ~98 | 4.9 |
| 4 | 25 | ~6.25 | ~98 | 1.75 | ~98 | 2.6 | ~98 | 4.98 |

Example 6

The potential of MPCM-ClO$_2$ resin as an adsorbent for the preparation of $^{99}$Mo/$^{99m}$Tc generator was evaluated by exposing it to 1% neutron-captured produced molybdenum solution with an activity of 13.9 mCi/mL irradiated at MURR (the University of Missouri Research Reactor, USA). A similar experiment was also carried out at POLATOM using 1% natural molybdenum solution that was spiked with fission molybdenum (~1.89 Ci $^{99}$Mo/g Mo). Batch adsorption experiments for molybdenum uptake on MPCM-ClO$_2$ resin were carried out at room temperature while the solution pH for both experiments was initially about 3.0. Molybdenum uptake onto the resin for both experiments was approximately 60% of the available molybdenum in the solution. In each experiment, a $^{99}$Mo/$^{99m}$Tc generator consisting of a 6 mL column containing MPCM-ClO$_2$ resin loaded with $^{99}$Mo was prepared. $^{99m}$Tc, the decay product of $^{99}$Mo, was eluted with saline solution (0.9% NaCl) mixed with sodium chlorite as an oxidizing agent. Table 11 shows the elution performance of a typical generator that was prepared by exposing 1-g MPCM-ClO$_2$ resin to 100 mL of 1.39 Ci $^{99}$Mo in ~1% total molybdenum solution at an initial pH of ~2.8. Analysis of the activity distribution indicated a Mo adsorption efficiency of 63.4%. The time of exposure of MPCM-ClO$_2$ resin to molybdenum solution was 24 hours for these experiments. Following the adsorption cycle, the resin was thoroughly rinsed with de-ionized water to remove any adhered molybdenum from the surface.

TABLE 11

Concentration of sodium chlorite in the eluent vs. $^{99m}$Tc release.

| Items | Isotonic solution with NaClO$_2$ as oxidizer | Concentration of sodium chlorite in the eluent mixture mM | pH of the eluent mixture | Percentages of Tc-99m release from the column that loaded with MPCM resin that exposed to 1% Mo solution | |
|---|---|---|---|---|---|
| | | | | 0.5 Ci of Neutron activated $^{99}$Mo (time of elution) | 0.88 Ci fission based $^{99}$Mo blended with natural Mo (time of elution) |
| 1 | | — | ~4.0 | 6% | 4% |
| 2 | | 5 | ~4.0 | 40% | ~40% |

TABLE 11-continued

Concentration of sodium chlorite in the eluent vs. $^{99m}$Tc release.

| Isotonic solution with NaClO$_2$ as oxidizer Items | Concentration of sodium chlorite in the eluent mixture mM | pH of the eluent mixture | Percentages of Tc-99m release from the column that loaded with MPCM resin that exposed to 1% Mo solution | |
|---|---|---|---|---|
| | | | 0.5 Ci of Neutron activated $^{99}$Mo (time of elution) | 0.88 Ci fission based $^{99}$Mo blended with natural Mo (time of elution) |
| 3 | 10 | ~4.0 | 56% | ~56% |
| 4 | 20 | ~4.0 | 95% | ~95% |
| 5 | 25 | ~4.0 | 100% | 100% |
| 6 | 40 | ~4.0 | 100% | 100% |

From Table 11, the amount of Tc-99m released from the column increases with the increase of the concentration of sodium chlorite in the eluent solution. Approximately 20 mM of sodium chlorite concentration in the eluent saline solution at pH 4.0 appears to be sufficient to remove more than 95% of the Tc-99m from the column when the column initial activity was approximately 1 Ci.

The Tc-99m radioisotope, in the form of an intermediate solution, is then passed through a guard column with alumina as an adsorbent. The elution data were collected for three consecutive days and the data revealed that the elution contains a yield of >90% of the theoretical amount of $^{99m}$Tc available from the generator. The $^{99}$Mo in the eluent was less than 0.15 μCi of $^{99}$Mo per mCi of $^{99m}$Tc. The eluent solution was further subjected to treatment with either 1M sodium thiosulfate or sodium sulfite to neutralize the presence of oxidizer in the solution. The use of sodium sulfite can efficiently neutralize the oxidizer that may present in the final eluent. Typical composition of the eluent obtained from these experiments is given in Table 12.

TABLE 12

Typical composition of the final eluent

| Items | Unit |
|---|---|
| Saline solution | 0.9% NaCl |
| Tc-99m | ≥80% |
| Mo/Tc | <0.15 μCi/mCi of Tc-99m |
| Al | FDA Limit |
| NaSO$_4$ | 0.1% to 0.5% |
| pH | FDA Limit |

Example 7

Addition of potassium di-chromate (approximately 200 mg chromate) and 5% cerium oxide were also investigated as oxidizers with saline solution that was used to flush a molybdenum loaded MPCM-ClO$_2$ column with some success. In the case of potassium dichromate or cerium oxide in the saline as eluent, Tc-99 release from the column prepared from molybdenum loaded MPCM-ClO$_2$ resin was approximately >75%. A substantial amount of chromium or cerium was present in the final eluent solution which indicates a further requirement of a guard column unit to obtain oxidizer free technetium in the final eluent.

Example 8

Figure 21:
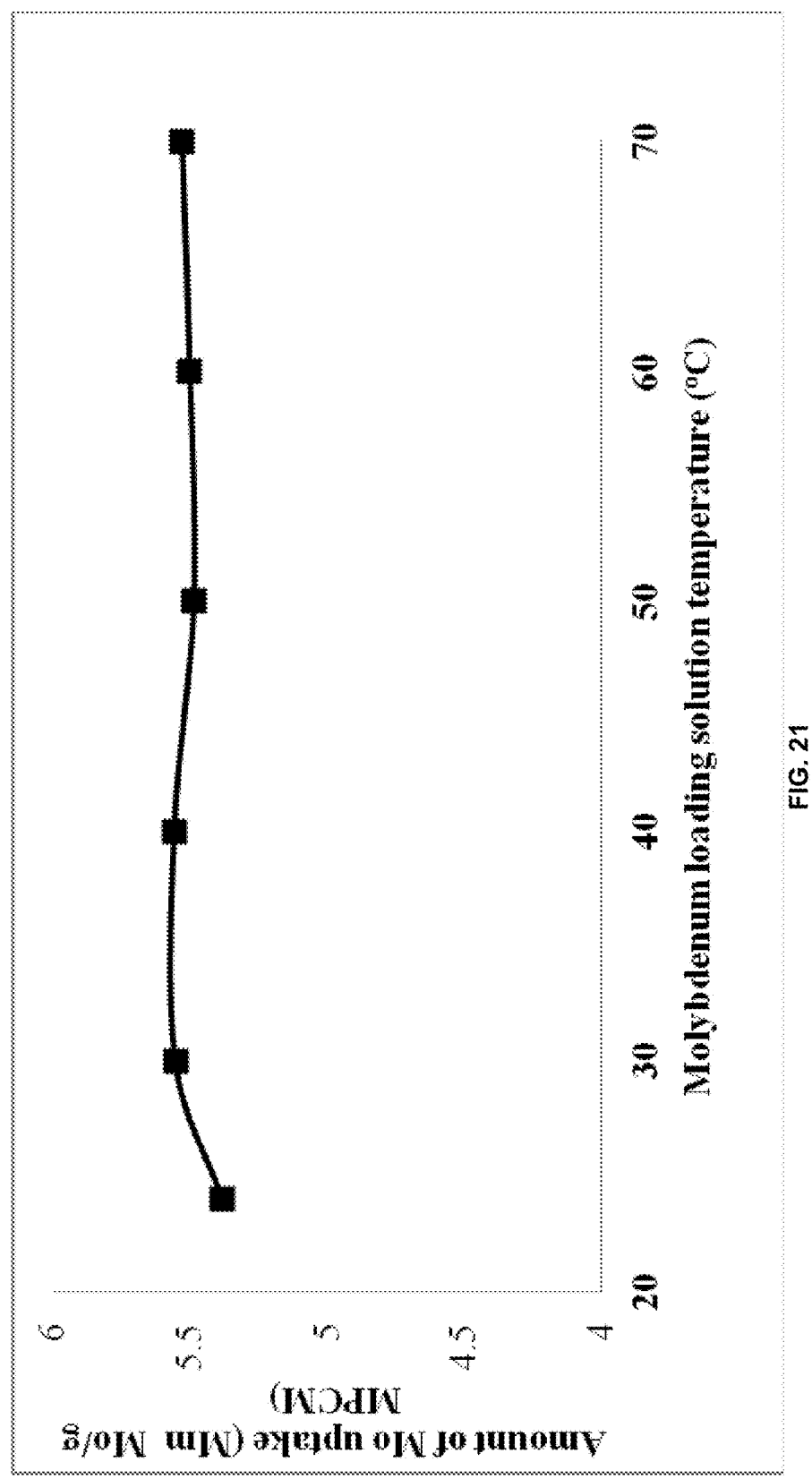
FIG. 21 is a graph showing the effect of temperature on molybdenum uptake onto MPCM-$ClO_2$ resin under conditions of initial solution concentration of 1% Mo solution with 25 mM NaOCl, pH of 3.0, and solid to liquid ratio of 1:100 with a contact time of 0.5 hour.

The effect of temperature and solid to liquid ratio in presence of oxidizing agent (sodium hypochlorite) in the solution on molybdenum uptake onto MPCM-ClO$_2$ resin were investigated. Batch studies were performed at predetermined different temperatures following the procedures previously mentioned. For each experiment, approximately 1 gram of MPCM-ClO$_2$ resin was exposed to 100 mL of 1% molybdenum solution with the presence of oxidizer (25 mM of NaOCl) for 4 hours at pH ~3.0 (data are not shown). Preliminary data as shown in FIG. 21 reveals that the molybdenum uptake on to the MPCM-ClO$_2$ resin at solution temperature ranging from 25° C. (298K) to 70° C. (343K) was varied only slightly (ranging from 5.38 mM to 5.53 mM Mo(VI)/gram of MPCM-ClO$_2$ resin). In most cases, approximately 50% of the available molybdenum in the solution was adsorbed on to MPCM-ClO$_2$ resin during the first 0.5 hours of operation without any precipitation, followed by slow movement toward equilibrium.

Figure 22:
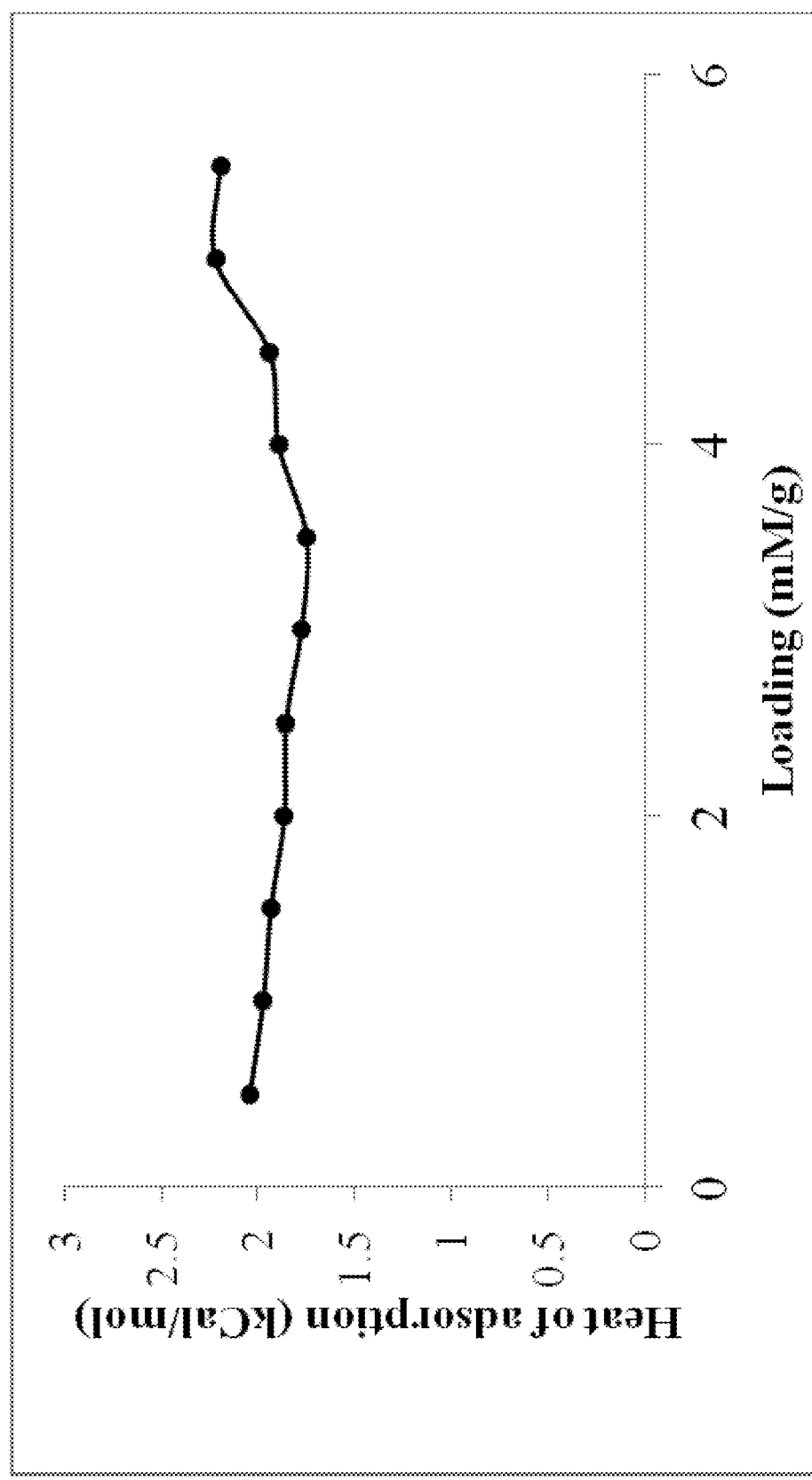
FIG. 22 is a graph showing heat of adsorption at different loading and temperature (24° C. to 50° C.) of the resin of FIG. 21.

The heat of adsorption at different loadings of molybdenum on oxidized MPCM is shown in FIG. 22. The heat of adsorption of molybdenum decreased with the increase of loading that can be attributed to heterogeneity of the surface and multilayer coverage. The heat of adsorption approached the integral heat of adsorption (ΔH value) at higher loading. Without wishing to be bound by any theory, it is believed that the surface became saturated with molybdenum and the heat of adsorption was approaching its equilibrium value. The initial decrease in the values of heat of adsorption can be attributed to the heterogeneity of the surface and the multilayer coverage. The subsequent increase in the heat of adsorption may be attributed to lateral interactions between the adsorbed molybdenum ions, which are known to form complex molecules on a solid surface. It was expected that adsorption surface sites of the resin will be homogeneous energetically and, therefore, a constant heat of adsorption should be obtained. However, the resin surface seems to become heterogeneous energetically, because of the microporosity of the surface.

Batch studies were carried out varying the solid to liquid ratio in the presence of 25 mM sodium hypochlorite as an oxidizer in 1% molybdenum solution at 25° C. (298K). Almost 95% of the available molybdenum from a 1% solution was adsorbed on to the MPCM-ClO$_2$ resin within 1.0 hour of exposure when the solid to liquid ratio was 2:100 (2 gram MPCM-ClO$_2$ in 100 mL of a 1% molybdenum solution that was mixed with 25 mM sodium hypochlorite). This ratio is found to be the optimum adsorbent dose only for molybdenum uptake on to MPCM-ClO$_2$ in presence of 25 mM sodium hypochlorite in 1% molybdenum solution. In the case of non-oxidized MPCM, using the same solid to liquid ratio and exposure time, the uptake of molybdenum was almost 35% less compared to the oxidized-MPCM (MPCM-ClO$_2$) resin. The surface charge modification of MPCM by oxidation and higher solid to liquid ratio in the process appear to be at least part of the reason for this phenomenon.

Example 9

Figure 23:
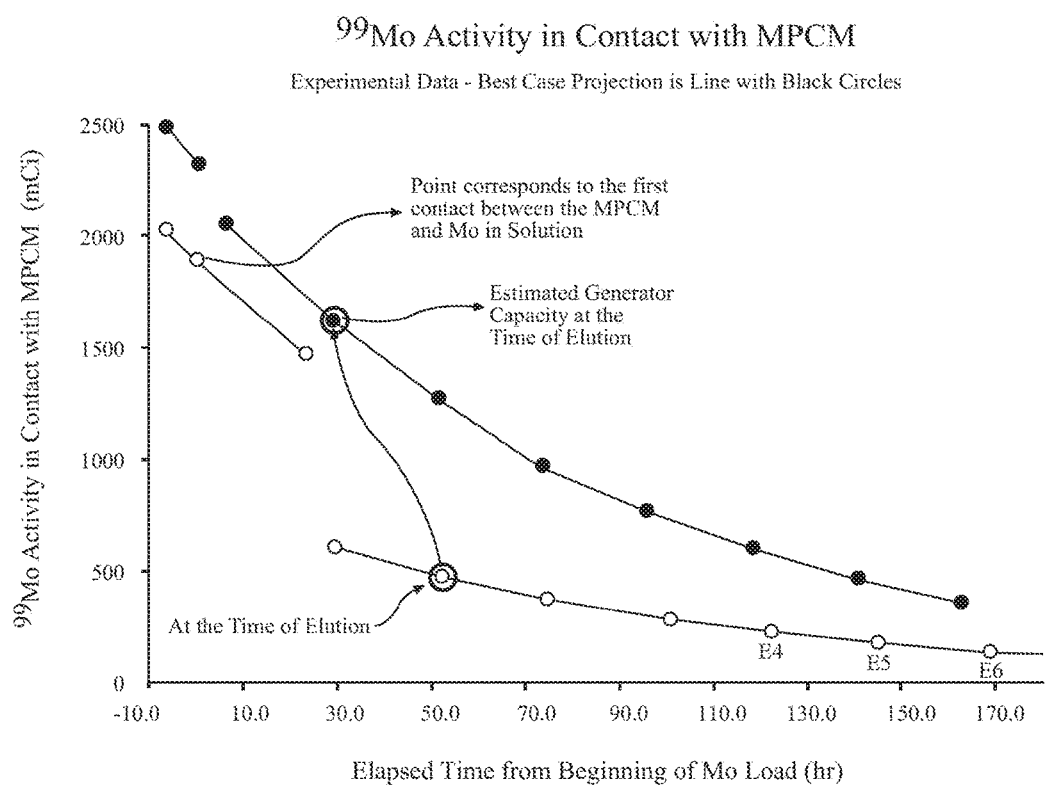
FIG. 23 is a graph showing the projected specific activity of a proposed MPCM based generator with a column volume of 6-mL

Initial experimental data showed that oxidized-MPCM resin is capable of adsorbing approximately 50 to 60% of available molybdenum from solution after 24 hours of exposure. It is also estimated that almost 28% of the $^{99}$Mo activity decays away during 24 hours of the adsorption cycle. Moreover, another 10 to 15% of $^{99}$Mo activity losses incurred due to processing and handling of the generator. FIG. 23 shows experimental data of a 0.5 Ci (at the time elution)$^{99}$Mo/$^{99m}$Tc generator described above that typically requires approximately 1.6 to 1.8 Ci $^{99}$Mo (EOI) from the very beginning.

However the batch experiments suggest that at 25° C. (298K) temperature, the MPCM-ClO$_2$ resin is capable of adsorbing almost 99% of the available molybdenum from a 1% molybdenum solution mixed with 25 mM sodium hypochlorite within 1 hour of exposure when a solid to liquid ratio of 2:100 was used. After rinsing the molybdenum loaded MPCM-ClO$_2$ resin thoroughly using de-ionized water, at least 90% (or up to 95%) molybdenum found to be retained in the resin, which can be used to prepare a column for a generator. This will ultimately reduce the losses of $^{99}$Mo activity during the adsorption cycle and during generator processing and handling. Considering the loss of $^{99}$Mo during 24 hours of the adsorption cycle to prepare a 6-mL generator column with activity of 0.5 Ci (at the time of elution), it is projected that a generator with specific activity of 1.5 Ci to 2 Ci is possible when a solid to liquid ratio is maintained at 2:100 with a 25° C. (298K) solution temperature during the adsorption cycle (FIG. 23). It is also estimated that a $^{99}$Mo/$^{99m}$Tc generator with activity of 4 to 6 Ci based on neutron captured $^{99}$Mo is possible by adjusting the volume and number of column(s) in the system.

Example 10

About 4 g of chitosan was added to 300 mL deionized (DI) water with 1 mL acetic acid and stirred for 2 hr at 70° C. to form a gel. About 4 mL of HCl was added into the chitosan gel and kept under continuous stirring for another 1 hr at 70° C.

In this example, an amorphous titania gel was prepared by acid catalyzed controlled hydrolysis and condensation of titanium isopropoxide. See Hasan, S., Ghosh, T. K., Prelas, M. A., Viswanath, D. S., and Boddu, V. M. "Adsorption of uranium on a novel bioadsorbent chitosan coated perlite" Nuclear Technology, 159, 59-71, 2007; Schattka, J. H., Wong, E. H.-M., Antonietti, M., and Caruso, R. A. "Sol-gel templating of membranes to form thick, porous titania, titania/zirconia and titania/silica films" Journal of Materials Chemistry, 16, 1414-1420, 2006; Agoudjil, N., and Benkacem, T. "Synthesis of porous titanium dioxide membranes" Desalination, 206, 531-537, 2007. Equal volumes of isopropanol (IP) and DI water were mixed in a given amount of titanium isopropoxide under continuous stirring at 70° C. Drop-wise addition of HCl under continuous stirring and heating at 70° C. produced a clear solution. The hydrolysis and condensation reaction was controlled by the ratio of water and titanium and H$^+$ and titanium in the mixture, respectively. The final pH of the mixture was approximately 2.0 and the final reactant stoichiometry was Ti:IP:H$_2$O:H$^+$ =0.0132:0.39:1.67:0.01. Based on the concentration ratio of the reactants, the gel time was varied between 25 and 45 minutes.

At about 75% of the total gel time, a sol-gel solution of amorphous titania was mixed with chitosan gel. The mixture was kept under stirring at 70° C. for another 1 hr for complete reaction of chitosan and amorphous titanium oxide. The reaction with gluteraldehyde was performed by drop-wise addition of about 6 mL gluteraldehyde solution having a concentration of 50% to the acidic chitosan titania gel under continuous stirring at 70° C. The pH of the final mixture was approximately 1.0. The mixture was kept under continuous vigorous stirring at 70° C. for another 1 hr to obtain a semi-solid gel.

The resulting mass was thoroughly washed with 2% monoethanol amine to remove any unreacted gluteraldehyde. The mass was then suspended in 0.1M NaOH solution for 4 to 6 hr. The cross-linked mass was separated from the solution and washed with 0.1M HCl and then with deionized water (DI) until the pH of the washed solution was 7. The cross-linked mass was then dried in a vacuum oven overnight at 70° C. The cross-linked chitosan gluteraldehyde composite prepared in this process is referred to as "CGST" herein.

In the case of the CGST sample, the peak at 1590 cm$^{-1}$ is found to be weakened, indicating that the amide groups may be involved in cross-linking reactions with titanium. The carbonyl (—CONHR) spectra at around 1650 cm$^{-1}$ is observed for all three samples. For primary aromatic amines, C—N stretching vibrations fall between 1350 and 1150 cm$^{-1}$.

There is a peak observed at 1170 cm$^{-1}$ (FIG. 21) for chitosan and CGST samples, respectively. In comparison to chitosan, the peak at 1170 cm$^{-1}$ is found to be weakened and a new peak appears at 1090 cm$^{-1}$ for the CGST samples.

The peak that appears at 1090 cm$^{-1}$ shows prominent shifts due to C=O stretching vibrations of an ether linkage.

In the region of 1000 cm$^{-1}$ to 1200 cm$^{-1}$, chitosan shows two peaks at 1157 cm$^{-1}$ and 1070 cm$^{-1}$, corresponding to the stretching of a C—O bond of C3 of chitosan (secondary OH) and C—O stretching of C6 of chitosan (primary OH), respectively.

Figure 24:
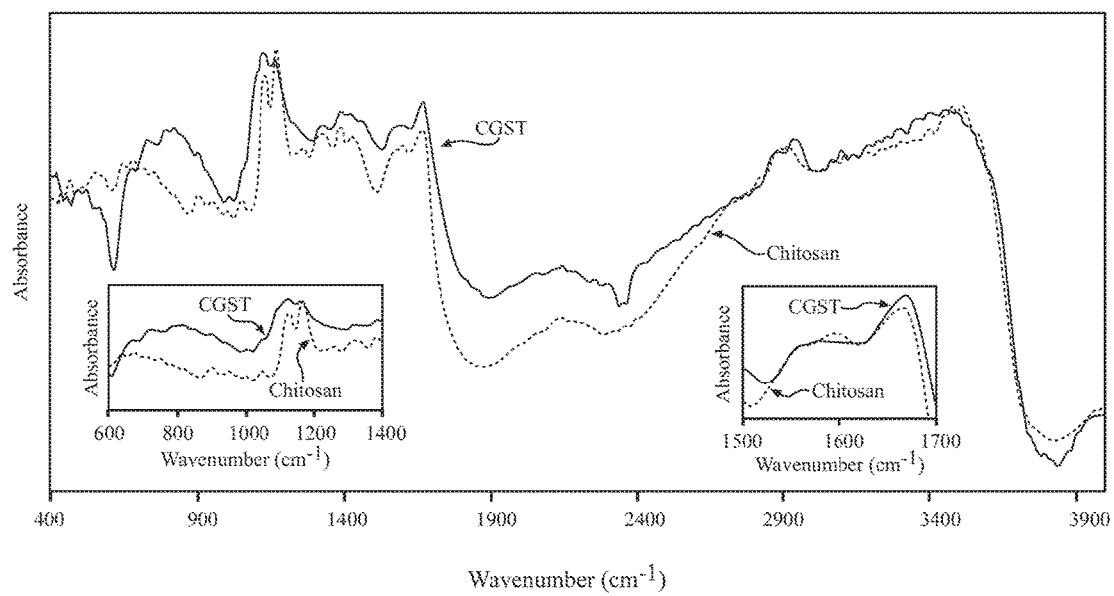
FIG. 24 is a graph showing FTIR spectra of chitosan and another embodiment of modified chitosan disclosed herein.

Compared with the C—O spectrum of chitosan obtained at 1070 cm$^{-1}$, the absorption peaks of the secondary hydroxyl group of the CGST samples become folded, as indicated in FIG. 24, and the O—H band was reduced and shifted from 3498.0 to 3450.0 cm$^{-1}$, suggesting that the OH groups of chitosan may be involved in the reaction with gluteraldehyde through the formation of hemiacetal in the presence of the acid catalyst. The evidence of the decrease of the chemical bond constant of C—O and the significant decline in the OH stretching peaks intensities O—H (1000 to 1200 cm$^{-1}$) supports the presence of a complexing reaction of gluteraldehyde with the surface oxygen functional groups, such as secondary hydroxyl group in chitosan. In the case of the CGST sample, titanium oxide appears to be involved in a reaction with the amine group of chitosan (FIG. 24).

Various embodiments of chitosan based micro-porous composite material (MPCM) was prepared by cross-linking gluteraldehyde at 70° C. in the presence of catalyst. MPCM was prepared in the laboratory via the phase inversion of liquid slurry of chitosan dissolved in acetic acid and the aldol condensation of glutaraldehyde for better exposure of amine groups (NH$_2$). The MPCM was characterized by scanning electron microscopy (SEM), which revealed its porous nature. Two MPCM based derivatives such as oxidized-MPCM and acid-catalyzed-MPCM were also prepared. The stabilization study for MPCM was conducted at 50,000 krad using a $^{60}$Co irradiator as a γ-source. FTIR, XPS, and EDS X-ray microanalysis spectra revealed that the intensity of C, O, and N peaks of MPCM did not change substantially after irradiation. In case of Mo (VI) adsorption from aqueous solution at 298K, MPCM can hold up to 60% of its own body weight. The MPCM and its derivatives demonstrates the capacity to adsorb $^{99}$Mo and release the daughter product $^{99m}$Tc simultaneously under both batch and equilibrium conditions. It was also observed that $^{99m}$Tc, which was the decay product of $^{99}$Mo, was eluted with normal (0.9%) saline solution to yield more than 80% elution. Data shows that the high elution yield of $^{99m}$Tc and the leakage of Mo (VI) from the continuous column was minimum therefore the MPCM and its derivatives can be used as an adsorbent in the $^{99m}$Tc/$^{99}$Mo generator without using any guard column.

As used herein, the terms "around," "approximately," and "about" in connection with a numerical value denote that some variation from the numerical value may be possible, to a maximum of ±10% of the numerical value. The terms "a," "an," "the," and the like which denote a single occurrence also should be understood to include a plurality of occurrences, unless clearly indicated otherwise.

A $^{99}$Mo/$^{99m}$Tc generator based on low specific neutron captured produced molybdenum has been prepared using a novel MPCM resin as an adsorbent. The oxidized MPCM resin is found to be capable of adsorbing >95% of available molybdenum from the 1% solution at solution pH 3.0 when solid to liquid ratio is 2:100. Almost 90% of available $^{99m}$Tc was eluted with mainly saline solution (0.9% NaCl) from the generator. The breakthrough of $^{99}$Mo and the pH of the eluent that pass through an alumina guard column are within the United States Pharmacopeia (USP) and European Union Pharmacopeia (EUP) limits.

Example 11

Nanoparticles of high Z element of Hafnium (Hf) were prepared by crystal growth or surfactant templating methods using Hafnium chloride as precursor. Hafnium nanoparticles were synthesized using either PEG-400 or Pluronic-123 as surfactant. The percentage of surfactant used to synthesize the nanoparticles was varied from 4 to 20% by weight. The synthesis procedure involved three steps. In the first step, Hafnium Chloride (HfCl$_2$O.8H$_2$O) and a surfactant ~either PEG-400 or Pluronic-123 were mixed thoroughly in a mortar and pestle, and 5 to 10 ml of deionized water was added under continuous grinding. In this step, a chemical reaction is not expected; only a homogeneous mixture is formed. In the second step, an alkaline solution —NaOH or NH$_4$OH was added to this mixture under sonication to nucleate and grow the nanoparticles. Nitrogen gas was used to continuously purge the system during mixing and sonication. Ethanol was added to the mixture to transfer the surfactant into the alcohol phase. The solution was further sonicated using 500 ml of deionized water for 3 h to obtain uniform intermediate stage of hafnium nanoparticles.

Figure 25:
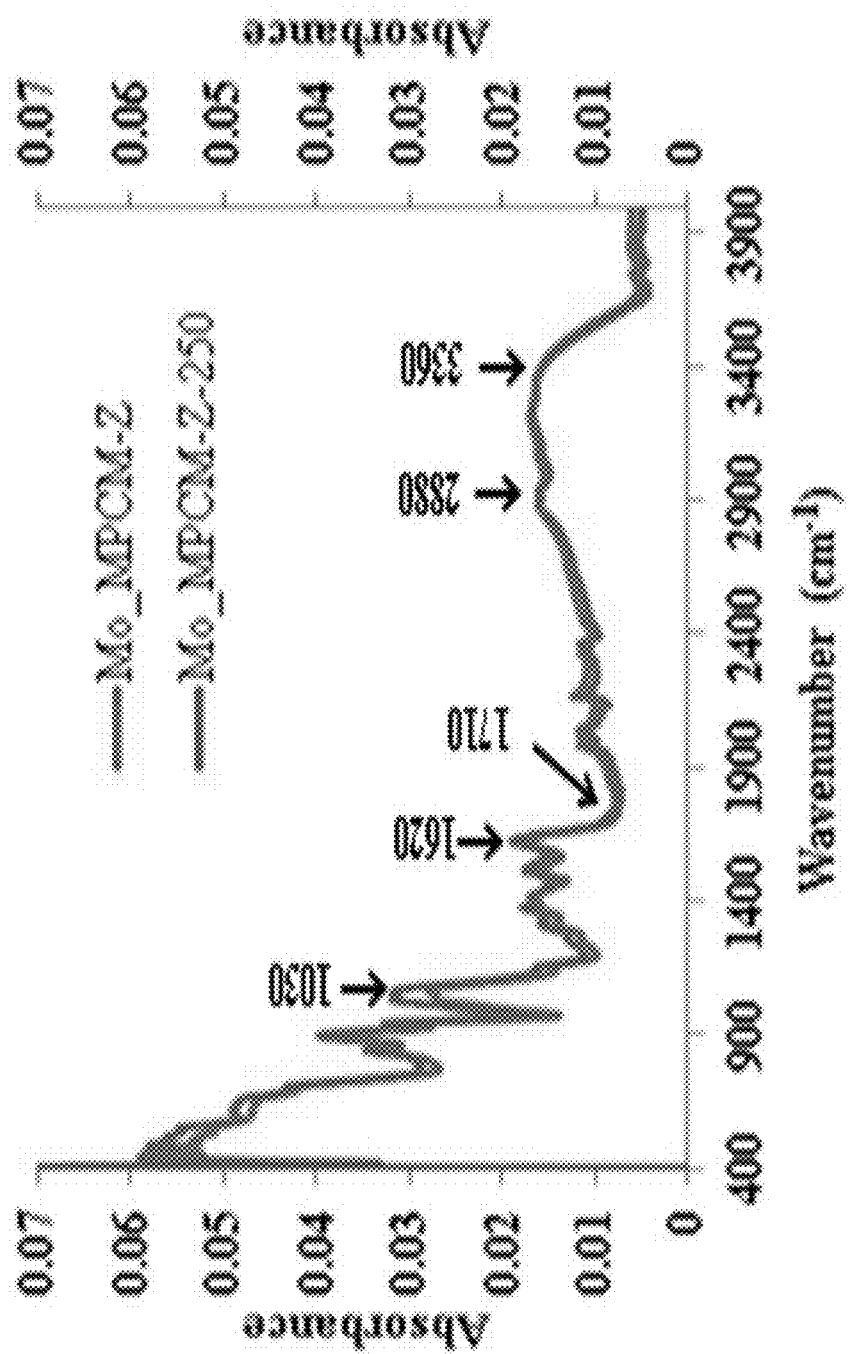
FIG. 25 is an IR spectra of unirradiated molybdenum loaded MPCM-Z resin and the molybdenum loaded MPCM-Z resin irradiated at 250 kGy.
Figure 26:
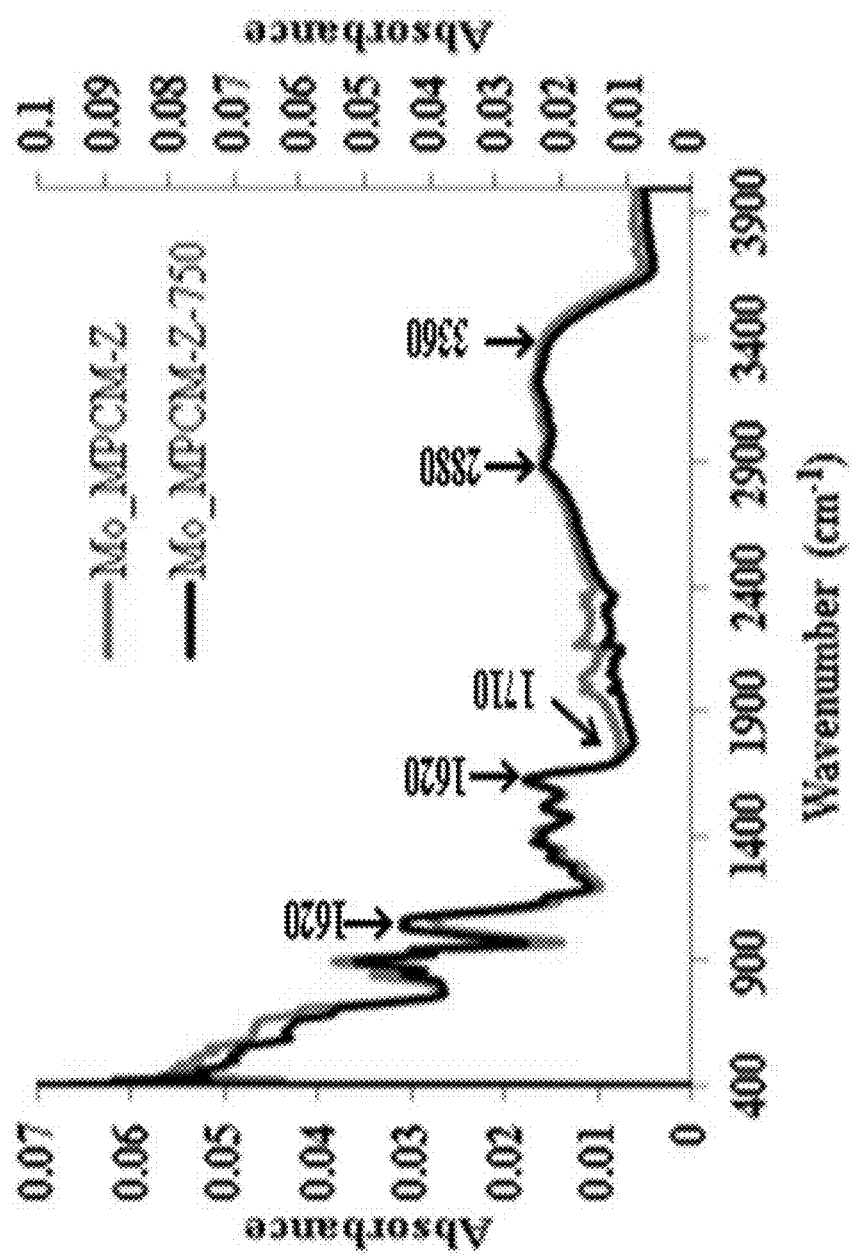
FIG. 26 is an IR spectra of unirradiated molybdenum loaded MPCM-Z resin and the molybdenum loaded MPCM-Z resin irradiated at 250 kGy

The obtained hafnium particles without further drying or any processing were crosslinked or dispersed on to MPCM resin preparation matrix. Finally, the resin was dried at 120° C. for 12 hours using vacuum oven. It was expected that high Z element such as Hafnium can be integrated in to the MPCM matrix either self-assembles or radiation induced cross-linking process. The prepared resin is termed as MPCM-Z in this study. The potential for this MPCM-Z resin as an adsorbent for the preparation of $^{99}$Mo/$^{99m}$Tc generator has been evaluated by exposing it to 1% molybdenum solution using both batch and continuous process in presence of 5 mM sodium chlorite or hypochlorite as an oxidizer. In case of neutron activated Mo-98 solution, it is important to note that oxidizing agent keeps Mo-98 at hexavalent state thus facilitating molybdenum loading onto the resin without any precipitation. Both experiments demonstrated that the MPCM-Z resin absorbs >60 wt % molybdenum at solution pH 3.0. The molybdenum loaded MPCM-Z resin was further subjected to irradiation up to 750 kGy using e-beam, to demonstrate its radiation resistance capability in presence of high radiation field. FIGS. 25 and 26 shows typical IR spectra of unirradiated molybdenum loaded MPCM-Z resin and the molybdenum loaded MPCM-Z resin irradiated at 250 kGy and 750 kGy respectively.

Figure 27:
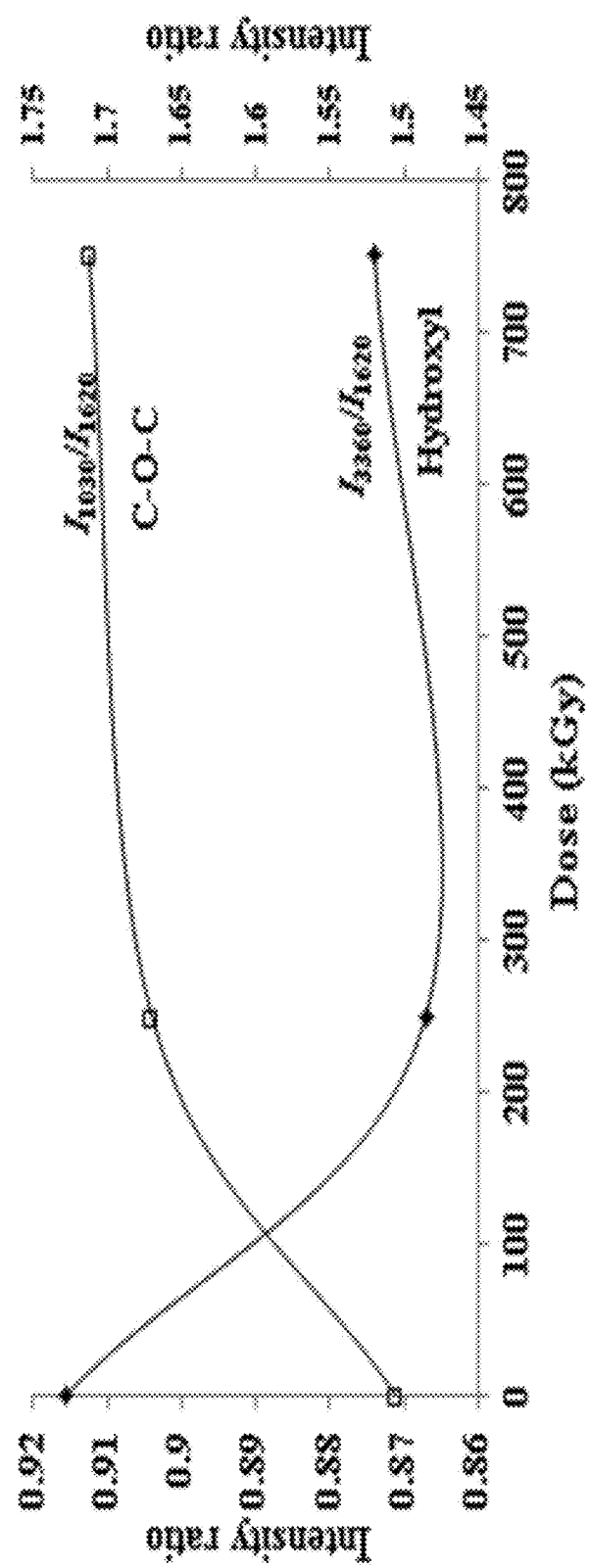
FIG. 27 is a graph illustrating the relationship between intensity ratios from C—O—C group ($I_{1030}/I_{1620}$) and hydroxyl group ($I_{3360}/I_{1620}$) and radiation doses (kGy).

As illustrated in FIGS. 25 and 26, the absorption peaks that appears at 1710 cm$^{-1}$, 1620 cm$^{-1}$, and 1030 cm$^{-1}$ are ascribed for carbonyl, amide-I, and C—O—C groups respectively. Since MPCM-Z resin was loaded with molybdenum, it is reported that the amine absorption spectra is considered to be unchanged. Therefore, the intensity ratio of hydroxyl, carbonyl and C—O—C spectra were calculated in terms of respective amine absorption spectra. The relationship between these intensity ratios and radiation doses are shown in FIG. 27 and provided in Table 13 below.

TABLE 13

Relationship between radiation dose and peak intensity

| | Item | | |
|---|---|---|---|
| | Hydroxyl $I_{3360}/I_{1620}$ | C—O—C $I_{1030}/I_{1620}$ | Carbonyl $I_{1710}/I_{1620}$ |
| Mo-MPCM-Z | 0.916 | 1.51 | 0.448 |
| Mo-MPCM-Z (250 kGy) | 0.867 | 1.67 | 0.447 |
| Mo-MPCM-Z (750 kGy) | 0.874 | 1.71 | 0.433 |

FIG. 27 shows that the C—O—C group slightly increases with the increasing of radiation dose, suggesting that there may not any chain scission of C—O bonds occurs due to radiation. Weinwei et al reported that there are two kinds of C—O bond in chitosan structure: a) half condensed aldehyde and glucosidic bonds. If the half condensed aldehyde bonds broken due to irradiation, carbonyl is believed to be formed. It is evident from FIG. 27 that there is no substantial changes occur in the carbonyl peak intensity at peak position 1710 cm$^{-1}$ due to irradiation. On the other hand scission of glucosidic bonds leads to the formation of hydroxyl groups. Therefore, if chain scission of glucosidic bond occurs, the hydroxyl peak intensity will increase with the increase of radiation dose. For molybdenum loaded MPCM-Z resin, the hydroxyl group concentration or peak intensity ratio is appeared to be decreased due to irradiation. Without being bound by theory, it was believed that the Hafnium ions in the MPCM matrix interact with the imparted energy from the ionizing radiation and protect or insulates the C—O bond therefore no chain scission in MPCM matrix occurs due to radiation.

In this attempt, the MPCM-Z resin was further studied to evaluate their potential for molybdenum adsorption. A generator consisting of MPCM-Z resin loaded with $^{99}$Mo (1 Ci/gram of resin) was prepared following a process mentioned elsewhere. The molybdenum loaded MPCM-Z was then used to prepare chromatographic column. The columns were then flushed with a saline solution at pH 4 to remove any loosely bound molybdenum. $^{99m}$Tc, the decay product of $^{99}$Mo, was eluted with saline solution (0.9% NaCl). It was observed that about ±50% of $^{99m}$Tc was extracted from the column using 6 mL of saline as an eluent. The saline solution used to elute $^{99m}$Tc from the MPCM-Z was modified with additives such as sodium nitrate (1 g/L) in an attempt to improve yield. The $^{99m}$Tc recovery was markedly better—about ±70%. It seemed evident that the MPCM-Z resin showed better performance in higher radiation field produced by the $^{99}$Mo compared to partially oxidized MPCM resin. A guard column with alumina as an adsorbent was used to keep $^{99}$Mo in the eluent >1 mCi of $^{99}$Mo per mCi of $^{99m}$Tc. The pH of the eluent was within 4.5 to 7.5. The elution contains a yield of >±80% of the theoretical amount of $^{99m}$Tc available from the $^{99}$Mo over the life of the generator.

The present invention having been described with reference to certain specific embodiments and examples, it will be understood that these are illustrative, and do not limit the scope of the appended claims.

What is claimed is:

1. A sorbent comprising:
    a microporous material including chitosan which has been crosslinked with glutaraldehyde in the presence of a catalyst to a glutaraldehyde concentration of about 2 to about 4 wt % to produce a cross-linked chitosan-gluteraldehyde composite matrix which is resistant to degradation from exposure to beta and gamma radiation and from exposure to acids; and
    a plurality of nanoparticles of a high Z element disposed in said cross-linked chitosan-gluteraldehyde composite matrix and integrated with said cross-linked chitosan-gluteraldehyde composite matrix to reduce primary impact of high radiation flux and minimize radiolytic effect on said cross-linked chitosan-gluteraldehyde composite matrix.

2. The sorbent as set forth in claim 1 wherein said high Z element is hafnium (Hf).

3. The sorbent as set forth in claim 2 wherein Hf is present in said cross-linked chitosan-gluteraldehyde composite matrix between 0.15 g and 0.35 g per grams of said cross-linked chitosan-gluteraldehyde composite matrix.

4. The sorbent as set forth in claim 1 wherein the sorbent has increased selectivity for the sorption of $^{99}$Mo with respect to $^{99m}$Tc.

5. The sorbent as set forth in claim 1 further including an additive of sodium nitrate being present at 1 g/L.

6. A method for preparing a radiation-resistant sorbent, comprising:
    combining chitosan with water in the presence of an acid to form a chitosan gel;
    adding glutaraldehyde to the gel to form a semi-solid mass in the presence of catalyst at 70° C., in where condensation polymerization of reaction mass occurs;
    washing the semi-solid mass to remove unreacted glutaraldehyde and form a washed mass;
    suspending the washed mass in aqueous base to form a neutralized crosslinked mass;
    disposing a plurality of nanoparticles of a high Z element on the neutralized crosslinked mass; and
    drying the neutralized crosslinked mass including the plurality of nanoparticles under vacuum to form the radiation-resistant sorbent.

7. The method as set forth in claim 6 wherein said step of depositing is further defined as dispersing the plurality of nanoparticles made from hafnium (Hf) on the neutralized crosslinked mass.

8. The method as set forth in claim 7 wherein said step of depositing is further defined as dispersing the plurality of nanoparticles made from hafnium (Hf) between 0.15 g and 0.35 per grams of the neutralized crosslinked mass on the neutralized crosslinked mass.

9. A method of separating isotopes from mixtures thereof, comprising:
    contacting a mixture of at least two isotopes with a radiation resistant sorbent according to claim 1 that preferentially sorbs at least one of said isotopes;
    sorbing at least one of said isotopes onto or into said sorbent while one or more of the remaining isotopes are not significantly sorbed by the sorbent;
    removing said one or more remaining isotopes from said sorbent.

10. The method according to claim 9, wherein said at least two isotopes comprise $^{99}$Mo and $^{99m}$Tc.

11. The method according to claim 10, wherein said sorbent preferentially sorbs said $^{90}$Mo and wherein said $^{99m}$Tc is not significantly sorbed by said sorbent.

12. The method according to claim 9, wherein one of said isotopes is a cesium isotope.

13. The method according to claim 12, wherein said one or more remaining isotopes comprise one or more isotopes present in a radioactive waste stream.

14. The method according to claim 9, wherein the removing of the one or more remaining isotopes from the sorbent comprises contacting the sorbent with an eluent solution.

15. The method according to claim 14, wherein the eluent solution comprises one or more oxidizers selected from the group consisting of a chlorite, a hypochlorite, a dichromate, and a metal oxide.

16. A generator for $^{99}$Mo/$^{99m}$Tc, comprising the sorbent of claim 1.

17. A method for separating or concentrating or both one or more heavy metals from a liquid stream, comprising contacting a liquid stream containing said one or more heavy metals with a sorbent according to claim 1, and sorbing one or more of said heavy metals thereon.

* * * * *